United States Patent
Yang et al.

(10) Patent No.: US 12,472,928 B2
(45) Date of Patent: Nov. 18, 2025

(54) HYBRID ELECTRIC VEHICLE AND POWER SYSTEM THEREOF

(71) Applicant: BYD COMPANY LIMITED, Guangdong (CN)

(72) Inventors: Dongsheng Yang, Shenzhen (CN); Chunsheng Wang, Shenzhen (CN); Yunhui Bai, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/361,342

(22) Filed: Jul. 28, 2023

(65) Prior Publication Data

US 2024/0140393 A1  May 2, 2024

Related U.S. Application Data

(63) Continuation of application No. 16/499,818, filed as application No. PCT/CN2018/081049 on Mar. 29, 2018, now abandoned.

(30) Foreign Application Priority Data

Mar. 31, 2017 (CN) .......................... 201710211041.9
Mar. 31, 2017 (CN) .......................... 201720340394.4

(51) Int. Cl.
*B60W 20/13* (2016.01)
*B60L 50/61* (2019.01)
*B60W 10/08* (2006.01)

(52) U.S. Cl.
CPC ............. *B60W 20/13* (2016.01); *B60L 50/61* (2019.02); *B60W 10/08* (2013.01)

(58) Field of Classification Search
None
See application file for complete search history.

(56) References Cited

U.S. PATENT DOCUMENTS 6,578,649 B1   6/2003  Shimasaki et al.
2004/0006414 A1  1/2004  Suzuki
(Continued)

FOREIGN PATENT DOCUMENTS

CN   1911704 A    2/2007
CN   101346251 A  1/2009
(Continued)

OTHER PUBLICATIONS

English Translation of International Search Report from PCT/CN2018/079237 dated Jun. 29, 2018 (2 pages).

*Primary Examiner* — Rachid Bendidi
*Assistant Examiner* — Jason R Roberson
(74) *Attorney, Agent, or Firm* — Calfee, Halter & Griswold LLP

(57) ABSTRACT

This application discloses a hybrid power automobile and a power system thereof. The power system includes: an engine, where the engine outputs power to wheels of the hybrid power automobile through a clutch; a power motor, where the power motor is configured to output a drive force to the wheels of the hybrid power automobile; a power battery, where the power battery is configured to supply power to the power motor; a DC-DC converter; and an auxiliary motor connected to the engine, where the auxiliary motor is connected to the power motor, the DC-DC converter, and the power battery, and when performing power generation under driving of the engine, the auxiliary motor implements at least one of charging the power battery, supplying power to the power motor, and supplying power to the DC-DC converter. Therefore, low-speed electric balance and low-speed smoothness of the entire vehicle can be maintained.

20 Claims, 20 Drawing Sheets

(56) References Cited

U.S. PATENT DOCUMENTS

| | | | |
|---|---|---|---|
| 2005/0080523 A1* | 4/2005 | Bennett | B60K 6/445 |
| | | | 180/65.23 |
| 2007/0276556 A1* | 11/2007 | Noel | B60L 3/0046 |
| | | | 903/905 |
| 2008/0093137 A1* | 4/2008 | Maeda | B60K 6/547 |
| | | | 180/65.265 |
| 2012/0049771 A1* | 3/2012 | Komatsu | B60W 10/28 |
| | | | 318/139 |
| 2014/0238758 A1 | 8/2014 | Barth | |
| 2015/0066273 A1* | 3/2015 | Debert | B60K 6/442 |
| | | | 701/22 |
| 2016/0059712 A1* | 3/2016 | Jang | H02J 7/342 |
| | | | 307/10.1 |
| 2016/0303976 A1 | 10/2016 | Cha et al. | |
| 2017/0021826 A1* | 1/2017 | Debert | B60K 6/48 |

FOREIGN PATENT DOCUMENTS

| | | |
|---|---|---|
| CN | 101503056 A | 8/2009 |
| CN | 101554917 A | 10/2009 |
| CN | 101811433 A | 8/2010 |
| CN | 103715059 A | 4/2014 |
| CN | 103978974 A | 8/2014 |
| CN | 104554247 A | 4/2015 |
| CN | 104955699 A | 9/2015 |
| CN | 105270198 A | 1/2016 |
| CN | 105811561 A | 7/2016 |
| CN | 206678765 U | 11/2017 |
| CN | 206983710 U | 2/2018 |
| DE | 102007019319 A1 | 10/2007 |
| JP | 2002152913 A | 5/2002 |
| JP | 2006304574 A | 11/2006 |
| WO | 2005085630 A1 | 9/2005 |
| WO | 2014027153 A1 | 2/2014 |

* cited by examiner

HYBRID ELECTRIC VEHICLE AND POWER SYSTEM THEREOF

CROSS-REFERENCE TO RELATED APPLICATIONS

This application is a continuation of U.S. application Ser. No. 16/499,818, filed Sep. 30, 2019, which is a 35 U.S.C. 371 U.S. national stage application entry of PCT/CN2018/081049, filed on Mar. 29, 2018, which claims priority to Chinese Patent Application No. 201710211041.9, filed with the Chinese Patent Office on Mar. 31, 2017 and entitled "HYBRID POWER AUTOMOBILE AND POWER SYSTEM THEREOF", and Chinese Patent Application No. 201720340394.4, filed with the Chinese Patent Office on Mar. 31, 2017 and entitled "HYBRID POWER AUTOMOBILE AND POWER SYSTEM THEREOF", which are incorporated herein by reference in their entireties.

FIELD

The present invention relates to the field of vehicle technologies, and in particular, to a power system of a hybrid power automobile and a hybrid power automobile having the system.

BACKGROUND

With continuous consumption of energy sources, development and use of new energy vehicle models have gradually become a trend. A hybrid power automobile as one of new energy source vehicle models is driven through an engine and/or a motor.

However, in the prior art, while serving as a drive motor, a front motor of the hybrid power automobile further serves as a generator. Consequently, during low-speed travelling, a rotational speed of the front motor is relatively low, power generation power and power generation efficiency are also quite low. As a result, power consumption requirements of the low-speed travelling cannot be satisfied. Consequently, it is relatively difficult for the entire vehicle to maintain electric balance at a low speed.

SUMMARY

An objective of the present invention is to at least resolve one of the technical problems in the related art to some extent. To this end, a first objective of the present invention is to propose a power system of a hybrid power automobile, to implement low-speed electric balance of the entire vehicle.

A second objective of the present invention is to propose a hybrid power automobile.

To achieve the foregoing objectives, an embodiment of a first aspect of the present invention proposes a power system of a hybrid power automobile, including: an engine, where the engine outputs power to wheels of the hybrid power automobile through a clutch; a power motor, where the power motor is configured to output a drive force to the wheels of the hybrid power automobile; a power battery, where the power battery is configured to supply power to the power motor; a DC-DC converter; and an auxiliary motor connected to the engine, where the auxiliary motor is connected to the power motor, the DC-DC converter, and the power battery, and when performing power generation under driving of the engine, the auxiliary motor implements at least one of charging the power battery, supplying power to the power motor, and supplying power to the DC-DC converter.

According to the power system of a hybrid power automobile proposed in this embodiment of the present invention, the engine outputs power to the wheels of the hybrid power automobile through the clutch, the power motor outputs a drive force to the wheels of the hybrid power automobile, the power battery supplies power to the power motor, and when performing power generation under driving of the engine, the auxiliary motor implements at least one of charging the power battery, supplying power to the power motor, and supplying power to the DC-DC converter, thereby maintaining low-speed electric balance and low-speed smoothness of the entire vehicle, and improving performance of the entire vehicle.

To achieve the foregoing objectives, an embodiment of a second aspect of the present invention proposes a hybrid power automobile, including the power system of a hybrid power automobile.

According to the hybrid power automobile proposed in this embodiment of the present invention, low-speed electric balance and low-speed smoothness of the entire vehicle can be maintained, and performance of the entire vehicle can be improved.

DETAILED DESCRIPTION

Reference will be made in detail to embodiments of the present invention. The embodiments described herein with reference to drawings are explanatory, illustrative, and should be used to generally understand the present invention. The following embodiments described with reference to the accompanying drawings are exemplary, and are intended to describe the present invention and cannot be construed as a limitation to the present invention.

A power system of a hybrid power automobile proposed in an embodiment of an aspect of the present invention is described below with reference to FIG. 1 to FIG. 5, and the power system provides sufficient power and electric energy for normal travelling of the hybrid power automobile.

Figure 1:
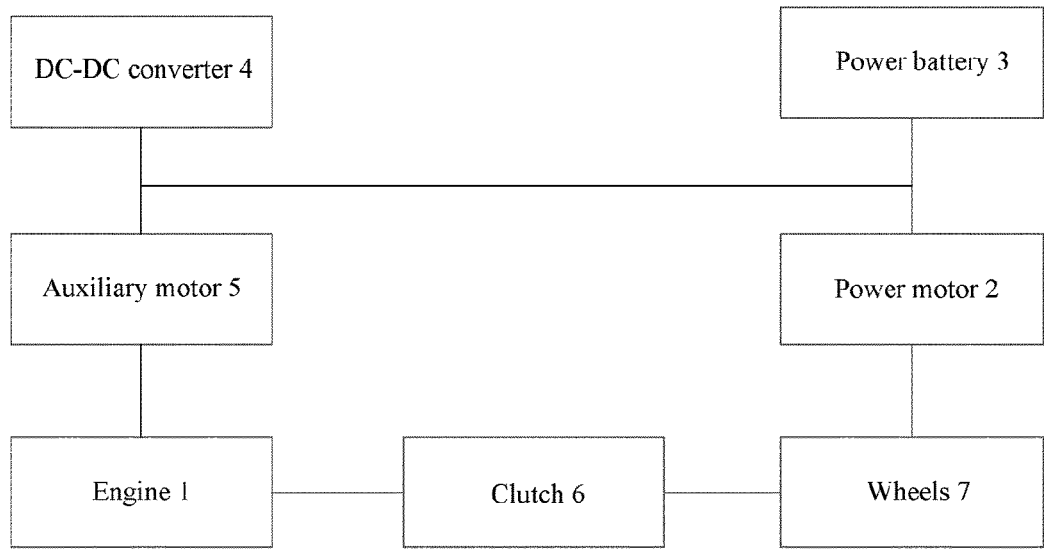
FIG. 1 is a schematic block diagram of a power system of a hybrid power automobile according to an embodiment of the present invention.

FIG. 1 is a schematic block diagram of a power system of a hybrid power automobile according to an embodiment of the present invention. As shown in FIG. 1, the power system of a hybrid power automobile includes: an engine 1, a power motor 2, a power battery 3, a DC-DC converter 4, and an auxiliary motor 5.

Figure 2A:
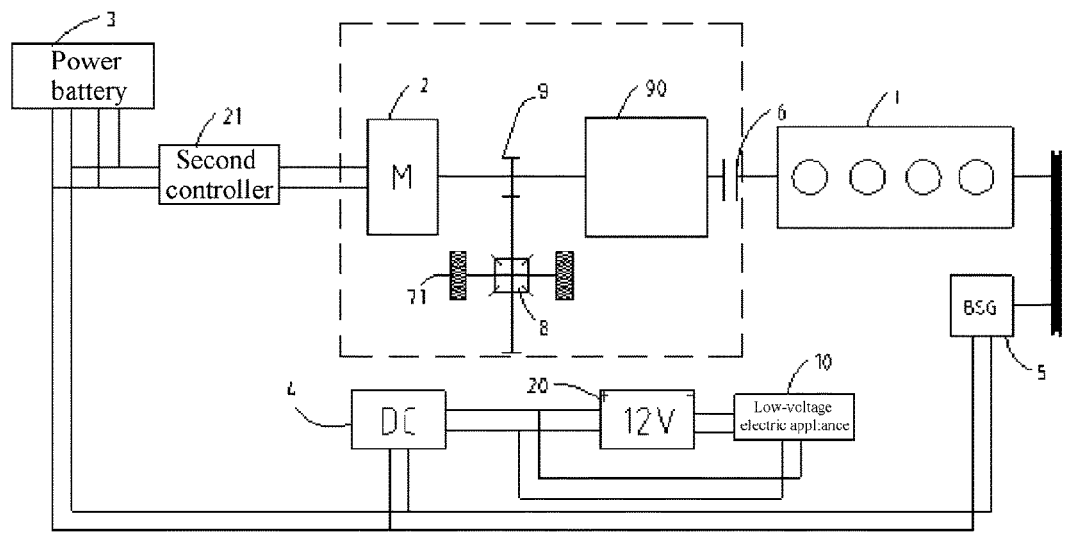
FIG. 2a is a schematic structural diagram of a power system of a hybrid power automobile according to an embodiment of the present invention.
Figure 2B:
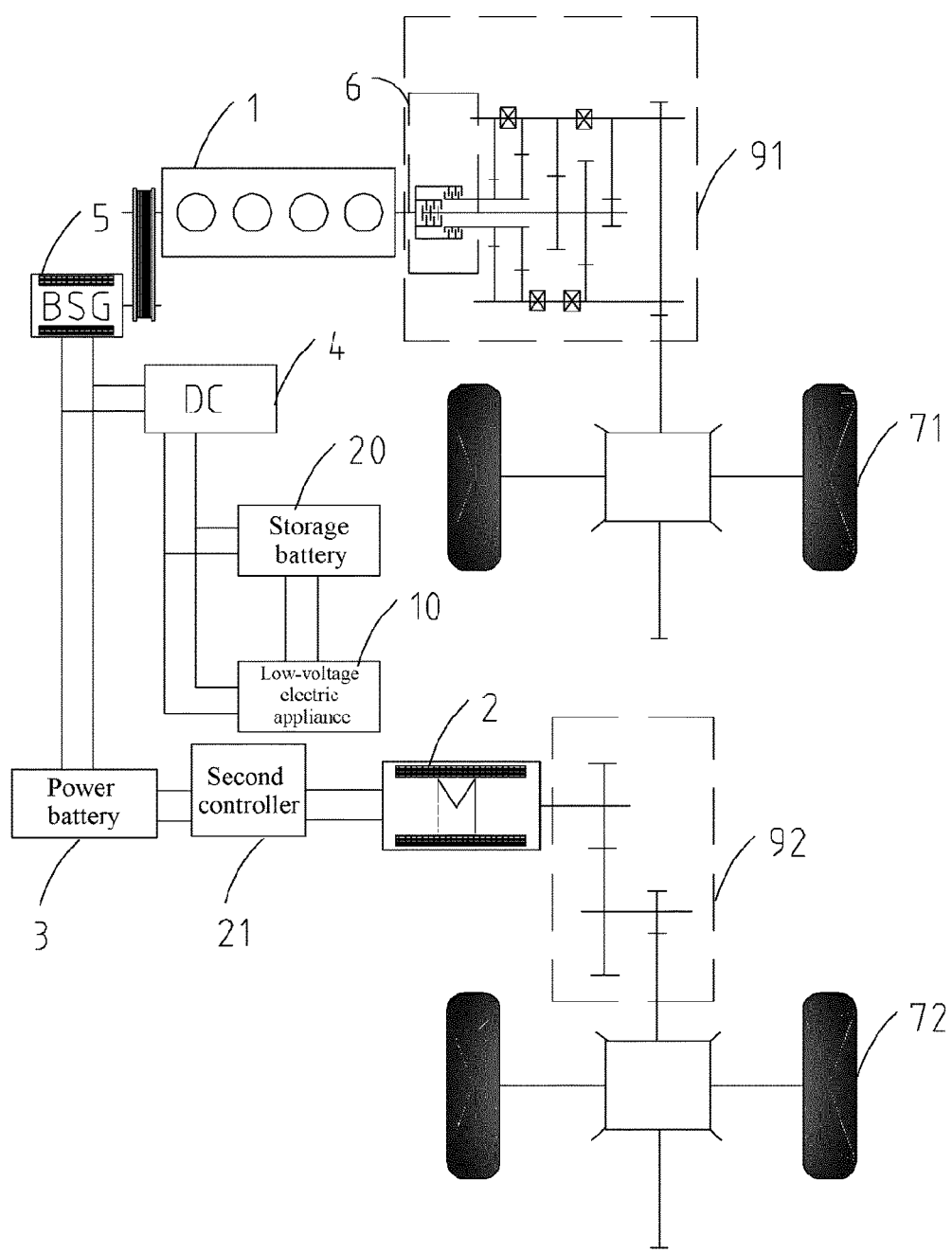
FIG. 2b is a schematic structural diagram of a power system of a hybrid power automobile according to another embodiment of the present invention.
Figure 3:
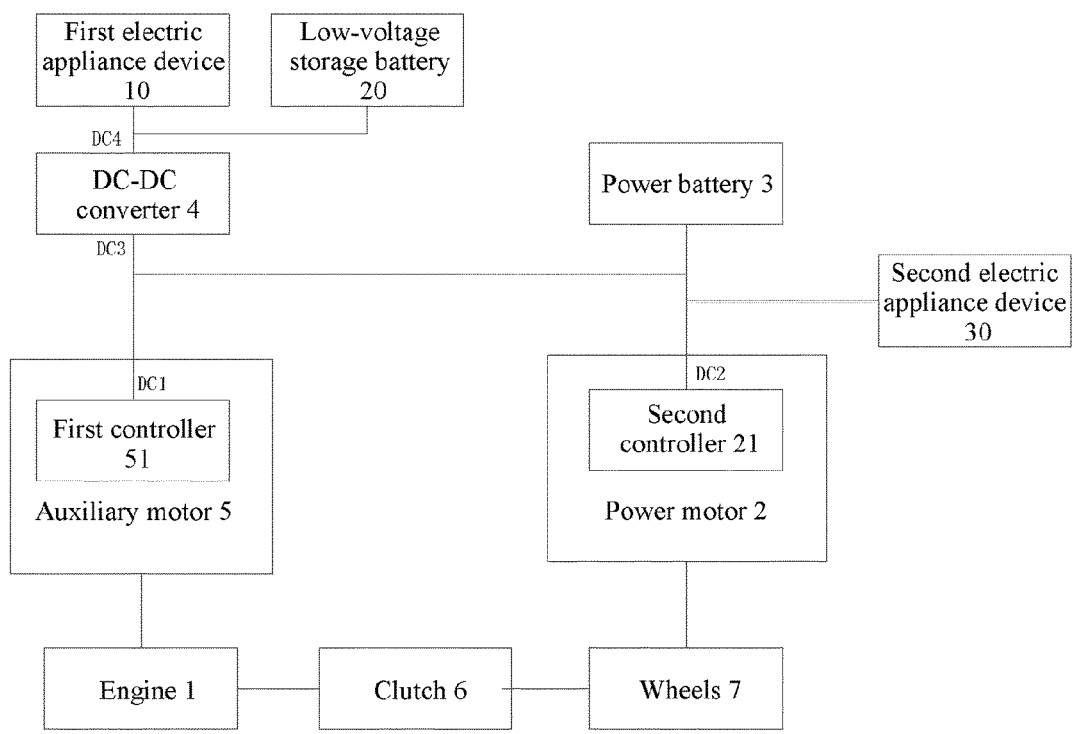
FIG. 3 is a schematic block diagram of a power system of a hybrid power automobile according to an embodiment of the present invention.

As shown in FIG. 1 to FIG. 3, the engine 1 outputs power to wheels 7 of the hybrid power automobile through a clutch 6; and the power motor 2 is configured to output a drive force to the wheels 7 of the hybrid power automobile. To be specific, the power system of this embodiment of the present invention may provide power for normal travelling of the hybrid power automobile through the engine 1 and/or the power motor 2. In some embodiments of the present invention, a power source of the power system may be the engine 1 and the power motor 2. To be specific, either of the engine 1 and the power motor 2 may individually output power to the wheels 7, or the engine 1 and the power motor 2 may simultaneously output power to the wheels 7.

The power battery 3 is configured to supply power to the power motor 2. The auxiliary motor 5 is connected to the engine 1. For example, the auxiliary motor 5 may be connected to the engine 1 through a wheel train side of the engine 1. The auxiliary motor 5 is connected to the power motor 2, the DC-DC converter 4, and the power battery 3, and when performing power generation under driving of the engine 1, the auxiliary motor 5 implements at least one of charging the power battery 3, supplying power to the power motor 2, and supplying power to the DC-DC converter 4. In other words, the engine 1 may drive the auxiliary motor 5 to perform power generation, and electric energy generated by the auxiliary motor 5 may be provided to at least one of the power battery 3, the power motor 2, and the DC-DC converter 4. It should be understood that, the engine 1 may drive, while outputting power to the wheels 7, the auxiliary motor 5 to perform power generation, or may individually drive the auxiliary motor 5 to perform power generation.

Therefore, the power motor 2 and the auxiliary motor 5 respectively serve as a drive motor and a generator in a one-to-one correspondence, and because the auxiliary motor 5 has relatively high power generation power and power generation efficiency at a low speed, power consumption requirements of low-speed travelling may be satisfied, and low-speed electric balance of the entire vehicle and low-speed smoothness of the entire vehicle may be maintained, to improve power performance of the entire vehicle.

In some embodiments, the auxiliary motor 5 may be a belt-driven starter generator (BSG) motor. It should be noted that, the auxiliary motor 5 belongs to a high-voltage motor. For example, a power generation voltage of the auxiliary motor 5 is equivalent to a voltage of the power battery 3, and therefore electric energy generated by the auxiliary motor 5 may directly charge the power battery 3 without voltage conversion, and may further directly supply power to the power motor 2 and/or the DC-DC converter 4. Moreover, the auxiliary motor 5 also belongs to an efficient generator. For example, power generation efficiency above 97% may be achieved provided that the auxiliary motor 5 is driven at an idling rotational speed of the engine 1 to perform power generation.

Additionally, in some embodiments of the present invention, the auxiliary motor 5 may be configured to start the engine 1, that is, the auxiliary motor 5 may have a function of starting the engine 1. For example, when starting the engine 1, the auxiliary motor 5 may drive a crank shaft of the engine 1 to rotate, so that a piston of the engine 1 reaches an ignition location, thereby starting the engine 1. Therefore, the auxiliary motor 5 may implement a function of a starter in a related technology.

As described above, both the engine 1 and the power motor 2 may be configured to drive the wheels 7 of the hybrid power automobile. For example, as shown in FIG. 2a, the engine 1 and the power motor 2 jointly drive same wheels of the hybrid power automobile, for example, a pair of front wheels 71 (including a left front wheel and a right front wheel). For another example, as shown in FIG. 2b, the engine 1 may drive first wheels of the hybrid power automobile, for example, a pair of front wheels 71 (including a left front wheel and a right front wheel), and the power motor 2 may drive second wheels of the hybrid power automobile, for example, a pair of rear wheels 72 (including a left rear wheel and a right rear wheel).

In other words, when the engine 1 and the power motor 2 jointly drive the pair of front wheels 71, a drive force of the power system is output to the pair of front wheels 71, and the entire vehicle may use a drive manner of two-wheel drive; or when the engine 1 drives the pair of front wheels 71 and the power motor 2 drives the pair of rear wheels 72, a drive force of the power system is output to the pair of front wheels 71 and the pair of rear wheels 72, and the entire vehicle may use a drive manner of four-wheel drive.

Further, when the engine 1 and the power motor 2 jointly drive same wheels, as shown in FIG. 2a, the power system of a hybrid power automobile further includes a differential 8, a main reducer 9, and a transmission 90, where the engine 1 outputs power to the first wheels of the hybrid power automobile, for example, the pair of front wheels 71 through the clutch 6, the transmission 90, the main reducer 9, and the differential 8, and the power motor 2 outputs a drive force to the first wheels of the hybrid power automobile, for example, the pair of front wheels 71 through the main reducer 9 and the differential 8. The clutch 6 and the transmission 90 may be integrated.

When the engine 1 drives the first wheels and the power motor 2 drives the second wheels, as shown in FIG. 2b, the power system of a hybrid power automobile further includes a first transmission 91 and a second transmission 92, where the engine 1 outputs power to the first wheels of the hybrid power automobile, for example, the pair of front wheels 71 through the clutch 6 and the first transmission 91, and the power motor 2 outputs a drive force to the second wheels of the hybrid power automobile, for example, the pair of rear wheels 72 through the second transmission 92. The clutch 6 and the first transmission 91 may be integrated.

Further, in some embodiments of the present invention, as shown in FIG. 1 to FIG. 3, the auxiliary motor 5 further includes a first controller 51, the power motor 2 further includes a second controller 21, and the auxiliary motor 5 is connected to the power battery 3 and the DC-DC converter 4 through the first controller 51 and connected to the power motor 2 through the first controller 51 and the second controller 21.

Specifically, the first controller 51 is connected to the second controller 21, the power battery 3, and the DC-DC converter 4, the first controller 51 may have an AC-DC conversion unit, the auxiliary motor 5 may generate an alternating current during power generation, and the AC-DC conversion unit may convert the alternating current generated by the auxiliary motor 5 during power generation into a high-voltage direct current, for example, a 600V high-voltage direct current, so as to implement at least one of charging the power battery 3, supplying power to the power motor 2, and supplying power to the DC-DC converter 4.

The second controller 21 may have a DC-AC conversion unit, the first controller 51 may convert the alternating current generated by the auxiliary motor 5 during power generation into a high-voltage direct current, and the DC-AC conversion unit may then convert the high-voltage direct current into which the first controller 51 converts the alternating current into an alternating current, so as to supply power to the power motor 2.

In other words, as shown in FIG. 3, when the auxiliary motor 5 performs power generation, the auxiliary motor 5 may charge the power battery 3 and/or supply power to the DC-DC converter 4 through the first controller 51. To be specific, the auxiliary motor 5 may implement any one or two of charging the power battery 3 and supplying power to the DC-DC converter 4 through the first controller 51. Moreover, the auxiliary motor 5 may further supply power to the power motor 2 through the first controller 51 and the second controller 21.

Further, as shown in FIG. 1 to FIG. 3, the DC-DC converter 4 is further connected to the power battery 3. The DC-DC converter 4 is further connected to the power motor 2 through the second controller 21.

In some embodiments, as shown in FIG. 3, the first controller 51 has a first direct current end DC1, the second controller 21 has a second direct current end DC2, the DC-DC converter 4 has a third direct current end DC3, and the third direct current end DC3 of the DC-DC converter 4 may be connected to the first direct current end DC1 of the first controller 51, so as to perform DC-DC conversion on a high-voltage direct current output by the first controller 51 through the first direct current end DC1. Moreover, the third direct current end DC3 of the DC-DC converter 4 may be further connected to the power battery 3, and then the first direct current end DC1 of the first controller 51 may be connected to the power battery 3, so that the first controller 51 outputs a high-voltage direct current to the power battery 3 through the first direct current end DC1 to charge the power battery 3. Further, the third direct current end DC3 of the DC-DC converter 4 may be further connected to the second direct current end DC2 of the second controller 21, and then the first direct current end DC1 of the first controller 51 may be connected to the second direct current end DC2 of the second controller 21, so that the first controller 51 outputs a high-voltage direct current to the second controller 21 through the first direct current end DC1 to supply power to the power motor 2.

Further, as shown in FIG. 3, the DC-DC converter 4 is further connected to a first electric appliance device 10 and a low-voltage storage battery 20 in the hybrid power automobile to supply power to the first electric appliance device 10 and the low-voltage storage battery 20, and the low-voltage storage battery 20 is further connected to the first electric appliance device 10.

In some embodiments, as shown in FIG. 3, the DC-DC converter 4 further has a fourth direct current end DC4, and the DC-DC converter 4 may convert a high-voltage direct current output by the power battery 3 and/or a high-voltage direct current output by the auxiliary motor 5 through the first controller 51 into a low-voltage direct current, and output the low-voltage direct current through the fourth direct current end DC4. To be specific, the DC-DC converter 4 may convert any one or two of the high-voltage direct current output by the power battery 3 and the high-voltage direct current output by the auxiliary motor 5 through the first controller 51 into a low-voltage direct current, and output the low-voltage direct current through the fourth direct current end DC4. Further, the fourth direct current end DC4 of the DC-DC converter 4 may be connected to the first electric appliance device 10, so as to supply power to the first electric appliance device 10, where the first electric appliance device 10 may be a low-voltage power consumption device, and includes but is not limited to a lamp and a radio. The fourth direct current end DC4 of the DC-DC converter 4 may be further connected to the low-voltage storage battery 20, so as to charge the low-voltage storage battery 20.

Moreover, the low-voltage storage battery 20 is connected to the first electric appliance device 10, so as to supply power to the first electric appliance device 10. Particularly, when the auxiliary motor 5 stops power generation and the power battery 3 is faulty or has an insufficient power level, the low-voltage storage battery 20 may supply power to the first electric appliance device 10, thereby ensuring low-voltage power consumption of the entire vehicle, ensuring that the entire vehicle may implement travelling in a pure fuel mode, and improving travelling mileage of the entire vehicle.

As described above, the third direct current end DC3 of the DC-DC converter 4 is connected to the first controller 51, the fourth direct current end DC4 of the DC-DC converter 4 is connected to the first electric appliance device 10 and the low-voltage storage battery 20, and when the power motor 2, the second controller 21, and the power battery 3 are faulty, the auxiliary motor 5 may perform power generation to supply power to the first electric appliance device 10 and/or charge the low-voltage storage battery 20 through the first controller 51 and the DC-DC converter 4, so that the hybrid power automobile travels in the pure fuel mode. To be specific, when the power motor 2, the second controller 21, and the power battery 3 are faulty, the auxiliary motor 5 may perform power generation to implement any one or two of supplying power to the first electric appliance device 10 and charging the low-voltage storage battery 20 through the first controller 51 and the DC-DC converter 4, so that the hybrid power automobile travels in the pure fuel mode.

In other words, when the power motor 2, the second controller 21, and the power battery 3 are faulty, the first controller 51 may convert the alternating current generated by the auxiliary motor 5 during power generation into a high-voltage direct current, and the DC-DC converter 4 may convert the high-voltage direct current into which the first controller 51 converts the alternating current into a low-voltage direct current, so as to supply power to the first electric appliance device 10 and/or charge the low-voltage storage battery 20, that is, implement any one or two of supplying power to the first electric appliance device 10 and charging the low-voltage storage battery 20.

Therefore, the auxiliary motor 5 and the DC-DC converter 4 have one individual power supply channel, and when the power motor 2, the second controller 21, and the power battery 3 are faulty, electrically operated drive cannot be implemented. In this case, through the individual power supply channel of the auxiliary motor 5 and the DC-DC converter 4, low-voltage power consumption of the entire vehicle may be ensured, to ensure that the entire vehicle may implement travelling in the pure fuel mode, and improve travelling mileage of the entire vehicle.

Further, with reference to the embodiment in FIG. 3, the first controller 51, the second controller 21, and the power battery 3 are further respectively connected to a second electric appliance device 30 in the hybrid power automobile.

In some embodiments, as shown in FIG. 3, the first direct current end DC1 of the first controller 51 may be connected to the second electric appliance device 30, and when the auxiliary motor 5 performs power generation, the auxiliary motor 5 may directly supply power to the second electric appliance device 30 through the first controller 51. In other words, the AC-DC conversion unit of the first controller 51 may further convert the alternating current generated by the auxiliary motor 5 during power generation into a high-voltage direct current, and directly supply power to the second electric appliance device 30.

The power battery 3 may be further connected to the second electric appliance device 30, so as to supply power to the second electric appliance device 30. To be specific, the high-voltage direct current output by the power battery 3 may be directly supplied to the second electric appliance device 30.

The second electric appliance device 30 may be a high-voltage electric appliance device, and may include but is not limited to an air conditioner compressor and a positive temperature coefficient (PTC) heater.

As described above, power generation through the auxiliary motor 5 may be implemented to charge the power battery 3, supply power the power motor 2, or supply power to the first electric appliance device 10 and the second electric appliance device 30. Moreover, the power battery 3 may supply power to the power motor 2 or supply power to the second electric appliance device 30 through the second controller 21, or may supply power to the first electric appliance device 10 and/or the low-voltage storage battery 20 through the DC-DC converter 4. Therefore, power supply manners of the entire vehicle are enriched, power consumption requirements of the entire vehicle under different working conditions are satisfied, and performance of the entire vehicle is improved.

It should be noted that, in this embodiment of the present invention, a low voltage may be a voltage of 12 V or 24 V, and a high voltage may be a voltage of 600 V, but this embodiment is not limited thereto.

Therefore, in the power system of a hybrid power automobile of this embodiment of the present invention, the engine is enabled not to participate in drive at a low speed, and therefore the clutch is not used, thereby reducing abrasion or slip friction of the clutch, reducing an unsmooth feeling, and improving comfortableness; and at a low speed, the engine is enabled to operate in an economical area, to perform only power generation but does not perform drive, thereby reducing fuel consumption, reducing noise of the engine, maintaining low-speed electric balance and low-speed smoothness of the entire vehicle, and improving performance of the entire vehicle. Moreover, the auxiliary motor can directly charge the power battery, may also supply power to a low-voltage device, for example, the low-voltage storage battery or the first electric appliance device, and may further serve as a starter.

A specific embodiment of a power system of a hybrid power automobile is described in detail below with reference to FIG. 4, and the embodiment is applicable to a power system in which an engine 1 and a power motor 2 jointly drive same wheels, that is, a two-wheel drive hybrid power automobile. It should be noted that, the embodiment mainly describes a specific transmission structure between the engine 1, the power motor 2, and wheels 7, particularly a structure of the transmission 90 in FIG. 2a, and remaining parts are basically the same as those of the embodiment in FIG. 1 and FIG. 3. Details are not described herein again.

It should be further noted that, a plurality of input shafts, a plurality of output shafts, a motor power shaft 931, related gears on the shafts, gear change elements, and the like in the following embodiments may be used to form the transmission 90 in FIG. 2a.

Figure 4:
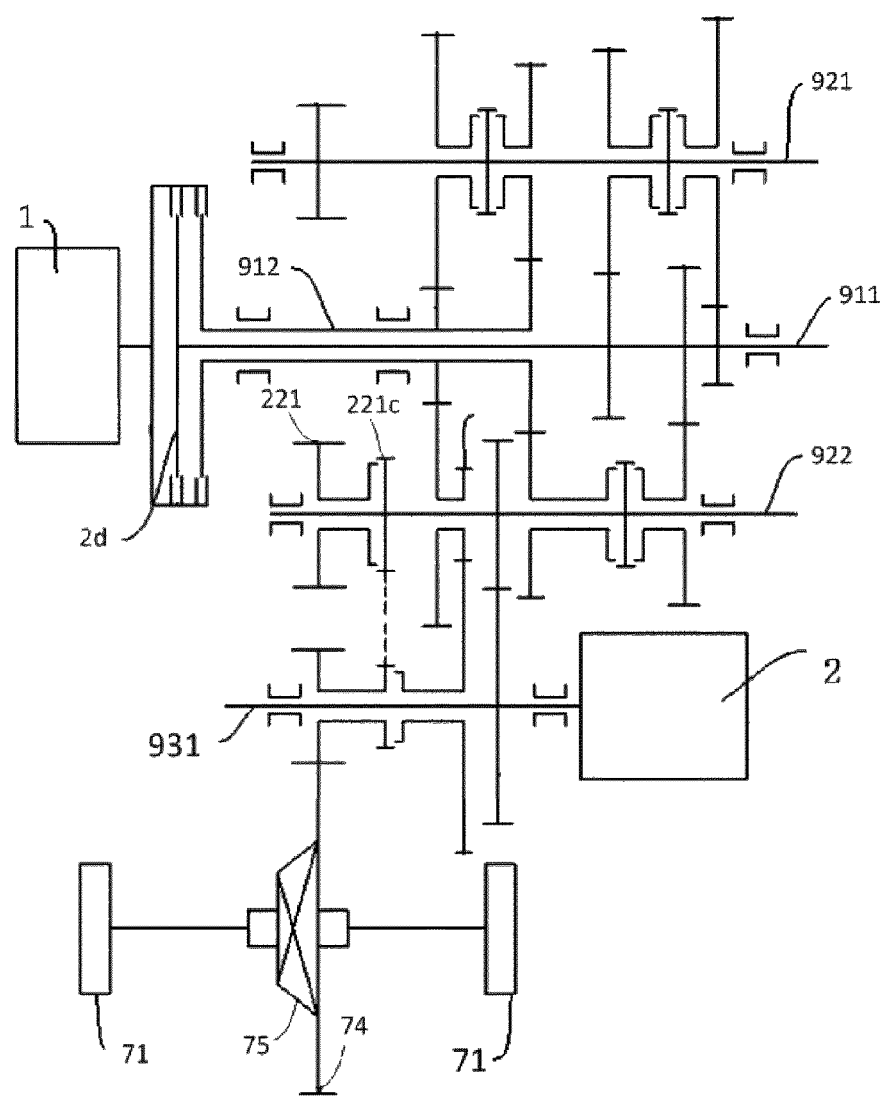
FIG. 4 is a schematic diagram of a transmission structure between an engine and corresponding wheels according to an embodiment of the present invention.

In some embodiments, as shown in FIG. 1, FIG. 3, and FIG. 4, a power system of a hybrid power automobile mainly includes an engine 1, a power motor 2, a power battery 3, a DC-DC converter 4, an auxiliary motor 5, a plurality of input shafts (for example, a first input shaft 911 and a second input shaft 912), a plurality of output shafts (for example, a first output shaft 921 and a second output shaft 922), and a motor power shaft 931, related gears on the shafts, and gear change elements (for example, a synchronizer).

As shown in FIG. 4, the engine 1 outputs power to wheels 7 of the hybrid power automobile through a clutch 6, for example, a double clutch 2d in an example in FIG. 4. When power is transferred between the engine 1 and the input shafts, the engine 1 is set to be selectively bonded to at least one of the plurality of input shafts through the double clutch 2d. In other words, when the engine 1 transmits power to the input shafts, the engine 1 can be selectively bonded to one of the plurality of input shafts to transmit power, or the engine 1 can be selectively bonded to two or more of the plurality of input shafts simultaneously to transmit power.

For example, in the example in FIG. 4, the plurality of input shafts may include two input shafts, namely, the first input shaft 911 and the second input shaft 912, the second input shaft 912 may be coaxially sleeved on the first input shaft 911, and the engine 1 can be selectively bonded to one of the first input shaft 911 and the second input shaft 912 through the double clutch 2d to transmit power. Alternatively, in particular, the engine 1 can be further bonded to the first input shaft 911 and the second input shaft 912 simultaneously to transmit power. Certainly, it should be understood that, the engine 1 may be further disconnected from the first input shaft 911 and the second input shaft 912 simultaneously.

The plurality of output shafts may include two output shafts, namely, the first output shaft 921 and the second output shaft 922, and the first output shaft 921 and the second output shaft 922 are respectively disposed parallel to the first input shaft 911.

Transmission may be performed between an input shaft and an output shaft through a shift gear pair. For example, a driving shift gear is disposed on each input shaft. To be specific, a driving shift gear is disposed on each of the first input shaft 911 and the second input shaft 912. A driven shift gear is disposed on each output shaft. To be specific, a driven shift gear is disposed on each of the first output shaft 921 and the second output shaft 922. Driven shift gears are correspondingly meshed with driving shift gears, thereby forming a plurality of gear pairs whose speed ratios are different.

In some embodiments of the present invention, six-gear transmission may be used between the input shaft and the output shaft, that is, there are a first-gear gear pair, a second-gear gear pair, a third-gear gear pair, a fourth-gear gear pair, a fifth-gear gear pair, and a sixth-gear gear pair. However, the present invention is not limited thereto. A person of ordinary skill in the art may adaptively increase or reduce a quantity of shift gear pairs according to transmission needs, and the present invention is not limited to the six-gear transmission shown in this embodiment of the present invention.

As shown in FIG. 4, the motor power shaft 931 is set to be capable of being linked to one of the plurality of output shafts (for example, the first output shaft 921 and the second output shaft 922), and through linkage between the motor power shaft 931 and the one of the output shafts, power may be transferred between the motor power shaft 931 and the one of the output shafts. For example, power passing through the output shaft (for example, power output from the engine 1) may be output to the motor power shaft 931, or power passing through the motor power shaft 931 (for example, power output from the power motor 2) may be output to the output shaft.

It should be noted that, the "link" may be understood as that multiple parts (for example, two parts) move in a linkage manner. Using an example in which two parts are linked, when one part moves, the other part moves together.

For example, in some embodiments of the present invention, that a gear is linked to a shaft may be understood as that when the gear rotates, the linked shaft also rotates, or when the shaft rotates, the linked gear also rotates.

For another example, that a shaft is linked to a shaft may be understood as that when one shaft rotates, the other linked shaft also rotates.

For still another example, that a gear is linked to a gear may be understood as that when one gear rotates, the other linked gear also rotates.

Unless otherwise specified, the descriptions about "linkage" below in the present invention should be understood in this way.

The power motor 2 is set to be capable of being linked to the motor power shaft 931. For example, the power motor 2 may output generated power to the motor power shaft 931, thereby outputting a drive force to the wheels 7 of the hybrid power automobile through the motor power shaft 931.

It should be noted that, in the description of the present invention, the motor power shaft 931 may be a motor shaft of the power motor 2. Certainly, it may be understood that, the motor power shaft 931 and the motor shaft of the power motor 2 may alternatively be two individual shafts.

In some embodiments, as shown in FIG. 4, an output portion 221 may differentially rotate relative to the one (for example, the second output shaft 922) of the output shafts. In other words, the output portion 221 and the output shaft can independently rotate at different rotational speeds.

Further, the output portion 221 is set to be selectively bonded to the one of the output shafts to rotate in synchronization with the output shaft. In other words, the output portion 221 can differentially rotate or synchronously rotate relative to the output shaft. In short, relative to the one of the output shafts, the output portion 221 may be bonded to synchronously rotate, and certainly may alternatively be disconnected to differentially rotate.

As shown in FIG. 4, the output portion 221 may be freely sleeved on the one of the output shafts, but is not limited thereto. For example, in the example in FIG. 4, the output portion 221 is freely sleeved on the second output shaft 922, that is, the output portion 221 and the second output shaft 922 can differentially rotate at different rotational speeds.

As described above, the output portion 221 may rotate in synchronization with the one of the output shafts. For example, a corresponding synchronizer may be added as required to implement a function of synchronization between the output portion 221 and the output shaft. The synchronizer may be an output portion synchronizer 221c, and the output portion synchronizer 221c is set to synchronize the output portion 221 and the one of the output shafts.

In some embodiments, the power motor 2 is configured to output a drive force to the wheels 7 of the hybrid power automobile, and the engine 1 and the power motor 2 jointly drive same wheels of the hybrid power automobile. With reference to the example in FIG. 4, a differential 75 of the vehicle may be arranged between a pair of front wheels 71 or between a pair of rear wheels 72. In some examples of the present invention, when the power motor 2 drives the pair of front wheels 71, the differential 75 may be located between the pair of front wheels 71.

A function of the differential 75 is to enable left and right drive wheels to roll at different angular speeds when the vehicle is cornering or is travelling on an uneven road surface, so as to ensure that the two drive wheels perform pure roll motion on a ground surface. A main reducer driven gear 74 of the main reducer 9 is disposed on the differential 75. For example, the main reducer driven gear 74 may be arranged on a casing of the differential 75. The main reducer driven gear 74 may be a bevel gear, but is not limited thereto.

In some embodiments, as shown in FIG. 1, the power battery 3 is configured to supply power to the power motor 2. The auxiliary motor 5 is connected to the engine 1, the auxiliary motor 5 is further connected to the power motor 2, the DC-DC converter 4, and the power battery 3, and when performing power generation under driving of the engine 1, the auxiliary motor 5 implements at least one of charging the power battery 3, supplying power to the power motor 2, and supplying power to the DC-DC converter 4.

Another specific embodiment of a power system of a hybrid power automobile is described in detail below with reference to FIG. 5, and the embodiment is similarly applicable to a power system in which an engine 1 and a power motor 2 jointly drive same wheels, that is, a two-wheel drive hybrid power automobile. It should be noted that, the embodiment mainly describes a specific transmission structure between the engine 1, the power motor 2, and wheels 7, particularly a structure of the transmission 90 in FIG. 2a, and remaining parts are basically the same as those of the embodiment in FIG. 1 and FIG. 3. Details are not described herein again.

It should be further noted that, a plurality of input shafts, a plurality of output shafts, a motor power shaft 931, related gears on the shafts, gear change elements, and the like in the following embodiments may be used to form the transmission 90 in FIG. 2a.

Figure 5:
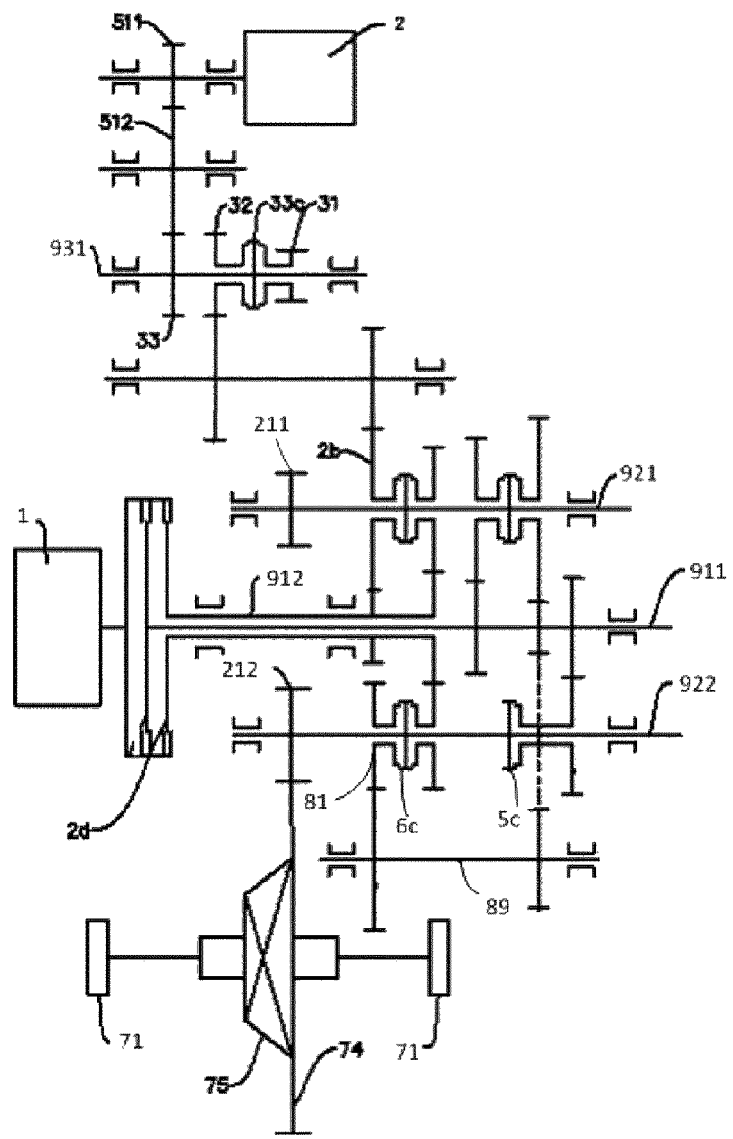
FIG. 5 is a schematic diagram of a transmission structure between an engine and corresponding wheels according to another embodiment of the present invention.

In some embodiments, as shown in FIG. 1, FIG. 3, and FIG. 5, a power system of a hybrid power automobile mainly includes an engine 1, a power motor 2, a power battery 3, a DC-DC converter 4, an auxiliary motor 5, a plurality of input shafts (for example, a first input shaft 911 and a second input shaft 912), a plurality of output shafts (for example, a first output shaft 921 and a second output shaft 922), and a motor power shaft 931, related gears on the shafts, and gear change elements (for example, a synchronizer).

As shown in FIG. 5, the engine 1 outputs power to wheels 7 of the hybrid power automobile through a clutch 6, for example, a double clutch 2d in an example in FIG. 4. When power is transferred between the engine 1 and the input shafts, the engine 1 is set to be selectively bonded to at least one of the plurality of input shafts through the double clutch 2d. In other words, when the engine 1 transmits power to the input shafts, the engine 1 can be selectively bonded to one of the plurality of input shafts to transmit power, or the engine 1 can be selectively bonded to two or more of the plurality of input shafts simultaneously to transmit power.

For example, in the example in FIG. 5, the plurality of input shafts may include two input shafts, namely, the first input shaft 911 and the second input shaft 912, the second input shaft 912 is coaxially sleeved on the first input shaft 911, and the engine 1 can be selectively bonded to one of the first input shaft 911 and the second input shaft 912 through the double clutch 2d to transmit power. Alternatively, in particular, the engine 1 can be further bonded to the first input shaft 911 and the second input shaft 912 simultaneously to transmit power. Certainly, it should be understood that, the engine 1 may be further disconnected from the first input shaft 911 and the second input shaft 912 simultaneously.

The plurality of output shafts may include two output shafts, namely, the first output shaft 921 and the second output shaft 922, and the first output shaft 921 and the second output shaft 922 are disposed parallel to the first input shaft 911.

Transmission may be performed between an input shaft and an output shaft through a shift gear pair. For example, a driving shift gear is disposed on each input shaft. To be specific, a driving shift gear is disposed on each of the first input shaft 911 and the second input shaft 912. A driven shift gear is disposed on each output shaft. To be specific, a driven shift gear is disposed on each of the first output shaft 921 and the second output shaft 922. Driven shift gears are correspondingly meshed with driving shift gears, thereby forming a plurality of gear pairs whose speed ratios are different.

In some embodiments of the present invention, six-gear transmission may be used between the input shaft and the output shaft, that is, there are a first-gear gear pair, a second-gear gear pair, a third-gear gear pair, a fourth-gear gear pair, a fifth-gear gear pair, and a sixth-gear gear pair. However, the present invention is not limited thereto. A person of ordinary skill in the art may adaptively increase or reduce a quantity of shift gear pairs according to transmission needs, and the present invention is not limited to the six-gear transmission shown in this embodiment of the present invention.

As shown in FIG. 5, at least one reverse-gear output gear 81 is freely sleeved on one of the output shafts (for example, the first output shaft 921 and the second output shaft 922), and reverse-gear synchronizers (for example, a fifth-gear synchronizer 5c and a sixth-gear synchronizer 6c) used to bond the reverse-gear output gear 81 are further disposed on the output shaft. In other words, a reverse-gear synchronizer synchronizes the corresponding reverse-gear output gear 81 and the output shaft, so that the output shaft and the reverse-gear output gear 81 that is synchronized by the reverse-gear synchronizer can synchronously rotate, and then reverse-gear power can be output from the output shaft.

In some embodiments, as shown in FIG. 5, there is one reverse-gear output gear 81, and the one reverse-gear output gear 81 may be freely sleeved on the second output shaft 922. However, the present invention is not limited thereto. In some other embodiments, there may alternatively be two reverse-gear output gears 81, and the two reverse-gear output gears 81 are simultaneously freely sleeved on the second output shaft 922. Certainly, it may be understood that, there may alternatively be three or more reverse-gear output gears 81.

A reverse-gear shaft 89 is set to be linked to one of the input shafts (for example, the first input shaft 911 and the second input shaft 912) and is further linked to the at least one reverse-gear output gear 81. For example, power passing through the one of the input shafts may be transferred to the reverse-gear output gear 81 through the reverse-gear shaft 89, and therefore reverse-gear power can be output from the reverse-gear output gear 81. In an example of the present invention, each reverse-gear output gear 81 is freely sleeved on the second output shaft 922, and the reverse-gear shaft 89 is linked to the first input shaft 911. For example, reverse-gear power output by the engine 1 may pass through the first input shaft 911 and the reverse-gear shaft 89 and then be output to the reverse-gear output gear 81.

The motor power shaft 931 is described in detail below. A first motor power shaft gear 31 and a second motor power shaft gear 32 are freely sleeved on the motor power shaft 931. The first motor power shaft gear 31 may be in meshed transmission with the main reducer driven gear 74, so as to transmit a drive force to the wheels 7 of the hybrid power automobile.

The second motor power shaft gear 32 is set to be linked to one of the driven shift gears. When the hybrid power automobile having the power system according to this embodiment of the present invention is under some working conditions, power output by the power source may be transferred between the second motor power shaft gear 32 and the driven shift gear linked to the second motor power shaft gear 32. In this case, the second motor power shaft gear 32 and the driven shift gear are linked. For example, the second motor power shaft gear 32 and a second-gear driven gear 2b are linked, and the second motor power shaft gear 32 and the second-gear driven gear 2b may be directly meshed or be in indirect transmission through an intermediate transmission component.

Further, a motor power shaft synchronizer 33c is further disposed on the motor power shaft 931, the motor power shaft synchronizer 33c is located between the first motor power shaft gear 31 and the second motor power shaft gear 32, and the motor power shaft synchronizer 33c may selectively bond the first motor power shaft gear 31 or the second motor power shaft gear 32 and the motor power shaft 931. For example, in the example in FIG. 5, a bonding sleeve of the motor power shaft synchronizer 33c may be bonded to the second motor power shaft gear 32 if the bonding sleeve moves to the left, and may be bonded to the first motor power shaft gear 31 if the bonding sleeve moves to the right.

The power motor 2 is set to be capable of being linked to the motor power shaft 931. For example, the power motor 2 may output generated power to the motor power shaft 931, thereby outputting a drive force to the wheels 7 of the hybrid power automobile through the motor power shaft 931.

The first motor power shaft gear 31 is meshed with the main reducer driven gear 74, and therefore the power motor 2 may be bonded to the first motor power shaft gear 31 through the motor power shaft synchronizer 33c to output the generated power directly from the first motor power shaft gear 31, thereby shortening a transmission chain, reducing intermediate transmission components, and improving transmission efficiency.

Second, a transmission manner of the motor power shaft 931 and of the power motor 2 is described in detail with reference to a specific embodiment.

In some embodiments, as shown in FIG. 5, a third motor power shaft gear 33 is further fixedly disposed on the motor power shaft 931, and the power motor 2 is set to be in direct meshed transmission or indirect transmission with the third motor power shaft gear 33.

Further, a first motor gear 511 is disposed on a motor shaft of the power motor 2, and the first motor gear 511 is in transmission with the third motor power shaft gear 33 through an intermediate gear 512. For another example, the power motor 2 may alternatively be coaxially connected to the motor power shaft 931.

In some embodiments, the power motor 2 is configured to output a drive force to the wheels 7 of the hybrid power automobile, and the engine 1 and the power motor 2 jointly drive same wheels of the hybrid power automobile. With reference to the example in FIG. 5, a differential 75 of the vehicle may be arranged between a pair of front wheels 71 or between a pair of rear wheels 72. In some examples of the present invention, when the power motor 2 drives the pair of front wheels 71, the differential 75 may be located between the pair of front wheels 71.

A function of the differential 75 is to enable left and right drive wheels to roll at different angular speeds when the vehicle is cornering or is travelling on an uneven road surface, so as to ensure that the two drive wheels perform pure roll motion on a ground surface. A main reducer driven gear 74 of the main reducer 9 is disposed on the differential 75. For example, the main reducer driven gear 74 may be arranged on a casing of the differential 75. The main reducer driven gear 74 may be a bevel gear, but is not limited thereto.

Further, a first output shaft output gear 211 is fixedly disposed on the first output shaft 921, the first output shaft output gear 211 rotates in synchronization with the first output shaft 921, and the first output shaft output gear 211 is in meshed transmission with the main reducer driven gear 74, so that power passing through the first output shaft 921 can be transferred to the main reducer driven gear 74 and the differential 75 from the first output shaft output gear 211.

Similarly, a second output shaft output gear 212 is fixedly disposed on the second output shaft 922, the second output shaft output gear 212 rotates in synchronization with the second output shaft 922, and the second output shaft output gear 212 is in meshed transmission with the main reducer driven gear 74, so that power passing through the second output shaft 922 can be transferred to the main reducer driven gear 74 and the differential 75 from the second output shaft output gear 212.

Similarly, the first motor power shaft gear 31 may be configured to output the power passing through the motor power shaft 931, and therefore the first motor power shaft gear 31 is similarly in meshed transmission with the main reducer driven gear 74.

In some embodiments, as shown in FIG. 1, the power battery 3 is configured to supply power to the power motor 2. The auxiliary motor 5 is connected to the engine 1, the auxiliary motor 5 is further connected to the power motor 2, the DC-DC converter 4, and the power battery 3, and when performing power generation under driving of the engine 1, the auxiliary motor 5 implements at least one of charging the power battery 3, supplying power to the power motor 2, and supplying power to the DC-DC converter 4.

Figure 6:
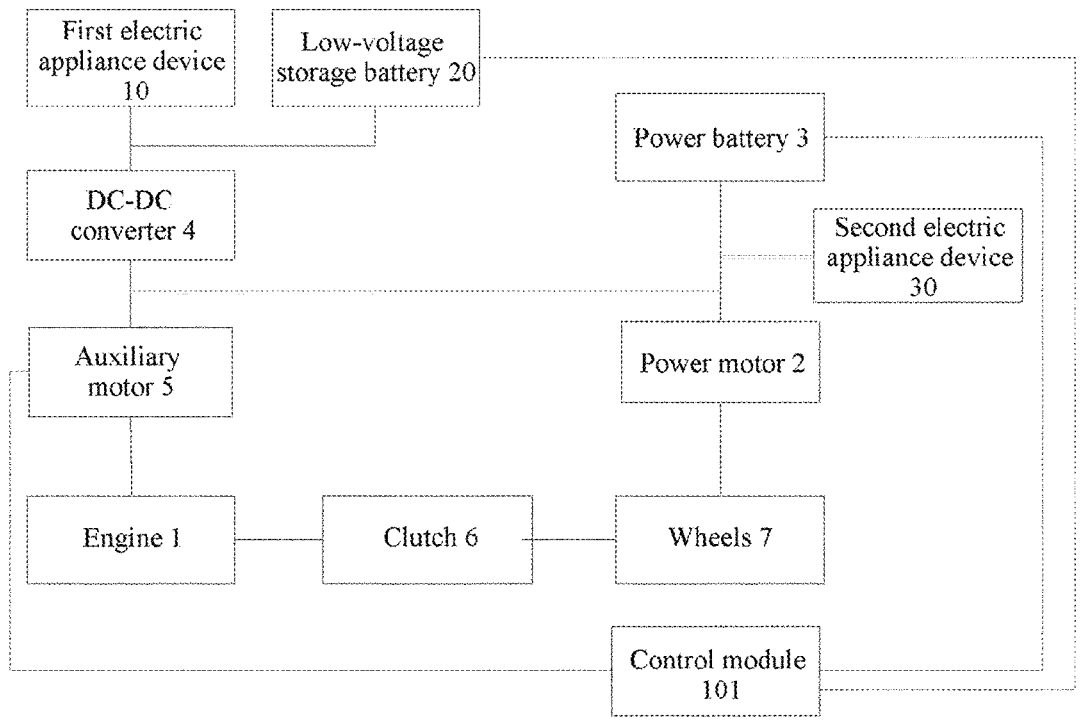
FIG. 6 is a schematic block diagram of a power system of a hybrid power automobile according to another embodiment of the present invention.

Further, as shown in FIG. 6, the power system of a hybrid power automobile further includes a control module 101, and the control module 101 is configured to control the power system of the hybrid power automobile. It should be understood that, the control module 101 may be integration of controllers having a control function in the hybrid power automobile, for example, may be integration of a vehicle controller of the hybrid power automobile, the first controller 51 and the second controller 21 in the embodiment in FIG. 3, and the like, but is not limited thereto. A control method performed by the control module 101 is described in detail below.

Embodiment 1

In some embodiments of the present invention, the control module 101 is configured to obtain an SOC (state of charge, also referred to as remaining power level) value of the power battery 3, an SOC value of the low-voltage storage battery 20, and a maximum allowed power generation power of the auxiliary motor 5, and determine, according to the SOC value of the power battery 3, the SOC value of the low-voltage storage battery 20, and the maximum allowed power generation power of the auxiliary motor 5, whether the auxiliary motor 5 charges the power battery 3 and/or the low-voltage storage battery 20.

It should be noted that, the SOC value of the power battery 3 and the SOC value of the low-voltage storage battery 20 may be collected through a battery management system of the hybrid power automobile, and therefore the battery management system sends the SOC value of the power battery 3 and the SOC value of the low-voltage storage battery 20 that are collected to the control module 101, so that the control module 101 obtains the SOC value of the power battery 3 and the SOC value of the low-voltage storage battery 20.

Therefore, by charging the power battery, power consumption requirements of the power motor and the high-voltage electric appliance device may be ensured, and further it is ensured that the power motor drives the entire vehicle to normally travel; and by charging the low-voltage storage battery, power consumption requirements of the low-voltage electric appliance device may be ensured, and when the auxiliary motor stops power generation and the power battery is faulty or has an insufficient power level, low-voltage power supply of the entire vehicle may be implemented through the low-voltage storage battery, and further it is ensured that the entire vehicle may travel in the pure fuel mode, thereby improving travelling mileage of the entire vehicle.

According to a specific example of the present invention, the maximum allowed power generation power of the auxiliary motor 5 is related to performance parameters and the like of the auxiliary motor 5 and the engine 1. In other words, the maximum allowed power generation power of the auxiliary motor 5 may be preset according to the performance parameters and the like of the auxiliary motor 5 and the engine 1.

Further, according to an embodiment of the present invention, the control module 101 is further configured to: when the SOC value of the power battery 3 is less than a first preset SOC value and the SOC value of the low-voltage storage battery 20 is greater than or equal to a second preset SOC value, control the engine 1 to drive the auxiliary motor 5 to perform power generation to charge the power battery 3.

It should be understood that, the first preset SOC value may be a charging limit value of the power battery 3, the second preset SOC value may be a charging limit value of the low-voltage storage battery 20, and the first preset SOC value and the second preset SOC value may be independently set according to performance of the batteries, and may be a same value or different values.

Specifically, after obtaining the SOC value of the power battery 3 and the SOC value of the low-voltage storage battery 20, the control module 101 may determine whether the SOC value of the power battery 3 is less than the first preset SOC value, and determine whether the SOC value of the low-voltage storage battery 20 is less than the second preset SOC value. If the SOC value of the power battery 3 is less than the first preset SOC value and the SOC value of the low-voltage storage battery 20 is greater than or equal to the second preset SOC value, it indicates that the power battery 3 has a relatively low remaining power level and needs to be charged, and the low-voltage storage battery 20 has a relatively high remaining power level and does not need to be charged. In this case, the control module 101 controls the engine 1 to drive the auxiliary motor 5 to perform power generation to charge the power battery 3.

As described above, the auxiliary motor 5 belongs to a high-voltage motor. For example, a power generation voltage of the auxiliary motor 5 is equivalent to a voltage of the power battery 3, and therefore electric energy generated by the auxiliary motor 5 may directly charge the power battery 3 without voltage conversion.

The control module 101 is further configured to: when the SOC value of the power battery 3 is greater than or equal to the first preset SOC value and the SOC value of the low-voltage storage battery 20 is less than the second preset SOC value, control the engine 1 to drive the auxiliary motor 5 to perform power generation to charge the low-voltage storage battery 20 through the DC-DC converter 4.

To be specific, if the SOC value of the power battery 3 is greater than or equal to the first preset SOC value and the SOC value of the low-voltage storage battery 20 is less than the second preset SOC value, it indicates the power battery 3 has a relatively high remaining power level and does not need to be charged, and the low-voltage storage battery 20 has a relatively low remaining power level and needs to be charged. In this case, the control module 101 controls the engine 1 to drive the auxiliary motor 5 to perform power generation to charge the low-voltage storage battery 20 through the DC-DC converter 4.

As described above, the auxiliary motor 5 belongs to a high-voltage motor. For example, a power generation voltage of the auxiliary motor 5 is equivalent to a voltage of the power battery 3, and therefore electric energy generated by the auxiliary motor 5 needs to be subjected to voltage conversion through the DC-DC converter 4 and then charge the low-voltage storage battery 20.

Furthermore, according to an embodiment of the present invention, the control module 101 is further configured to: when the SOC value of the power battery 3 is less than the first preset SOC value and the SOC value of the low-voltage storage battery 20 is less than the second preset SOC value, obtain a charging power of the power battery 3 according to the SOC value of the power battery 3, and obtain a charging power of the low-voltage storage battery 20 according to the SOC value of the low-voltage storage battery 20; and when a sum of the charging power of the power battery 3 and the charging power of the low-voltage storage battery 20 is greater than the maximum allowed power generation power of the auxiliary motor 5, control the engine 1 to drive the auxiliary motor 5 to perform power generation to charge the low-voltage storage battery 20 through the DC-DC converter 4.

Moreover, the control module 101 is further configured to: when the sum of the charging power of the power battery 3 and the charging power of the low-voltage storage battery 20 is less than or equal to the maximum allowed power generation power of the auxiliary motor 5, control the engine 1 to drive the auxiliary motor 5 to perform power generation to charge the power battery 3, and to simultaneously charge the low-voltage storage battery 20 through the DC-DC converter 4.

To be specific, if the SOC value of the power battery 3 is less than the first preset SOC value and the SOC value of the low-voltage storage battery 20 is less than the second preset SOC value, it indicates that the power battery 3 and the low-voltage storage battery 20 each have a relatively low remaining power level, and need to be charged. In this case, the control module 101 calculates the charging power of the power battery 3 according to the SOC value of the power battery 3, calculates the charging power of the low-voltage storage battery 20 according to the SOC value of the low-voltage storage battery 20, and further determines whether the sum of the charging power of the power battery 3 and the charging power of the low-voltage storage battery

20 is greater than the maximum allowed power generation power of the auxiliary motor 5.

If the sum of the charging power of the power battery 3 and the charging power of the low-voltage storage battery 20 is greater than the maximum allowed power generation power of the auxiliary motor 5, it indicates that the electric energy that can be generated by the auxiliary motor 5 is insufficient to simultaneously charge the two batteries. In this case, the low-voltage storage battery 20 is preferentially charged, that is, the engine 1 is controlled to drive the auxiliary motor 5 to perform power generation to charge the low-voltage storage battery 20 through the DC-DC converter 4.

If the sum of the charging power of the power battery 3 and the charging power of the low-voltage storage battery 20 is less than or equal to the maximum allowed power generation power of the auxiliary motor 5, it indicates that the electric energy that can be generated by the auxiliary motor 5 can simultaneously charge the two batteries. In this case, the power battery 3 and the low-voltage storage battery 20 are simultaneously charged, that is, the engine 1 is controlled to drive the auxiliary motor 5 to perform power generation to charge the power battery 3, and simultaneously charge the low-voltage storage battery 20 through the DC-DC converter 4.

Therefore, by preferentially charging the low-voltage storage battery, power consumption requirements of the low-voltage electric appliance device may be preferentially ensured, and further it may be ensured that the entire vehicle travels in the pure fuel mode when the power battery has an insufficient power level, thereby improving travelling mileage of the entire vehicle.

Certainly, it should be understood that, when the SOC value of the power battery 3 is greater than or equal to the first preset SOC value and the SOC value of the low-voltage storage battery 20 is greater than or equal to the second preset SOC value, it indicates that the power battery 3 and the low-voltage storage battery 20 each have a relatively high remaining power level, and do not need to be charged. In this case, the power battery 3 and the low-voltage storage battery 20 may be not charged.

To sum up, according to the power system of a hybrid power automobile proposed in this embodiment of the present invention, the engine outputs power to the wheels of the hybrid power automobile through the clutch, the power motor outputs a drive force to the wheels of the hybrid power automobile, the power battery supplies power to the power motor, and when performing power generation under driving of the engine, the auxiliary motor implements at least one of charging the power battery, supplying power to the power motor, and supplying power to the DC-DC converter, and the control module determines, according to the SOC value of the power battery, the SOC value of the low-voltage storage battery and the maximum allowed power generation power of the auxiliary motor, whether the auxiliary motor charges the power battery and/or the low-voltage storage battery. Therefore, the engine is enabled not to participate in drive at a low speed, and therefore the clutch is not used, thereby reducing abrasion or slip friction of the clutch, reducing an unsmooth feeling, and improving comfortableness; and at a low speed, the engine is enabled to operate in an economical area, to perform only power generation but does not perform drive, thereby reducing fuel consumption, reducing noise of the engine, maintaining low-speed electric balance and low-speed smoothness of the entire vehicle, and improving performance of the entire vehicle. Moreover, the system not only may charge the power battery, but also may charge the low-voltage storage battery. Therefore, power consumption requirements of the power motor and the high-voltage electric appliance device may be ensured, and further it is ensured that the power motor drives the entire vehicle to normally travel; and power consumption requirements of the low-voltage electric appliance device may be ensured, and further when the auxiliary motor stops power generation and the power battery is faulty or has an insufficient power level, it may be ensured that the entire vehicle may travel in the pure fuel mode, thereby improving travelling mileage of the entire vehicle.

Embodiment 2

In some embodiments of the present invention, the control module 101 is configured to obtain an SOC (state of charge, also referred to as remaining power level) value of the power battery 3 and a speed V of the hybrid power automobile; and control, according to the SOC value of the power battery 3 and the speed V of the hybrid power automobile, the auxiliary motor 5 to enter a power generation power adjustment mode, so that the engine 1 runs in a preset optimal economical area. The power generation power adjustment mode is a mode of adjusting a power generation power of the engine, and in the power generation power adjustment mode, the power generation power of the auxiliary motor 5 may be adjusted by controlling the engine 1 to drive the auxiliary motor 5 to perform power generation.

It should be noted that, the SOC value of the power battery 3 may be collected through a battery management system of the hybrid power automobile, and therefore the battery management system sends the collected SOC value of the power battery 3 to the control module 101, so that the control module 101 obtains the SOC value of the power battery 3.

Figure 7:
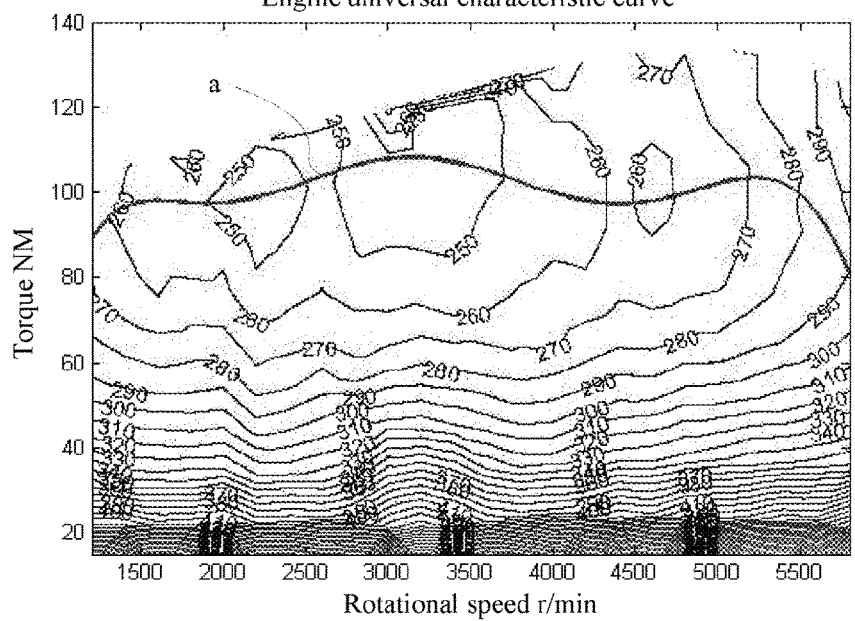
FIG. 7 is a schematic diagram of an engine universal characteristic curve according to an embodiment of the present invention.

It should be further noted that, the preset optimal economical area of the engine 1 may be determined with reference to a diagram of an engine universal characteristic curve. FIG. 7 shows an example of the diagram of the engine universal characteristic curve, where a vertical coordinate indicates an output torque of the engine 1, a horizontal coordinate indicates a rotational speed of the engine 1, and a curve a is a fuel economy curve of the engine 1. An area corresponding to the fuel economy curve is the optimal economical area of the engine. To be specific, when a torsional moment and a torque of the engine 1 are located on an optimal fuel economy curve of the engine, the engine is located in the optimal economical area. Therefore, in this embodiment of the present invention, the control module 101 may enable, by controlling the rotational speed and the output torque of the engine 1 to fall on the fuel economy curve of the engine, for example, the curve a, the engine 1 to run in the preset optimal economical area.

Specifically, when the hybrid power automobile is travelling, the engine 1 may output power to the wheels 7 of the hybrid power automobile through the clutch 6, and the engine 1 may further drive the auxiliary motor 5 to perform power generation. Therefore, the output power of the engine mainly includes two parts, one part is output to the auxiliary motor 5, that is, the power generation power for driving the auxiliary motor 5 to perform power generation, and the other part is output to the wheels 7, that is, the drive power for driving the wheels 7.

When the engine 1 drives the auxiliary motor 5 to perform power generation, the control module 101 may first obtain the SOC value of the power battery 3 and the speed of the hybrid power automobile, and then control, according to the SOC value of the power battery 3 and the speed of the hybrid power automobile, the auxiliary motor 5 to enter the power generation power adjustment mode, so that the engine 1 operates in the preset optimal economical area. In the power generation power adjustment mode, the control module 101 may adjust the power generation power of the auxiliary motor 5 on the premise of enabling the engine 1 to operate in the preset optimal economical area.

Therefore, the engine 1 is enabled to operate in the preset optimal economical area, and because the engine 1 has lowest fuel consumption and highest fuel economy in the preset optimal economical area, fuel consumption of the engine 1 may be reduced, noise of the engine 1 may be reduced, and running economy of the entire vehicle may be improved. Moreover, because the auxiliary motor 5 has relatively high power generation power and power generation efficiency at a low speed, power consumption requirements of low-speed travelling may be satisfied, and low-speed electric balance of the entire vehicle and low-speed smoothness of the entire vehicle may be maintained, to improve power performance of the entire vehicle. By charging the power battery, power consumption requirements of the power motor and the high-voltage electric appliance device may be ensured, and further it is ensured that the power motor drives the entire vehicle to normally travel.

Further, according to an embodiment of the present invention, the control module 101 configured to: when the SOC value of the power battery 3 is greater than a preset limit value M2 and is less than or equal to a first preset value M1, control, if the speed V of the hybrid power automobile is less than a first preset speed V1, the auxiliary motor 5 to enter the power generation power adjustment mode.

The first preset value M1 may be a preset upper limit value of the SOC value of the power battery 3, for example, a value of determining to stop charging, and may be preferably 30%. The preset limit value may be a preset lower limit value of the SOC value of the power battery 3, for example, a value of determining to stop discharging, and may be preferably 10%. SOC values of the power battery 3 may be divided into three ranges according to the first preset value and the preset limit value, that is, a first power level range, a second power level range, and a third power level range. When the SOC value of the power battery 3 is less than or equal to the preset limit value, the SOC value of the power battery 3 falls within the first power level range. In this case, the power battery 3 performs only charging but does not perform discharging. When the SOC value of the power battery 3 is greater than the preset limit value and is less than or equal to the first preset value, the SOC value of the power battery 3 falls within the second power level range. In this case, the power battery 3 has a charging requirement, that is, the power battery 3 may be actively charged. When the SOC value of the power battery 3 is greater than the first preset value, the SOC value of the power battery 3 falls within the third power level range. In this case, the power battery 3 may be not charged, that is, the power battery 3 is not actively charged.

Specifically, after obtaining the SOC value of the power battery 3 and the speed of the hybrid power automobile, the control module 101 may determine a range within which the SOC value of the power battery 3 falls. If the SOC value of the power battery 3 falls within the second power level range, and the SOC value of the power battery 3 is greater than the preset limit value and is less than or equal to the first preset value, it indicates that the power battery 3 may be charged. In this case, the control module 101 further determines whether the speed of the hybrid power automobile is less than the first preset speed. If the speed of the hybrid power automobile is less than the first preset speed, the control module 101 controls the auxiliary motor 5 to enter the power generation power adjustment mode. In this case, the speed of the hybrid power automobile is relatively low, a needed drive force is relatively small, the power motor 2 is sufficient to drive the hybrid power automobile to travel, and the engine 1 may drive only the auxiliary motor 5 to perform power generation, but does not participate in drive.

Therefore, at a low speed, the engine performs only power generation but does not participate in drive, and because the engine does not participate in drive, the clutch does not need to be used, thereby reducing abrasion or slip friction of the clutch, reducing an unsmooth feeling, and improving comfortableness.

Further, according to an embodiment of the present invention, the control module 101 is further configured to: when the SOC value of the power battery 3 is greater than the preset limit value M2 and is less than or equal to the first preset value M1, and the speed V of the hybrid power automobile is less than the first preset speed V1, obtain an entire vehicle requirement power P2 of the hybrid power automobile; and when the entire vehicle requirement power P2 is less than or equal to a maximum allowed power generation power Pmax of the auxiliary motor 5, control the auxiliary motor 5 to enter the power generation power adjustment mode.

Specifically, when the hybrid power automobile is travelling, if the SOC value of the power battery 3 is greater than the preset limit value M2 and is less than or equal to the first preset value M1, and the speed V of the hybrid power automobile is less than the first preset speed V1, that is, the speed of the hybrid power automobile is relatively low, the control module 101 obtains the entire vehicle requirement power P2 of the hybrid power automobile; and controls, when the entire vehicle requirement power P2 is less than or equal to the maximum allowed power generation power Pmax of the auxiliary motor 5, the auxiliary motor 5 to enter the power generation power adjustment mode.

Therefore, at a low speed, the engine performs only power generation but does not participate in drive, and because the engine does not participate in drive, the clutch does not need to be used, thereby reducing abrasion or slip friction of the clutch, reducing an unsmooth feeling, and improving comfortableness.

Furthermore, according to an embodiment of the present invention, the control module 101 is further configured to: when the SOC value of the power battery 3 is greater than the preset limit value and is less than or equal to the first preset value M1, the speed V of the hybrid power automobile is less than the first preset speed V1, and the entire vehicle requirement power P2 is less than or equal to the maximum allowed power generation power Pmax of the auxiliary motor 5, obtain an accelerator pedal depth D of the hybrid power automobile and an entire vehicle resistance F of the hybrid power automobile; and when the accelerator pedal depth D is less than or equal to a first preset depth D1 and the entire vehicle resistance F of the hybrid power automobile is less than or equal to a first preset resistance F1, control the auxiliary motor 5 to enter the power generation power adjustment mode.

It should be noted that, the entire vehicle resistance of the hybrid power automobile may be travelling resistances of the hybrid power automobile, for example, a rolling resistance, an accelerating resistance, a grade resistance, and an air resistance.

Specifically, if the SOC value of the power battery 3 is greater than the preset limit value and is less than or equal to the first preset value M1, the speed V of the hybrid power automobile is less than the first preset speed V1, and the entire vehicle requirement power P2 is less than or equal to the maximum allowed power generation power Pmax of the auxiliary motor 5, the control module 101 obtains the accelerator pedal depth D of the hybrid power automobile and the entire vehicle resistance F of the hybrid power automobile in real time; and when the accelerator pedal depth D is less than or equal to the first preset depth D1 and the entire vehicle resistance F of the hybrid power automobile is less than or equal to the first preset resistance F1, the control module 101 controls the auxiliary motor 5 to enter the power generation power adjustment mode.

Therefore, at a low speed, the engine performs only power generation but does not participate in drive, and because the engine does not participate in drive, the clutch does not need to be used, thereby reducing abrasion or slip friction of the clutch, reducing an unsmooth feeling, and improving comfortableness.

As described above, when the hybrid power automobile is travelling at a low speed, the engine 1 may perform only power generation but does not participate in drive, and because the engine does not participate in drive, the clutch does not need to be used, thereby reducing abrasion or slip friction of the clutch, reducing an unsmooth feeling, and improving comfortableness. Moreover, the low speed enables the engine to operate in an economical area, and because the engine has lowest fuel consumption and highest fuel economy in the preset optimal economical area, thereby reducing fuel consumption, reducing noise of the engine, and improving running economy of the entire vehicle, so as to maintain low-speed electric balance and low-speed smoothness of the entire vehicle and improve performance of the entire vehicle.

Correspondingly, when the SOC value of the power battery 3, the speed V, the accelerator pedal depth D and the entire vehicle resistance F of the hybrid power automobile do not satisfy the foregoing conditions, the engine 1 may participate in drive, and a specific operating process thereof is as follows:

According to an embodiment of the present invention, the control module 101 is further configured to: when the SOC value of the power battery 3 is less than the preset limit value, the speed of the hybrid power automobile is greater than or equal to the first preset speed, the entire vehicle requirement power is greater than the maximum allowed power generation power of the auxiliary motor 5, the accelerator pedal depth is greater than the first preset depth, or the entire vehicle resistance of the hybrid power automobile is greater than the first preset resistance, control the engine 1 to participate in drive.

To be specific, when the SOC value of the power battery 3 is less than the preset limit value M2, the speed of the hybrid power automobile is greater than or equal to the first preset speed, the entire vehicle requirement power is greater than the maximum allowed power generation power of the auxiliary motor 5, the accelerator pedal depth is greater than the first preset depth, or the entire vehicle resistance of the hybrid power automobile is greater than the first preset resistance, the control module 101 controls the engine 1 to participate in drive. In this case, the power battery 3 does not perform discharging again, the entire vehicle needs a relatively large drive force, the entire vehicle requirement power is relatively large, the accelerator pedal depth is relatively large or the entire vehicle resistance is also relatively large, the power motor 2 is insufficient to drive the hybrid power automobile to travel, and the engine 1 participates in drive to perform supplemental drive.

Therefore, the engine 1 may participate in drive when the drive force output by the power motor 2 is insufficient, thereby ensuring normal travelling of the entire vehicle, improving power performance of the entire vehicle, and improving travelling mileage of the entire vehicle.

More specifically, the control module 101 is further configured to: when the entire vehicle requirement power is greater than the maximum allowed power generation power of the auxiliary motor 5, control the engine 1 to participate in drive to enable the engine 1 to output power to wheels through the clutch 6.

Moreover, the control module 101 is further configured to: when the SOC value of the power battery 3 is less than the preset limit value M2, control the engine 1 to participate in drive to enable the engine 1 to output a drive force to the wheels 7 through the clutch 6. When the SOC value of the power battery 3 is less than or equal to the first preset value M1, the speed V of the hybrid power automobile is less than the first preset speed V1 and the accelerator pedal depth D is greater than the first preset depth D1, the control module 101 controls the engine 1 to participate in drive to enable the engine 1 to output power to the wheels 7 through the clutch 6. When the SOC value of the power battery 3 is less than or equal to the first preset value M1, the speed V of the hybrid power automobile is less than the first preset speed V1 and the resistance F of the hybrid power automobile is greater than the first preset resistance F1, the control module 101 controls the engine 1 to participate in drive to enable the engine 1 to output power to the wheels 7 through the clutch 6.

Specifically, when the engine 1 drives the auxiliary motor 5 to perform power generation and the power motor 2 outputs a drive force to the wheels 7 of the hybrid power automobile, the control module 101 obtains the SOC value of the power battery 3, the accelerator pedal depth D of the hybrid power automobile, the speed V and the entire vehicle resistance F in real time, and determines the SOC value of the power battery 3, the accelerator pedal depth D of the hybrid power automobile, the speed V and the entire vehicle resistance F.

First, when the SOC value of the power battery 3 is less than the preset limit value M2, the control module 101 controls the engine 1 to output power to the wheels 7 through the clutch 6, so that the engine 1 and the power motor 2 simultaneously participate in drive, and load of the power motor 2 is reduced to reduce power consumption of the power battery 3, thereby ensuring that the engine 1 operates in the preset optimal economical area and preventing the SOC value of the power battery 3 from quick decreasing.

Second, when the SOC value of the power battery 3 is less than or equal to the first preset value M1, the speed V of the hybrid power automobile is less than the first preset speed V1 and the accelerator pedal depth D is greater than the first preset depth D1, the control module 101 controls the engine 1 to output power to the wheels 7 through the clutch 6, so that the engine 1 and the power motor 2 simultaneously participate in drive, and load of the power motor 2 is reduced to reduce power consumption of the power battery 3, thereby ensuring that the engine 1 operates in the preset optimal economical area and preventing the SOC value of the power battery 3 from quick decreasing.

Third, when the SOC value of the power battery 3 is less than or equal to the first preset value M1, the speed V of the hybrid power automobile is less than the first preset speed V1 and the resistance F of the hybrid power automobile is greater than the first preset resistance F1, the control module 101 controls the engine 1 to output power to the wheels 7 through the clutch 6, so that the engine 1 and the power motor 2 simultaneously participate in drive, and load of the power motor 2 is reduced to reduce power consumption of the power battery 3, thereby ensuring that the engine 1 operates in the preset optimal economical area and preventing the SOC value of the power battery 3 from quick decreasing.

Therefore, the engine 1 may participate in drive when the drive force output by the power motor 2 is insufficient, thereby ensuring normal travelling of the entire vehicle, improving power performance of the entire vehicle, and improving travelling mileage of the entire vehicle. Moreover, the engine may be controlled to operate in an economical area, and because the engine 1 has lowest fuel consumption and highest fuel economy in the preset optimal economical area, fuel consumption may be reduced, noise of the engine may be reduced, and economic performance of the entire vehicle may be improved.

Moreover, the control module 101 is further configured to: when the SOC value of the power battery 3 is less than or equal to the preset limit value, and the speed of the hybrid power automobile is greater than the first preset speed, control the engine 1 to participate in drive to enable the engine 1 to output power to the wheels 7 through the clutch 6.

Therefore, the engine 1 may participate in drive when the drive force output by the power motor 2 is insufficient, thereby ensuring normal travelling of the entire vehicle, improving power performance of the entire vehicle, and improving travelling mileage of the entire vehicle.

Certainly, it should be understood that, the control module 101 is further configured to: when the SOC value of the power battery 3 is greater than the first preset value, control the engine 1 not to drive the auxiliary motor 5 to perform power generation. In this case, the power battery 3 has an approximately full power level, and does not need to be charged, and the engine 1 does not drive the auxiliary motor 5 to perform power generation. To be specific, when the power battery 3 has an approximately full power level, the engine 1 does not drive the auxiliary motor 5 to perform power generation, and therefore the auxiliary motor 5 does not charge the power battery 3.

Further, after the auxiliary motor 5 enters the power generation power adjustment mode, the control module 101 may adjust the power generation power of the auxiliary motor 5. A process of adjusting the power generation power of the control module 101 of this embodiment of the present invention is specifically described below.

According to an embodiment of the present invention, the control module 101 is further configured to: after the auxiliary motor 5 enters the power generation power adjustment mode, adjust a power generation power P1 of the auxiliary motor 5 according to the entire vehicle requirement power P2 of the hybrid power automobile and a charging power P3 of the power battery 3.

According to an embodiment of the present invention, a formula of adjusting the power generation power P1 of the auxiliary motor 5 according to the entire vehicle requirement power P2 of the hybrid power automobile and the charging power P3 of the power battery is as follows:

$$P1 = P2 + P3, \text{ where } P2 = P11 + P21.$$

P1 is the power generation power of the auxiliary motor 5, P2 is the entire vehicle requirement power, P3 is the charging power of the power battery 3, P11 is an entire vehicle drive power, and P21 is an electric appliance device power.

It should be noted that, electric appliance devices include the first electric appliance device 10 and the second electric appliance device 30, that is, the electric appliance device power P21 may include power needed by the high-voltage electric appliance device and the low-voltage electric appliance device.

It should be further noted that, the entire vehicle drive power P11 may include the output power of the power motor 2, and the control module 101 may obtain the entire vehicle drive power P11 according to a preset accelerator-torsional moment curve of the power motor 2 and a rotational speed of the power motor 2, where the preset accelerator-torsional moment curve may be determined during power matching of the hybrid power automobile. Additionally, the control module 101 may obtain the electric appliance device power P21 in real time according to electric appliance devices running on the entire vehicle, for example, calculate the electric appliance device power P21 through DC consumption on a bus. Moreover, the control module 101 may obtain the charging power P3 of the power battery 3 according to the SOC value of the power battery 3. Assuming that the entire vehicle drive power P11 obtained in real time is equal to b1 kw, the electric appliance device power P21 is equal to b2 kw, and the charging power P3 of the power battery 3 is equal to b3 kw, the power generation power of the auxiliary motor 5 is equal to b1+b2+b3.

Specifically, when the hybrid power automobile is travelling, the control module 101 may obtain the charging power P3 of the power battery 3, the entire vehicle drive power P11 and the electric appliance device power P21, and use a sum of the charging power P3 of the power battery 3, the entire vehicle drive power P11 and the electric appliance device power P21 as the power generation power P1 of the auxiliary motor 5. Therefore, the control module 101 may adjust the power generation power of the auxiliary motor 5 according to the calculated P1 value. For example, the control module 101 may control the output torque and the rotational speed of the engine 1 according to the calculated P1 value, so as to adjust the power for the engine 1 to drive the auxiliary motor 5 to perform power generation.

Further, according to an embodiment of the present invention, the control module 101 is further configured to: obtain an SOC value change rate of the power battery 3, and adjust the power generation power P1 of the auxiliary motor 5 according to a relationship between the entire vehicle requirement power P2 and a minimum output power Pmin corresponding to the optimal economical area of the engine 1, and the SOC value change rate of the power battery.

It should be understood that, the control module 101 may obtain the SOC value change rate of the power battery 3 according to the SOC value of the power battery 3, for example, collect the SOC value of the power battery 3 once at each time interval t. In this way, a ratio of a difference between a current SOC value and a former SOC value of the power battery 3 to the time interval t may be used as the SOC value change rate of the power battery 3.

Specifically, the optimal economical area of the engine may be determined according to the engine universal characteristic curve shown in FIG. 7, and then the minimum output power Pmin corresponding to the optimal economical area of the engine is obtained. After determining the minimum output power Pmin corresponding to the optimal economical area of the engine, the control module 101 may adjust the power generation power of the auxiliary motor 5 according to the relationship between the entire vehicle requirement power P2 and the minimum output power Pmin corresponding to the optimal economical area of the engine 1, and the SOC value change rate of the power battery 3.

Therefore, when the hybrid power automobile is travelling at a low speed, the engine is enabled to operate in an economical area, thereby reducing fuel consumption, reducing noise of the engine, and improving economic performance of the entire vehicle. Moreover, at a low speed, the engine 1 may perform only power generation but does not participate in drive, and because the engine does not participate in drive, the clutch does not need to be used, thereby reducing abrasion or slip friction of the clutch, reducing an unsmooth feeling, and improving comfortableness, so as to maintain low-speed electric balance and low-speed smoothness of the entire vehicle and improve performance of the entire vehicle.

A specific adjusting manner in which after the auxiliary motor 5 enters the power generation power adjustment mode, the control module 101 adjusts the power generation power of the auxiliary motor 5 according to the relationship between the entire vehicle requirement power P2 and the minimum output power Pmin corresponding to the optimal economical area of the engine 1, and the SOC value change rate of the power battery 3 is further described below.

Specifically, when the engine 1 drives the auxiliary motor 5 to perform power generation and the power motor 2 outputs a drive force to the wheels 7 of the hybrid power automobile, the entire vehicle drive power P11 and the electric appliance device power P21 are obtained in real time, so as to obtain the entire vehicle requirement power P2 of the hybrid power automobile, and the control module 101 determines the entire vehicle requirement power P2 of the hybrid power automobile, where the entire vehicle requirement power P2 may satisfy the following three cases.

In a first case, the entire vehicle requirement power P2 is less than the minimum output power Pmin corresponding to the optimal economical area of the engine 1; in a second case, the entire vehicle requirement power P2 is greater than or equal to the minimum output power Pmin corresponding to the optimal economical area of the engine and is less than or equal to the maximum allowed power generation power Pmax of the auxiliary motor 5; and in a third case, the entire vehicle requirement power P2 is greater than the maximum allowed power generation power Pmax of the auxiliary motor 5.

In an embodiment of the first case, when the entire vehicle requirement power P2 is less than the minimum output power Pmin corresponding to the optimal economical area of the engine 1, the control module 101 obtains the charging power P3 of the power battery 3 according to the SOC value change rate of the power battery 3, and determines whether the charging power P3 of the power battery 3 is less than a difference between the minimum output power Pmin and the entire vehicle requirement power P2. If the charging power P3 of the power battery 3 is less than the difference between the minimum output power Pmin and the entire vehicle requirement power P2, the control module 101 controls the engine 1 to perform power generation at the minimum output power Pmin to adjust the power generation power P1 of the auxiliary motor 5; or if the charging power P3 of the power battery 3 is greater than or equal to the difference between the minimum output power Pmin and the entire vehicle requirement power P2, the control module 101 obtains an output power of the engine 1 in the preset optimal economical area according to a sum of the charging power P3 of the power battery 3 and the entire vehicle requirement power P2, and controls the engine to perform power generation at the obtained output power to adjust the power generation power P1 of the auxiliary motor 5.

It should be noted that, a first relationship table between the SOC value change rate of the power battery 3 and the charging power P3 of the power battery 3 may be pre-stored in the control module 101. Therefore, after obtaining an SOC value change rate of the power battery 3, the control module 101 may obtain a corresponding charging power P3 of the power battery 3 by performing matching on the first relationship table. The SOC value change rate of the power battery 3 and the charging power P3 of the power battery 3 satisfy a relationship shown in Table 1.

TABLE 1

| SOC value change rate of the power battery 3 | A1 | A2 | A3 | A4 | A5 |
|---|---|---|---|---|---|
| Charging power P3 of the power battery 3 | B1 | B2 | B3 | B4 | B5 |

It is learned from Table 1 that, when an SOC value change rate obtained by the control module 101 is A1, an obtained corresponding charging power P3 of the power battery 3 is B1; when an SOC value change rate obtained by the control module 101 is A2, an obtained corresponding charging power P3 of the power battery 3 is B2; when an SOC value change rate obtained by the control module 101 is A3, an obtained corresponding charging power P3 of the power battery 3 is B3; when an SOC value change rate obtained by the control module 101 is A4, an obtained corresponding charging power P3 of the power battery 3 is B4; and when an SOC value change rate obtained by the control module 101 is A5, an obtained corresponding charging power P3 of the power battery 3 is B5.

Specifically, after the auxiliary motor 5 enters the power generation power adjustment mode, the control module 101 obtains the entire vehicle drive power P11 and the electric appliance device power P21 in real time, so as to obtain the entire vehicle requirement power P2 of the hybrid power automobile, and determine the entire vehicle requirement power P2 of the hybrid power automobile. When the entire vehicle requirement power P2 is less than the minimum output power Pmin corresponding to the optimal economical area of the engine 1, the control module 101 may obtain the charging power P3 of the power battery 3 according to the SOC value change rate of the power battery 3, and determine whether the charging power P3 of the power battery 3 is less than the difference between the minimum output power Pmin and the entire vehicle requirement power P2.

When the entire vehicle requirement power P2 is less than the minimum output power Pmin corresponding to the optimal economical area of the engine 1, if the charging power P3 of the power battery 3 is less than the difference between the minimum output power Pmin and the entire vehicle requirement power P2, that is, P3<Pmin−P2, the control module 101 controls the engine 1 to perform power generation at the minimum output power Pmin to adjust the power generation power of the auxiliary motor 1. If the charging power P3 of the power battery 3 is greater than or equal to the difference between the minimum output power Pmin and the entire vehicle requirement power P2, that is, P3≥Pmin−P2, the control module 101 obtains the output power of the engine 1 in the preset optimal economical area according to the sum of the charging power P3 of the power battery 3 and the entire vehicle requirement power P2, and controls the engine 1 to perform power generation at the obtained output power to adjust the power generation power of the auxiliary motor 5.

Therefore, when the entire vehicle requirement power P2 is less than the minimum output power Pmin corresponding to the optimal economical area of the engine 1, the control module 101 obtains the power generation power of the engine 1 according to the relationship between the charging power P3 of the power battery 3 and the difference between the minimum output power Pmin corresponding to the optimal economical area of the engine 1 and the entire vehicle requirement power P2, so that the engine 1 runs in the preset optimal economical area, and the engine 1 performs only power generation but does not participate in drive, thereby reducing fuel consumption of the engine, and reducing noise of the engine.

In an embodiment of the second case, when the entire vehicle requirement power P2 is greater than or equal to the minimum output power Pmin corresponding to the optimal economical area of the engine and is less than or equal to the maximum allowed power generation power Pmax of the auxiliary motor 5, the control module 101 obtains the charging power P3 of the power battery 3 according to the SOC value change rate of the power battery 3, obtains an output power of the engine 1 in the preset optimal economical area according to a sum of the charging power P3 of the power battery 3 and the entire vehicle requirement power P2, and controls the engine 1 to perform power generation at the obtained output power to adjust the power generation power P1 of the auxiliary motor 5.

Specifically, when the entire vehicle requirement power P2 is greater than or equal to the minimum output power Pmin corresponding to the optimal economical area of the engine 1 and is less than the maximum allowed power generation power Pmax of the auxiliary motor 5, when controlling the engine 1 to operate in the preset optimal economical area, the control module 101 further obtains the charging power P3 of the power battery 3 according to the SOC value change rate of the power battery 3, and obtains the output power of the engine 1 in the preset optimal economical area according to the sum of the charging power P3 of the power battery 3 and the entire vehicle requirement power P2, where the obtained output power is equal to P3+P2. Then, the control module 101 controls the engine 1 to perform power generation at the obtained output power to adjust the power generation power P1 of the auxiliary motor 5, thereby increasing the SOC value of the power battery 3, and enabling the engine 1 to operate in the preset optimal economical area.

Therefore, when the entire vehicle requirement power P2 is greater than or equal to the minimum output power Pmin corresponding to the optimal economical area of the engine 1 and is less than the maximum allowed power generation power Pmax of the auxiliary motor 5, the control module 101 obtains the output power of the engine 1 according to the sum of the charging power P3 of the power battery 3 and the entire vehicle requirement power P2, so that the engine 1 runs in the preset optimal economical area, and the engine 1 performs only power generation but does not participate in drive, thereby reducing fuel consumption of the engine, and reducing noise of the engine.

In an embodiment of the third case, when the entire vehicle requirement power P2 is greater than the maximum allowed power generation power Pmax of the auxiliary motor 5, the control module 101 further controls the engine 1 to participate in drive to enable the engine 1 to output power to the wheels 7 through the clutch 6.

Specifically, when the entire vehicle requirement power P2 is greater than the maximum allowed power generation power Pmax of the auxiliary motor 5, that is, the entire vehicle requirement power P2 of the hybrid power automobile is greater than the power generation power P1 of the auxiliary motor 5, the control module 101 further controls the engine 1 to output a drive force to the wheels 7 through the clutch 6 to enable the engine 1 to participate in drive. Therefore, the engine 1 undertakes a part of a drive power P, so as to reduce a requirement of the auxiliary motor 5 on the power generation power P1, so that the engine 1 operates in the preset optimal economical area.

Therefore, when the entire vehicle requirement power P2 is greater than the maximum allowed power generation power Pmax of the auxiliary motor 5, the power battery 3 discharges outward to supply power to the power motor 2. In this case, the control module 101 controls the engine 1 and the power motor 2 to simultaneously output power to the wheels 7 of the hybrid power automobile, so that the engine 1 operates in the preset optimal economical area.

Therefore, at a low speed, the engine can operate in an economical area, and perform only power generation but does not participate in drive, and therefore the clutch is not used, thereby reducing abrasion or slip friction of the clutch, reducing an unsmooth feeling, improving comfortableness, reducing fuel consumption, and reducing noise of the engine, so as to maintain low-speed electric balance and low-speed smoothness of the entire vehicle and improve performance of the entire vehicle.

To sum up, according to the power system of a hybrid power automobile proposed in this embodiment of the present invention, the engine outputs power to the wheels of the hybrid power automobile through the clutch, the power motor outputs a drive force to the wheels of the hybrid power automobile, the power battery supplies power to the power motor, the auxiliary motor performs power generation under driving of the engine, and the control module obtains the SOC value of the power battery and the speed of the hybrid power automobile, and controls, according to the SOC value of the power battery and the speed of the hybrid power automobile, the auxiliary motor to enter the power generation power adjustment mode, so that the engine runs in the preset optimal economical area, thereby reducing fuel consumption of the engine, improving running economy of the entire vehicle, reducing noise of the engine, implementing a plurality of drive modes, maintaining low-speed electric balance and low-speed smoothness of the entire vehicle, and improving performance of the entire vehicle.

Embodiment 3

In some embodiments of the present invention, the power system of a hybrid power automobile further includes a control module 101. When the hybrid power automobile is travelling, the control module 101 is configured to obtain an SOC (state of charge, also referred to as remaining power level) value of the power battery 3 and a speed V of the hybrid power automobile, control the power generation power P1 of the auxiliary motor 5 according to the SOC value of the power battery 3 and the speed V of the hybrid power automobile, and obtain a power generation power P0 of the engine 1 according to the power generation power P1 of the auxiliary motor 5 to control the engine 1 to run in the preset optimal economical area.

It should be noted that, the SOC value of the power battery 3 may be collected through a battery management system of the hybrid power automobile, and therefore the battery management system sends the collected SOC value of the power battery 3 to the control module 101, so that the control module 101 obtains the SOC value of the power battery 3.

It should be further noted that, the preset optimal economical area of the engine 1 may be determined with reference to a diagram of an engine universal characteristic curve. FIG. 7 shows an example of the diagram of the engine universal characteristic curve, where a vertical coordinate indicates an output torque of the engine 1, a horizontal coordinate indicates a rotational speed of the engine 1, and a curve a is a fuel economy curve of the engine 1. An area corresponding to the fuel economy curve is the optimal economical area of the engine. To be specific, when a torsional moment and a torque of the engine 1 are located on an optimal fuel economy curve of the engine, the engine is located in the optimal economical area. Therefore, in this embodiment of the present invention, the control module 101 may enable, by controlling the rotational speed and the output torque of the engine 1 to fall on the fuel economy curve of the engine, for example, the curve a, the engine 1 to run in the preset optimal economical area.

Specifically, when the hybrid power automobile is travelling, the engine 1 may output power to the wheels 7 of the hybrid power automobile through the clutch 6, and the engine 1 may further drive the auxiliary motor 5 to perform power generation. Therefore, the output power of the engine mainly includes two parts, one part is output to the auxiliary motor 5, that is, the power generation power for driving the auxiliary motor 5 to perform power generation, and the other part is output to the wheels 7, that is, the drive power for driving the wheels 7.

When the engine 1 drives the auxiliary motor 5 to perform power generation, the control module 101 may first obtain the SOC value of the power battery 3 and the speed of the hybrid power automobile, then control the power generation power P1 of the auxiliary motor 5 according to the SOC value of the power battery 3 and the speed of the hybrid power automobile, and obtain the power generation power P0 of the engine 1 according to the power generation power P1 of the auxiliary motor 5 to control the engine 1 to run in the preset optimal economical area. The control module 101 may determine, on the premise of enabling the engine 1 to operate in the preset optimal economical area, power for the engine 1 to drive the auxiliary motor 5 to perform power generation, thereby adjusting the power generation power P1 of the auxiliary motor 5.

Therefore, the engine 1 is enabled to operate in the preset optimal economical area, and because the engine 1 has lowest fuel consumption and highest fuel economy in the preset optimal economical area, fuel consumption of the engine 1 may be reduced, noise of the engine 1 may be reduced, and running economy of the entire vehicle may be improved. Moreover, because the auxiliary motor 5 has relatively high power generation power and power generation efficiency at a low speed, power consumption requirements of low-speed travelling may be satisfied, and low-speed electric balance of the entire vehicle and low-speed smoothness of the entire vehicle may be maintained, to improve power performance of the entire vehicle. By charging the power battery, power consumption requirements of the power motor and the high-voltage electric appliance device may be ensured, and further it is ensured that the power motor drives the entire vehicle to normally travel.

Further, according to an embodiment of the present invention, the control module 101 configured to: when the SOC value of the power battery 3 is greater than a preset limit value M2 and is less than or equal to a first preset value M1, control the power generation power P1 of the auxiliary motor 5 if the speed V of the hybrid power automobile is less than a first preset speed V1.

The first preset value may be a preset upper limit value of the SOC value of the power battery 3, for example, a value of determining to stop charging, and may be preferably 30%. The preset limit value may be a preset lower limit value of the SOC value of the power battery 3, for example, a value of determining to stop discharging, and may be preferably 10%. SOC values of the power battery 3 may be divided into three ranges according to the first preset value and the preset limit value, that is, a first power level range, a second power level range, and a third power level range. When the SOC value of the power battery 3 is less than or equal to the preset limit value, the SOC value of the power battery 3 falls within the first power level range. In this case, the power battery 3 performs only charging but does not perform discharging. When the SOC value of the power battery 3 is greater than the preset limit value and is less than or equal to the first preset value, the SOC value of the power battery 3 falls within the second power level range. In this case, the power battery 3 has a charging requirement, that is, the power battery 3 may be actively charged. When the SOC value of the power battery 3 is greater than the first preset value, the SOC value of the power battery 3 falls within the third power level range. In this case, the power battery 3 may be not charged, that is, the power battery 3 is not actively charged.

Specifically, after obtaining the SOC value of the power battery 3 and the speed of the hybrid power automobile, the control module 101 may determine a range within which the SOC value of the power battery 3 falls. If the SOC value of the power battery 3 falls within the second power level range, and the SOC value of the power battery 3 is greater than the preset limit value and is less than or equal to the first preset value, it indicates that the power battery 3 may be charged. In this case, the control module 101 further determines whether the speed of the hybrid power automobile is less than the first preset speed. If the speed of the hybrid power automobile is less than the first preset speed, the control module 101 controls the power generation power P1 of the auxiliary motor 5. In this case, the speed of the hybrid power automobile is relatively low, a needed drive force is relatively small, the power motor 2 is sufficient to drive the hybrid power automobile to travel, and the engine 1 may drive only the auxiliary motor 5 to perform power generation, but does not participate in drive.

Therefore, at a low speed, the engine performs only power generation but does not participate in drive, and because the engine does not participate in drive, the clutch does not need to be used, thereby reducing abrasion or slip friction of the clutch, reducing an unsmooth feeling, and improving comfortableness.

Further, according to an embodiment of the present invention, the control module 101 is further configured to: when the SOC value of the power battery 3 is greater than the preset limit value M2 and is less than or equal to the first preset value M1, and the speed V of the hybrid power automobile is less than the first preset speed V1, obtain an entire vehicle requirement power P2 of the hybrid power automobile; and when the entire vehicle requirement power P2 is less than or equal to a maximum allowed power generation power Pmax of the auxiliary motor 5, control the power generation power P1 of the auxiliary motor 5.

Specifically, when the hybrid power automobile is travelling, if the SOC value of the power battery 3 is greater than the preset limit value M2 and is less than or equal to the first preset value M1, and the speed V of the hybrid power automobile is less than the first preset speed V1, that is, the speed of the hybrid power automobile is relatively low, the control module 101 obtains the entire vehicle requirement power P2 of the hybrid power automobile; and controls the power generation power P1 of the auxiliary motor 5 when the entire vehicle requirement power P2 is less than or equal to the maximum allowed power generation power Pmax of the auxiliary motor 5.

Therefore, at a low speed, the engine performs only power generation but does not participate in drive, and because the engine does not participate in drive, the clutch does not need to be used, thereby reducing abrasion or slip friction of the clutch, reducing an unsmooth feeling, and improving comfortableness.

Furthermore, according to an embodiment of the present invention, the control module 101 is further configured to: when the SOC value of the power battery 3 is greater than the preset limit value and is less than or equal to the first preset value M1, the speed V of the hybrid power automobile is less than the first preset speed V1, and the entire vehicle requirement power P2 is less than or equal to the maximum allowed power generation power Pmax of the auxiliary motor 5, obtain an accelerator pedal depth D of the hybrid power automobile and an entire vehicle resistance F of the hybrid power automobile; and when the accelerator pedal depth D is less than or equal to a first preset depth D1 and the entire vehicle resistance F of the hybrid power automobile is less than or equal to a first preset resistance F1, control the power generation power P1 of the auxiliary motor 5.

It should be noted that, the entire vehicle resistance of the hybrid power automobile may be travelling resistances of the hybrid power automobile, for example, a rolling resistance, an accelerating resistance, a grade resistance, and an air resistance.

Specifically, if the SOC value of the power battery 3 is greater than the preset limit value and is less than or equal to the first preset value M1, the speed V of the hybrid power automobile is less than the first preset speed V1, and the entire vehicle requirement power P2 is less than or equal to the maximum allowed power generation power Pmax of the auxiliary motor 5, the control module 101 obtains the accelerator pedal depth D of the hybrid power automobile and the entire vehicle resistance F of the hybrid power automobile in real time; and when the accelerator pedal depth D is less than or equal to the first preset depth D1 and the entire vehicle resistance F of the hybrid power automobile is less than or equal to the first preset resistance F1, the control module 101 controls the power generation power P1 of the auxiliary motor 5.

Therefore, at a low speed, the engine performs only power generation but does not participate in drive, and because the engine does not participate in drive, the clutch does not need to be used, thereby reducing abrasion or slip friction of the clutch, reducing an unsmooth feeling, and improving comfortableness.

As described above, when the hybrid power automobile is travelling at a low speed, the engine 1 may perform only power generation but does not participate in drive, and because the engine does not participate in drive, the clutch does not need to be used, thereby reducing abrasion or slip friction of the clutch, reducing an unsmooth feeling, and improving comfortableness. Moreover, the low speed enables the engine to operate in an economical area, and because the engine has lowest fuel consumption and highest fuel economy in the preset optimal economical area, thereby reducing fuel consumption, reducing noise of the engine, and improving running economy of the entire vehicle, so as to maintain low-speed electric balance and low-speed smoothness of the entire vehicle and improve performance of the entire vehicle.

According to an embodiment of the present invention, the control module 101 is further configured to: when controlling the engine 1 to individually drive the auxiliary motor 5 to perform power generation and controlling the power motor 2 to output a drive force alone, obtain the power generation power of the engine 1 according to the following formula:

$$P0 = P1/\eta/\zeta$$

where P0 is the power generation power of the engine 1, P1 is the power generation power of the auxiliary motor 5, $\eta$ is belt transmission efficiency, and $\zeta$ is efficiency of the auxiliary motor 5.

To be specific, if the engine 1 may perform only power generation but does not participate in drive, the control module 101 may calculate the power generation power P0 of the engine 1 according to the power generation power of the auxiliary motor 5, the belt transmission efficiency $\eta$ and the efficiency $\zeta$ of the auxiliary motor 5, and control the engine 1 to drive the auxiliary motor 5 at the obtained power generation power P0 to perform power generation, so as to control the power generation power of the auxiliary motor 5.

Correspondingly, when the SOC value of the power battery 3, the speed V, the accelerator pedal depth D and the entire vehicle resistance F of the hybrid power automobile do not satisfy the foregoing conditions, the engine 1 may participate in drive, and a specific operating process thereof is as follows:

According to an embodiment of the present invention, the control module 101 is further configured to: when the SOC value of the power battery 3 is less than the preset limit value, the speed of the hybrid power automobile is greater than or equal to the first preset speed, the entire vehicle requirement power is greater than the maximum allowed power generation power of the auxiliary motor 5, the accelerator pedal depth is greater than the first preset depth, or the entire vehicle resistance of the hybrid power automobile is greater than the first preset resistance, control the engine 1 to participate in drive.

To be specific, when the SOC value of the power battery 3 is less than the preset limit value M2, the speed of the hybrid power automobile is greater than or equal to the first preset speed, the entire vehicle requirement power is greater than the maximum allowed power generation power of the auxiliary motor 5, the accelerator pedal depth is greater than the first preset depth, or the entire vehicle resistance of the hybrid power automobile is greater than the first preset resistance, the control module 101 controls the engine 1 to participate in drive. In this case, the power battery 3 does not perform discharging again, the entire vehicle needs a relatively large drive force, the entire vehicle requirement power is relatively large, the accelerator pedal depth is relatively large or the entire vehicle resistance is also relatively large, the power motor 2 is insufficient to drive the hybrid power automobile to travel, and the engine 1 participates in drive to perform supplemental drive.

Therefore, the engine 1 may participate in drive when the drive force output by the power motor 2 is insufficient, thereby ensuring normal travelling of the entire vehicle, improving power performance of the entire vehicle, and improving travelling mileage of the entire vehicle.

More specifically, the control module 101 is further configured to: when the entire vehicle requirement power is greater than the maximum allowed power generation power of the auxiliary motor 5, control the engine 1 to participate in drive to enable the engine 1 to output power to wheels 7 through the clutch 6.

Moreover, the control module 101 is further configured to: when the SOC value of the power battery 3 is less than the preset limit value M2, control the engine 1 to participate in drive to enable the engine 1 to output a drive force to the wheels 7 through the clutch 6. When the SOC value of the power battery 3 is less than or equal to the first preset value M1, the speed V of the hybrid power automobile is less than the first preset speed V1 and the accelerator pedal depth D is greater than the first preset depth D1, the control module 101 controls the engine 1 to participate in drive to enable the engine 1 to output power to the wheels 7 through the clutch 6. When the SOC value of the power battery 3 is less than or equal to the first preset value M1, the speed V of the hybrid power automobile is less than the first preset speed V1 and the resistance F of the hybrid power automobile is greater than the first preset resistance F1, the control module 101 controls the engine 1 to participate in drive to enable the engine 1 to output power to the wheels 7 through the clutch 6.

Specifically, when the engine 1 drives the auxiliary motor 5 to perform power generation and the power motor 2 outputs a drive force to the wheels 7 of the hybrid power automobile, the control module 101 obtains the SOC value of the power battery 3, the accelerator pedal depth D of the hybrid power automobile, the speed V and the entire vehicle resistance F in real time, and determines the SOC value of the power battery 3, the accelerator pedal depth D of the hybrid power automobile, the speed V and the entire vehicle resistance F.

First, when the SOC value of the power battery 3 is less than the preset limit value M2, the control module 101 controls the engine 1 to output power to the wheels 7 through the clutch 6, so that the engine 1 and the power motor 2 simultaneously participate in drive, and load of the power motor 2 is reduced to reduce power consumption of the power battery 3, thereby ensuring that the engine 1 operates in the preset optimal economical area and preventing the SOC value of the power battery 3 from quick decreasing.

Second, when the SOC value of the power battery 3 is less than or equal to the first preset value M1, the speed V of the hybrid power automobile is less than the first preset speed V1 and the accelerator pedal depth D is greater than the first preset depth D1, the control module 101 controls the engine 1 to output power to the wheels 7 through the clutch 6, so that the engine 1 and the power motor 2 simultaneously participate in drive, and load of the power motor 2 is reduced to reduce power consumption of the power battery 3, thereby ensuring that the engine 1 operates in the preset optimal economical area and preventing the SOC value of the power battery 3 from quick decreasing.

Third, when the SOC value of the power battery 3 is less than or equal to the first preset value M1, the speed V of the hybrid power automobile is less than the first preset speed V1 and the resistance F of the hybrid power automobile is greater than the first preset resistance F1, the control module 101 controls the engine 1 to output power to the wheels 7 through the clutch 6, so that the engine 1 and the power motor 2 simultaneously participate in drive, and load of the power motor 2 is reduced to reduce power consumption of the power battery 3, thereby ensuring that the engine 1 operates in the preset optimal economical area and preventing the SOC value of the power battery 3 from quick decreasing.

Therefore, the engine 1 may participate in drive when the drive force output by the power motor 2 is insufficient, thereby ensuring normal travelling of the entire vehicle, improving power performance of the entire vehicle, and improving travelling mileage of the entire vehicle. Moreover, the engine may be controlled to operate in an economical area, and because the engine 1 has lowest fuel consumption and highest fuel economy in the preset optimal economical area, fuel consumption may be reduced, noise of the engine may be reduced, and economic performance of the entire vehicle may be improved.

Moreover, the control module 101 is further configured to: when the SOC value of the power battery 3 is less than or equal to the preset limit value, and the speed of the hybrid power automobile is greater than the first preset speed, control the engine 1 to participate in drive to enable the engine 1 to output power to the wheels 7 through the clutch 6.

Therefore, the engine 1 may participate in drive when the drive force output by the power motor 2 is insufficient, thereby ensuring normal travelling of the entire vehicle, improving power performance of the entire vehicle, and improving travelling mileage of the entire vehicle.

Certainly, it should be understood that, the control module 101 is further configured to: when the SOC value of the power battery 3 is greater than the first preset value, control the engine 1 not to drive the auxiliary motor 5 to perform power generation. In this case, the power battery 3 has an approximately full power level, and does not need to be charged, and the engine 1 does not drive the auxiliary motor 5 to perform power generation. To be specific, when the power battery 3 has an approximately full power level, the engine 1 does not drive the auxiliary motor 5 to perform power generation, and therefore the auxiliary motor 5 does not charge the power battery 3.

Further, after the auxiliary motor 5 enters the power generation power adjustment mode, the control module 101 may control the power generation power of the auxiliary motor 5. A process of controlling the power generation power of the control module 101 of this embodiment of the present invention is specifically described below.

According to an embodiment of the present invention, the control module 101 is further configured to: control the power generation power P1 of the auxiliary motor 5 according to the entire vehicle requirement power P2 of the hybrid power automobile and the charging power P3 of the power battery 3.

According to an embodiment of the present invention, a formula of controlling the power generation power P1 of the auxiliary motor 5 according to the entire vehicle requirement power P2 of the hybrid power automobile and the charging power P3 of the power battery is as follows:

$$P1 = P2 + P3, \text{ where } P2 = P11 + P21.$$

P1 is the power generation power of the auxiliary motor 5, P2 is the entire vehicle requirement power, P3 is the charging power of the power battery 3, P11 is an entire vehicle drive power, and P21 is an electric appliance device power.

It should be noted that, electric appliance devices include the first electric appliance device 10 and the second electric appliance device 30, that is, the electric appliance device power P21 may include power needed by the high-voltage electric appliance device and the low-voltage electric appliance device.

It should be further noted that, the entire vehicle drive power P11 may include the output power of the power motor 2, and the control module 101 may obtain the entire vehicle drive power P11 according to a preset accelerator-torsional moment curve of the power motor 2 and a rotational speed of the power motor 2, where the preset accelerator-torsional moment curve may be determined during power matching of the hybrid power automobile. Additionally, the control module 101 may obtain the electric appliance device power P21 in real time according to electric appliance devices running on the entire vehicle, for example, calculate the electric appliance device power P21 through DC consumption on a bus. Moreover, the control module 101 may obtain the charging power P3 of the power battery 3 according to the SOC value of the power battery 3. Assuming that the entire vehicle drive power P11 obtained in real time is equal to b1 kw, the electric appliance device power P21 is equal to b2 kw, and the charging power P3 of the power battery 3 is equal to b3 kw, the power generation power of the auxiliary motor 5 is equal to b1+b2+b3.

Specifically, when the hybrid power automobile is travelling, the control module 101 may obtain the charging power P3 of the power battery 3, the entire vehicle drive power P11 and the electric appliance device power P21, and use a sum of the charging power P3 of the power battery 3, the entire vehicle drive power P11 and the electric appliance device power P21 as the power generation power P1 of the auxiliary motor 5. Therefore, the control module 101 may control the power generation power of the auxiliary motor 5 according to the calculated P1 value. For example, the control module 101 may control the output torque and the rotational speed of the engine 1 according to the calculated P1 value, so as to control the power for the engine 1 to drive the auxiliary motor 5 to perform power generation.

Further, according to an embodiment of the present invention, the control module 101 is further configured to: obtain an SOC value change rate of the power battery 3, and control the power generation power P1 of the auxiliary motor 5 according to a relationship between the entire vehicle requirement power P2 and a minimum output power Pmin corresponding to the optimal economical area of the engine 1, and the SOC value change rate of the power battery.

Specifically, the optimal economical area of the engine may be determined according to the engine universal characteristic curve shown in FIG. 7, and then the minimum output power Pmin corresponding to the optimal economical area of the engine is obtained. After determining the minimum output power Pmin corresponding to the optimal economical area of the engine, the control module 101 may control the power generation power of the auxiliary motor 5 according to the relationship between the entire vehicle requirement power P2 and the minimum output power Pmin corresponding to the optimal economical area of the engine 1, and the SOC value change rate of the power battery 3.

Therefore, when the hybrid power automobile is travelling at a low speed, the engine is enabled to operate in an economical area, thereby reducing fuel consumption, reducing noise of the engine, and improving economic performance of the entire vehicle. Moreover, at a low speed, the engine 1 may perform only power generation but does not participate in drive, and because the engine does not participate in drive, the clutch does not need to be used, thereby reducing abrasion or slip friction of the clutch, reducing an unsmooth feeling, and improving comfortableness, so as to maintain low-speed electric balance and low-speed smoothness of the entire vehicle and improve performance of the entire vehicle.

A specific adjusting manner in which the control module 101 controls the power generation power of the auxiliary motor 5 according to the relationship between the entire vehicle requirement power P2 and the minimum output power Pmin corresponding to the optimal economical area of the engine 1, and the SOC value change rate of the power battery 3 is further described below.

Specifically, when the engine 1 drives the auxiliary motor 5 to perform power generation and the power motor 2 outputs a drive force to the wheels 7 of the hybrid power automobile, the entire vehicle drive power P11 and the electric appliance device power P21 are obtained in real time, so as to obtain the entire vehicle requirement power P2 of the hybrid power automobile, and the control module 101 determines the entire vehicle requirement power P2 of the hybrid power automobile, where the entire vehicle requirement power P2 may satisfy the following three cases.

In a first case, the entire vehicle requirement power P2 is less than the minimum output power Pmin corresponding to the optimal economical area of the engine 1; in a second case, the entire vehicle requirement power P2 is greater than or equal to the minimum output power Pmin corresponding to the optimal economical area of the engine and is less than or equal to the maximum allowed power generation power Pmax of the auxiliary motor 5; and in a third case, the entire vehicle requirement power P2 is greater than the maximum allowed power generation power Pmax of the auxiliary motor 5.

In an embodiment of the first case, when the entire vehicle requirement power P2 is less than the minimum output power Pmin corresponding to the optimal economical area of the engine 1, the control module 101 obtains the charging power P3 of the power battery 3 according to the SOC value change rate of the power battery 3, and determines whether the charging power P3 of the power battery 3 is less than the difference between the minimum output power Pmin and the entire vehicle requirement power P2. If the charging power P3 of the power battery 3 is less than the difference between the minimum output power Pmin and the entire vehicle requirement power P2, the control module 101 controls the engine 1 to perform power generation at the minimum output power Pmin to control the power generation power P1 of the auxiliary motor 5; or if the charging power P3 of the power battery 3 is greater than or equal to the difference between the minimum output power Pmin and the entire vehicle requirement power P2, the control module 101 obtains an output power of the engine 1 in the preset optimal economical area according to a sum of the charging power P3 of the power battery 3 and the entire vehicle requirement power P2, and controls the engine to perform power generation at the obtained output power to control the power generation power P1 of the auxiliary motor 5.

It should be noted that, a first relationship table between the SOC value change rate of the power battery 3 and the charging power P3 of the power battery 3 may be pre-stored in the control module 101. Therefore, after obtaining an SOC value change rate of the power battery 3, the control module 101 may obtain a corresponding charging power P3 of the power battery 3 by performing matching on the first relationship table. The SOC value change rate of the power battery 3 and the charging power P3 of the power battery 3 satisfy a relationship shown in Table 1.

TABLE 1

| SOC value change rate of the power battery 3 | A1 | A2 | A3 | A4 | A5 |
|---|---|---|---|---|---|
| Charging power P3 of the power battery 3 | B1 | B2 | B3 | B4 | B5 |

It is learned from Table 1 that, when an SOC value change rate obtained by the control module 101 is A1, an obtained corresponding charging power P3 of the power battery 3 is B1; when an SOC value change rate obtained by the control module 101 is A2, an obtained corresponding charging power P3 of the power battery 3 is B2; when an SOC value change rate obtained by the control module 101 is A3, an obtained corresponding charging power P3 of the power battery 3 is B3; when an SOC value change rate obtained by the control module 101 is A4, an obtained corresponding charging power P3 of the power battery 3 is B4; and when an SOC value change rate obtained by the control module 101 is A5, an obtained corresponding charging power P3 of the power battery 3 is B5.

Specifically, when performing power generation power control on the auxiliary motor 5, the control module 101 obtains the entire vehicle drive power P11 and the electric appliance device power P21 in real time, so as to obtain the entire vehicle requirement power P2 of the hybrid power automobile, and determine the entire vehicle requirement power P2 of the hybrid power automobile. When the entire vehicle requirement power P2 is less than the minimum output power Pmin corresponding to the optimal economical area of the engine 1, the control module 101 may obtain the charging power P3 of the power battery 3 according to the SOC value change rate of the power battery 3, and determine whether the charging power P3 of the power battery 3 is less than or equal to the difference between the minimum output power Pmin and the entire vehicle requirement power P2.

When the entire vehicle requirement power P2 is less than the minimum output power Pmin corresponding to the optimal economical area of the engine 1, if the charging power P3 of the power battery 3 is less than the difference between the minimum output power Pmin and the entire vehicle requirement power P2, that is, P3<Pmin−P2, the control module 101 controls the engine 1 to perform power generation at the minimum output power Pmin to control the power generation power of the auxiliary motor 1. If the charging power P3 of the power battery 3 is greater than or equal to the difference between the minimum output power Pmin and the entire vehicle requirement power P2, that is, P3≥Pmin−P2, the control module 101 obtains the output power of the engine 1 in the preset optimal economical area according to the sum of the charging power P3 of the power battery 3 and the entire vehicle requirement power P2, and controls the engine 1 to perform power generation at the obtained output power to control the power generation power of the auxiliary motor 5.

Therefore, when the entire vehicle requirement power P2 is less than the minimum output power Pmin corresponding to the optimal economical area of the engine 1, the control module 101 obtains the power generation power of the engine 1 according to the relationship between the charging power P3 of the power battery 3 and the difference between the minimum output power Pmin corresponding to the optimal economical area of the engine 1 and the entire vehicle requirement power P2, so that the engine 1 runs in the preset optimal economical area, and the engine 1 performs only power generation but does not participate in drive, thereby reducing fuel consumption of the engine, and reducing noise of the engine.

In an embodiment of the second case, when the entire vehicle requirement power P2 is greater than or equal to the minimum output power Pmin corresponding to the optimal economical area of the engine and is less than or equal to the maximum allowed power generation power Pmax of the auxiliary motor 5, the control module 101 obtains the charging power P3 of the power battery 3 according to the SOC value change rate of the power battery 3, obtains an output power of the engine 1 in the preset optimal economical area according to a sum of the charging power P3 of the power battery 3 and the entire vehicle requirement power P2, and controls the engine 1 to perform power generation at the obtained output power to control the power generation power P1 of the auxiliary motor 5.

Specifically, when the entire vehicle requirement power P2 is greater than or equal to the minimum output power Pmin corresponding to the optimal economical area of the engine 1 and is less than the maximum allowed power generation power Pmax of the auxiliary motor 5, when controlling the engine 1 to operate in the preset optimal economical area, the control module 101 further obtains the charging power P3 of the power battery 3 according to the SOC value change rate of the power battery 3, and obtains the output power of the engine 1 in the preset optimal economical area according to the sum of the charging power P3 of the power battery 3 and the entire vehicle requirement power P2, where the obtained output power is equal to P3+P2. Then, the control module 101 controls the engine 1 to perform power generation at the obtained output power to control the power generation power P1 of the auxiliary motor 5, thereby increasing the SOC value of the power battery 3, and enabling the engine 1 to operate in the preset optimal economical area.

Therefore, when the entire vehicle requirement power P2 is greater than or equal to the minimum output power Pmin corresponding to the optimal economical area of the engine 1 and is less than the maximum allowed power generation power Pmax of the auxiliary motor 5, the control module 101 obtains the output power of the engine 1 according to the sum of the charging power P3 of the power battery 3 and the entire vehicle requirement power P2, so that the engine 1 runs in the preset optimal economical area, and the engine 1 performs only power generation but does not participate in drive, thereby reducing fuel consumption of the engine, and reducing noise of the engine.

In an embodiment of the third case, when the entire vehicle requirement power P2 is greater than the maximum allowed power generation power Pmax of the auxiliary motor 5, the control module 101 further controls the engine 1 to participate in drive to enable the engine 1 to output power to the wheels 7 through the clutch 6.

Specifically, when the entire vehicle requirement power P2 is greater than the maximum allowed power generation power Pmax of the auxiliary motor 5, that is, the entire vehicle requirement power P2 of the hybrid power automobile is greater than the power generation power P1 of the auxiliary motor 5, the control module 101 further controls the engine 1 to output a drive force to the wheels 7 through the clutch 6 to enable the engine 1 to participate in drive. Therefore, the engine 1 undertakes a part of a drive power P, so as to reduce a requirement of the auxiliary motor 5 on the power generation power P1, so that the engine 1 operates in the preset optimal economical area.

Therefore, when the entire vehicle requirement power P2 is greater than the maximum allowed power generation power Pmax of the auxiliary motor 5, the power battery 3 discharges outward to supply power to the power motor 2. In this case, the control module 101 controls the power motor 2 to output power to the wheels 7 of the hybrid power automobile, so that the engine 1 operates in the preset optimal economical area.

Therefore, at a low speed, the engine can operate in an economical area, and perform only power generation but does not participate in drive, and therefore the clutch is not used, thereby reducing abrasion or slip friction of the clutch, reducing an unsmooth feeling, improving comfortableness, reducing fuel consumption, and reducing noise of the engine, so as to maintain low-speed electric balance and low-speed smoothness of the entire vehicle and improve performance of the entire vehicle.

To sum up, according to the power system of a hybrid power automobile proposed in this embodiment of the present invention, the engine outputs power to the wheels of the hybrid power automobile through the clutch, the power motor outputs a drive force to the wheels of the hybrid power automobile, the power battery supplies power to the power motor, the auxiliary motor performs power generation under driving of the engine, and the control module obtains the SOC value of the power battery and the speed of the hybrid power automobile, and controls, according to the SOC value of the power battery and the speed of the hybrid power automobile, the auxiliary motor to enter the power generation power adjustment mode, so that the engine runs in the preset optimal economical area, thereby reducing fuel consumption of the engine, improving running economy of the entire vehicle, reducing noise of the engine, implementing a plurality of drive modes, maintaining low-speed electric balance and low-speed smoothness of the entire vehicle, and improving performance of the entire vehicle.

Embodiment 4

In some embodiments of the present invention, the control module 101 is configured to obtain an SOC (state of charge, also referred to as remaining power level) value of the power battery 3, an SOC value of the low-voltage storage battery 20 and a speed of the hybrid power automobile; and control, according to the SOC value of the power battery 3 and the speed of the hybrid power automobile, the auxiliary motor 5 to enter the power generation power adjustment mode, so that the engine 1 runs in the preset optimal economical area. After the auxiliary motor 5 enters the power generation power adjustment mode, the control module 101 is further configured to adjust the power generation power of the auxiliary motor 5 according to the SOC value of the low-voltage storage battery 20. The power generation power adjustment mode is a mode of adjusting a power generation power of the engine, and in the power generation power adjustment mode, the power generation power of the auxiliary motor 5 may be adjusted by controlling the engine 1 to drive the auxiliary motor 5 to perform power generation.

It should be noted that, the SOC value of the power battery 3 and the SOC value of the low-voltage storage battery 20 may be collected through a battery management system of the hybrid power automobile, and therefore the battery management system sends the SOC value of the power battery 3 and the SOC value of the low-voltage storage battery 20 that are collected to the control module 101, so that the control module 101 obtains the SOC value of the power battery 3 and the SOC value of the low-voltage storage battery 20.

It should be further noted that, the preset optimal economical area of the engine 1 may be determined with reference to a diagram of an engine universal characteristic curve. FIG. 7 shows an example of the diagram of the engine universal characteristic curve, where a vertical coordinate indicates an output torque of the engine 1, a horizontal coordinate indicates a rotational speed of the engine 1, and a curve a is a fuel economy curve of the engine 1. An area corresponding to the fuel economy curve is the optimal economical area of the engine. To be specific, when a torsional moment and a torque of the engine 1 are located on an optimal fuel economy curve of the engine, the engine is located in the optimal economical area. Therefore, in this embodiment of the present invention, the control module 101 may enable, by controlling the rotational speed and the output torque of the engine 1 to fall on the fuel economy curve of the engine, for example, the curve a, the engine 1 to run in the preset optimal economical area.

Specifically, when the hybrid power automobile is travelling, the engine 1 may output power to the wheels 7 of the hybrid power automobile through the clutch 6, and the engine 1 may further drive the auxiliary motor 5 to perform power generation. Therefore, the output power of the engine mainly includes two parts, one part is output to the auxiliary motor 5, that is, the power generation power for driving the auxiliary motor 5 to perform power generation, and the other part is output to the wheels 7, that is, the drive power for driving the wheels 7.

When the engine 1 drives the auxiliary motor 5 to perform power generation, the control module 101 may first obtain the SOC value of the power battery 3 and the speed of the hybrid power automobile, and then control, according to the SOC value of the power battery 3 and the speed of the hybrid power automobile, the auxiliary motor 5 to enter the power generation power adjustment mode, so that the engine 1 operates in the preset optimal economical area. In the power generation power adjustment mode, the control module 101 may adjust the power generation power of the auxiliary motor 5 on the premise of enabling the engine 1 to operate in the preset optimal economical area. After the auxiliary motor 5 enters the power generation power adjustment mode, the control module 101 further adjusts the power generation power of the auxiliary motor 5 according to the SOC value of the low-voltage storage battery 20.

Therefore, the engine 1 is enabled to operate in the preset optimal economical area, and because the engine 1 has lowest fuel consumption and highest fuel economy in the preset optimal economical area, fuel consumption of the engine 1 may be reduced, noise of the engine 1 may be reduced, and running economy of the entire vehicle may be improved. Moreover, because the auxiliary motor 5 has relatively high power generation power and power generation efficiency at a low speed, power consumption requirements of low-speed travelling may be satisfied, and low-speed electric balance of the entire vehicle and low-speed smoothness of the entire vehicle may be maintained, to improve power performance of the entire vehicle. By charging the power battery, power consumption requirements of the power motor and the high-voltage electric appliance device may be ensured, and further it is ensured that the power motor drives the entire vehicle to normally travel; and by charging the low-voltage storage battery, power consumption requirements of the low-voltage electric appliance device may be ensured, and when the auxiliary motor stops power generation and the power battery is faulty or has an insufficient power level, low-voltage power supply of the entire vehicle may be implemented through the low-voltage storage battery, and further it is ensured that the entire vehicle may travel in the pure fuel mode, thereby improving travelling mileage of the entire vehicle.

Further, according to an embodiment of the present invention, the control module 101 configured to: when the SOC value of the power battery 3 is greater than a preset limit value and is less than or equal to a first preset value, control, if the speed of the hybrid power automobile is less than a first preset speed, the auxiliary motor 5 to enter the power generation power adjustment mode.

The first preset value may be a preset upper limit value of the SOC value of the power battery 3, for example, a value of determining to stop charging, and may be preferably 30%. The preset limit value may be a preset lower limit value of the SOC value of the power battery 3, for example, a value of determining to stop discharging, and may be preferably 10%. SOC values of the power battery 3 may be divided into three ranges according to the first preset value and the preset limit value, that is, a first power level range, a second power level range, and a third power level range. When the SOC value of the power battery 3 is less than or equal to the preset limit value, the SOC value of the power battery 3 falls within the first power level range. In this case, the power battery 3 performs only charging but does not perform discharging. When the SOC value of the power battery 3 is greater than the preset limit value and is less than or equal to the first preset value, the SOC value of the power battery 3 falls within the second power level range. In this case, the power battery 3 has a charging requirement, that is, the power battery 3 may be actively charged. When the SOC value of the power battery 3 is greater than the first preset value, the SOC value of the power battery 3 falls within the third power level range. In this case, the power battery 3 may be not charged, that is, the power battery 3 is not actively charged.

Specifically, after obtaining the SOC value of the power battery 3 and the speed of the hybrid power automobile, the control module 101 may determine a range within which the SOC value of the power battery 3 falls. If the SOC value of the power battery 3 falls within the second power level range, and the SOC value of the power battery 3 is greater than the preset limit value and is less than or equal to the first preset value, it indicates that the power battery 3 may be charged. In this case, the control module 101 further determines whether the speed of the hybrid power automobile is less than the first preset speed. If the speed of the hybrid power automobile is less than the first preset speed, the control module 101 controls the auxiliary motor 5 to enter the power generation power adjustment mode. In this case, the speed of the hybrid power automobile is relatively low, a needed drive force is relatively small, the power motor 2 is sufficient to drive the hybrid power automobile to travel, and the engine 1 may drive only the auxiliary motor 5 to perform power generation, but does not participate in drive.

Therefore, at a low speed, the engine performs only power generation but does not participate in drive, and because the engine does not participate in drive, the clutch does not need to be used, thereby reducing abrasion or slip friction of the clutch, reducing an unsmooth feeling, and improving comfortableness.

Further, the control module 101 is further configured to: when the SOC value of the power battery 3 is greater than the preset limit value and is less than or equal to the first preset value, and the speed of the hybrid power automobile is less than the first preset speed, obtain an entire vehicle requirement power of the hybrid power automobile; and when the entire vehicle requirement power is less than or equal to a maximum allowed power generation power of the auxiliary motor 5, control the auxiliary motor 5 to enter the power generation power adjustment mode.

To be specific, after determining that the SOC value of the power battery 3 is greater than the preset limit value and is less than or equal to the first preset value, and the speed of the hybrid power automobile is less than the first preset speed, the control module 101 may further determine whether the entire vehicle requirement power is greater than the maximum allowed power generation power of the auxiliary motor 5. If the entire vehicle requirement power is less than or equal to the maximum allowed power generation power of the auxiliary motor 5, the control module 101 controls the auxiliary motor 5 to enter the power generation power adjustment mode. In this case, a drive force needed by the entire vehicle is relatively small, the entire vehicle requirement power is relatively small, the power motor 2 is sufficient to drive the hybrid power automobile to travel, and the engine 1 may drive only the auxiliary motor 5 to perform power generation, but does not participate in drive.

Therefore, at a low speed, the engine performs only power generation but does not participate in drive, and because the engine does not participate in drive, the clutch does not need to be used, thereby reducing abrasion or slip friction of the clutch, reducing an unsmooth feeling, and improving comfortableness.

Furthermore, the control module 101 is further configured to: when the SOC value of the power battery is greater than the preset limit value and is less than or equal to the first preset value, the speed of the hybrid power automobile is less than the first preset speed, and the entire vehicle requirement power is less than or equal to the maximum allowed power generation power of the auxiliary motor, obtain an accelerator pedal depth of the hybrid power automobile and an entire vehicle resistance of the hybrid power automobile; and when the accelerator pedal depth is less than or equal to a first preset depth and the entire vehicle resistance of the hybrid power automobile is less than or equal to a first preset resistance, control the auxiliary motor to enter the power generation power adjustment mode.

It should be noted that, the entire vehicle resistance of the hybrid power automobile may be travelling resistances of the hybrid power automobile, for example, a rolling resistance, an accelerating resistance, a grade resistance, and an air resistance.

To be specific, after determining that the SOC value of the power battery 3 is greater than the preset limit value and is less than or equal to the first preset value, the speed of the hybrid power automobile is less than the first preset speed, and the entire vehicle requirement power is less than or equal to the maximum allowed power generation power of the auxiliary motor 5, the control module 101 may further determine whether the accelerator pedal depth is greater than the first preset depth and whether the entire vehicle resistance of the hybrid power automobile is greater than the first preset resistance. If the accelerator pedal depth is less than or equal to the first preset depth or the entire vehicle resistance of the hybrid power automobile is less than or equal to the first preset resistance, the control module 101 controls the auxiliary motor 5 to enter the power generation power adjustment mode. In this case, a drive force needed by the entire vehicle is relatively small, the entire vehicle requirement power is relatively small, the accelerator pedal depth is relatively small, the entire vehicle resistance is also relatively small, the power motor 2 is sufficient to drive the hybrid power automobile to travel, and the engine 1 may drive only the auxiliary motor 5 to perform power generation, but does not participate in drive.

Therefore, at a low speed, the engine performs only power generation but does not participate in drive, and because the engine does not participate in drive, the clutch does not need to be used, thereby reducing abrasion or slip friction of the clutch, reducing an unsmooth feeling, and improving comfortableness.

As described above, when the hybrid power automobile is travelling at a low speed, the engine 1 may perform only power generation but does not participate in drive, and because the engine does not participate in drive, the clutch does not need to be used, thereby reducing abrasion or slip friction of the clutch, reducing an unsmooth feeling, and improving comfortableness. Moreover, the low speed enables the engine to operate in an economical area, and because the engine has lowest fuel consumption and highest fuel economy in the preset optimal economical area, thereby reducing fuel consumption, reducing noise of the engine, and improving running economy of the entire vehicle, so as to maintain low-speed electric balance and low-speed smoothness of the entire vehicle and improve performance of the entire vehicle.

Additionally, according to an embodiment of the present invention, the control module 101 is further configured to: when the SOC value of the power battery 3 is less than the preset limit value, the speed of the hybrid power automobile is greater than or equal to the first preset speed, the entire vehicle requirement power is greater than the maximum allowed power generation power of the auxiliary motor 5, the accelerator pedal depth is greater than the first preset depth, or the entire vehicle resistance of the hybrid power automobile is greater than the first preset resistance, control the engine 1 to participate in drive.

To be specific, when the SOC value of the power battery 3 is less than the preset limit value M2, the speed of the hybrid power automobile is greater than or equal to the first preset speed, the entire vehicle requirement power is greater than the maximum allowed power generation power of the auxiliary motor 5, the accelerator pedal depth is greater than the first preset depth, or the entire vehicle resistance of the hybrid power automobile is greater than the first preset resistance, the control module 101 controls the engine 1 to participate in drive. In this case, the power battery 3 does not perform discharging again, the entire vehicle needs a relatively large drive force, the entire vehicle requirement power is relatively large, the accelerator pedal depth is relatively large or the entire vehicle resistance is also relatively large, the power motor 2 is insufficient to drive the hybrid power automobile to travel, and the engine 1 participates in drive to perform supplemental drive.

Therefore, the engine 1 may participate in drive when the drive force output by the power motor 2 is insufficient, thereby ensuring normal travelling of the entire vehicle, improving power performance of the entire vehicle, and improving travelling mileage of the entire vehicle.

More specifically, the control module 101 is further configured to: when the entire vehicle requirement power is greater than the maximum allowed power generation power of the auxiliary motor 5, control the engine 1 to participate in drive to enable the engine 1 to output power to wheels through the clutch 6.

Moreover, the control module 101 is further configured to: when the SOC value of the power battery 3 is less than or equal to the preset limit value, control the engine 1 to participate in drive to enable the engine 1 to output power to wheels through the clutch 6; when the SOC value of the power battery 3 is less than or equal to the first preset value, the speed of the hybrid power automobile is less than the first preset speed and the accelerator pedal depth is greater than the first preset depth, control the engine 1 to participate in drive to enable the engine 1 to output power to the wheels through the clutch 6; and when the SOC value of the power battery 3 is less than or equal to the first preset value, the speed of the hybrid power automobile is less than the first preset speed and the entire vehicle resistance of the hybrid power automobile is greater than the first preset resistance, control the engine 1 to participate in drive to enable the engine 1 to output power to the wheels through the clutch 6.

To be specific, the control module 101 may obtain the SOC value of the power battery 3, the accelerator pedal depth of the hybrid power automobile, the speed, the entire vehicle resistance and the entire vehicle requirement power in real time, and determine the SOC value of the power battery 3, the accelerator pedal depth of the hybrid power automobile, the speed and the entire vehicle resistance:

First, when the SOC value of the power battery 3 is less than the preset limit value, because the power level of the power battery 3 is excessively low, and the power battery 3 cannot provide sufficient electric energy, the control module 101 controls the engine 1 and the power motor 2 to simultaneously participate in drive. In this case, the control module 101 may further control the engine 1 to drive the auxiliary motor 5 to perform power generation, and by adjusting the power generation power of the auxiliary motor 5, the engine 1 is enabled to operate in the preset optimal economical area.

Second, when the SOC value of the power battery 3 is less than or equal to the first preset value, the speed of the hybrid power automobile is less than the first preset speed and the accelerator pedal depth is greater than the first preset depth, because the accelerator pedal depth is relatively large, the control module 101 controls the engine 1 and the power motor 2 to simultaneously participate in drive. In this case, the control module 101 may further control the engine 1 to drive the auxiliary motor 5 to perform power generation, and by adjusting the power generation power of the auxiliary motor 5, the engine 1 is enabled to operate in the preset optimal economical area.

Third, when the SOC value of the power battery 3 is less than or equal to the first preset value, the speed of the hybrid power automobile is less than the first preset speed and the entire vehicle resistance of the hybrid power automobile is greater than the first preset resistance, because the entire vehicle resistance is relatively large, the control module 101 controls the engine 1 and the power motor 2 to simultaneously participate in drive. In this case, the control module 101 may further control the engine 1 to drive the auxiliary motor 5 to perform power generation, and by adjusting the power generation power of the auxiliary motor 5, the engine 1 is enabled to operate in the preset optimal economical area.

Therefore, the engine 1 may participate in drive when the drive force output by the power motor 2 is insufficient, thereby ensuring normal travelling of the entire vehicle, improving power performance of the entire vehicle, and improving travelling mileage of the entire vehicle. Moreover, the engine may be controlled to operate in an economical area, and because the engine 1 has lowest fuel consumption and highest fuel economy in the preset optimal economical area, fuel consumption may be reduced, noise of the engine may be reduced, and economic performance of the entire vehicle may be improved.

Moreover, the control module 101 is further configured to: when the SOC value of the power battery 3 is less than or equal to the preset limit value, and the speed of the hybrid power automobile is greater than the first preset speed, control the engine 1 to participate in drive to enable the engine 1 to output power to the wheels 7 through the clutch 6.

Therefore, the engine 1 may participate in drive when the drive force output by the power motor 2 is insufficient, thereby ensuring normal travelling of the entire vehicle, improving power performance of the entire vehicle, and improving travelling mileage of the entire vehicle.

Certainly, it should be understood that, the control module 101 is further configured to: when the SOC value of the power battery 3 is greater than the first preset value, control the engine 1 not to drive the auxiliary motor 5 to perform power generation. In this case, the power battery 3 has an approximately full power level, and does not need to be charged, and the engine 1 does not drive the auxiliary motor 5 to perform power generation. To be specific, when the power battery 3 has an approximately full power level, the engine 1 does not drive the auxiliary motor 5 to perform power generation, and therefore the auxiliary motor 5 does not charge the power battery 3.

Further, after the auxiliary motor 5 enters the power generation power adjustment mode, the control module 101 may adjust the power generation power of the auxiliary motor 5. A process of adjusting the power generation power of the control module 101 of this embodiment of the present invention is specifically described below.

According to an embodiment of the present invention, the control module 101 is further configured to: after the auxiliary motor 5 enters the power generation power adjustment mode, adjust the power generation power of the auxiliary motor 5 according to the entire vehicle requirement power of the hybrid power automobile, the charging power of the power battery 3, the charging power of the low-voltage storage battery 20, and the SOC value of the low-voltage storage battery 20.

Specifically, a formula of adjusting the power generation power of the auxiliary motor 5 according to the entire vehicle requirement power of the hybrid power automobile, the charging power of the power battery 3 and the charging power of the low-voltage storage battery 20 may be as follows:

$P1 = P2 + P3 + P4$, where $P2 = P11 + P21$.

P1 is the power generation power of the auxiliary motor 5, P2 is the entire vehicle requirement power, P3 is the charging power of the power battery 3, P4 is the charging power of the low-voltage storage battery 20, P11 is an entire vehicle drive power, and P21 is an electric appliance device power.

It should be noted that, electric appliance devices include the first electric appliance device 10 and the second electric appliance device 30, that is, the electric appliance device power P21 may include power needed by the high-voltage electric appliance device and the low-voltage electric appliance device.

It should be further noted that, the entire vehicle drive power P11 may include the output power of the power motor 2, and the control module 101 may obtain the entire vehicle drive power P11 according to a preset accelerator-torsional moment curve of the power motor 2 and a rotational speed of the power motor 2, where the preset accelerator-torsional moment curve may be determined during power matching of the hybrid power automobile. The control module 101 may obtain the electric appliance device power P21 in real time according to electric appliance devices running on the entire vehicle, for example, calculate the electric appliance device power P21 through DC consumption on a bus. The control module 101 may obtain the charging power P3 of the power battery 3 according to the SOC value of the power battery 3, and obtain the charging power P4 of the low-voltage storage battery 20 according to the SOC value of the low-voltage storage battery 20.

Specifically, when the hybrid power automobile is travelling, the control module 101 may obtain the charging power P3 of the power battery 3, the charging power P4 of the low-voltage storage battery 20, the entire vehicle drive power P11 and the electric appliance device power P21, and use a sum of the charging power P3 of the power battery 3, the charging power P4 of the low-voltage storage battery 20, the entire vehicle drive power P11 and the electric appliance device power P21 as the power generation power P1 of the auxiliary motor 5. Therefore, the control module 101 may adjust the power generation power of the auxiliary motor 5 according to the calculated P1 value. For example, the control module 101 may control the output torque and the rotational speed of the engine 1 according to the calculated P1 value, so as to adjust the power for the engine 1 to drive the auxiliary motor 5 to perform power generation.

Further, according to an embodiment of the present invention, the control module 101 is further configured to: obtain an SOC value change rate of the power battery 3, and adjust the power generation power of the auxiliary motor 5 according to a relationship between the entire vehicle requirement power P2 and a minimum output power Pmin corresponding to the optimal economical area of the engine 1, the SOC value change rate of the power battery 3, the SOC value of the low-voltage storage battery 20, and the SOC value change rate of the low-voltage storage battery 20.

It should be understood that, the control module 101 may obtain the SOC value change rate of the power battery 3 according to the SOC value of the power battery 3, for example, collect the SOC value of the power battery 3 once at each time interval t. In this way, a ratio of a difference between a current SOC value and a former SOC value of the power battery 3 to the time interval t may be used as the SOC value change rate of the power battery 3. Similarly, the control module 101 may obtain the SOC value change rate of the low-voltage storage battery 20 according to the SOC value of the low-voltage storage battery 20, for example, collect the SOC value of the low-voltage storage battery 20 once at each time interval t. In this way, a ratio of a difference between a current SOC value and a former SOC value of the low-voltage storage battery 20 to the time interval t may be used as the SOC value change rate of the low-voltage storage battery 20.

Specifically, the optimal economical area of the engine may be determined according to the engine universal characteristic curve shown in FIG. 7, and then the minimum output power Pmin corresponding to the optimal economical area of the engine is obtained. After determining the minimum output power Pmin corresponding to the optimal economical area of the engine, the control module 101 may adjust the power generation power of the auxiliary motor 5 according to the relationship between the entire vehicle requirement power P2 and the minimum output power Pmin corresponding to the optimal economical area of the engine 1, the SOC value change rate of the power battery 3, the SOC value of the low-voltage storage battery 20, and the SOC value change rate of the low-voltage storage battery 20.

Therefore, when the hybrid power automobile is travelling at a low speed, the engine is enabled to operate in an economical area, thereby reducing fuel consumption, reducing noise of the engine, and improving economic performance of the entire vehicle. Moreover, at a low speed, the engine 1 may perform only power generation but does not participate in drive, and because the engine does not participate in drive, the clutch does not need to be used, thereby reducing abrasion or slip friction of the clutch, reducing an unsmooth feeling, and improving comfortableness, so as to maintain low-speed electric balance and low-speed smoothness of the entire vehicle and improve performance of the entire vehicle.

A specific adjusting manner in which after the auxiliary motor 5 enters the power generation power adjustment mode, the control module 101 adjusts the power generation power of the auxiliary motor 5 according to the relationship between the entire vehicle requirement power P2 and the minimum output power Pmin corresponding to the optimal economical area of the engine 1, the SOC value change rate of the power battery 3, the SOC value of the low-voltage storage battery 20, and the SOC value change rate of the low-voltage storage battery 20 is further described below.

Specifically, the control module 101 is further configured to: when the SOC value of the low-voltage storage battery 20 is greater than a preset low power level threshold, obtain the charging power P3 of the power battery 3 according to the SOC value change rate of the power battery 3, and determine whether the charging power P3 of the power battery 3 is less than the difference between the minimum output power Pmin corresponding to the optimal economical area of the engine 1 and the entire vehicle requirement power P2. If the charging power P3 of the power battery 3 is less than the difference between the minimum output power Pmin corresponding to the optimal economical area of the engine 1 and the entire vehicle requirement power P2, the control module 101 controls the engine 1 to perform power generation at the minimum output power to adjust the power generation power of the auxiliary motor 5; or if the charging power P3 of the power battery 3 is greater than or equal to the difference between the minimum output power Pmin corresponding to the optimal economical area of the engine 1 and the entire vehicle requirement power P2, the control module 101 obtains the output power of the engine 1 in the preset optimal economical area according to the sum of the charging power P3 of the power battery 3 and the entire vehicle requirement power P2, and controls the engine 1 to perform power generation at the obtained output power to adjust the power generation power of the auxiliary motor 5.

Specifically, the control module 101 is further configured to: when the SOC value of the low-voltage storage battery 20 is less than or equal to the preset low power level threshold, obtain the SOC value change rate of the low-voltage storage battery 20 and the SOC value change rate of the power battery 3, obtain the charging power P4 of the low-voltage storage battery 20 according to the SOC value change rate of the low-voltage storage battery 20, obtain the charging power P3 of the power battery 3 according to the SOC value change rate of the power battery 3, and determine whether the sum of the charging power P4 of the low-voltage storage battery 20 and the charging power P3 of the power battery 3 is less than the difference between the minimum output power Pmin corresponding to the optimal economical area of the engine 1 and the entire vehicle requirement power P2. If the sum of the charging power P4 of the low-voltage storage battery 20 and the charging power P3 of the power battery 3 is less than the difference between the minimum output power Pmin corresponding to the optimal economical area of the engine 1 and the entire vehicle requirement power P2, the control module 101 controls the engine 1 to perform power generation at the minimum output power Pmin to adjust the power generation power of the auxiliary motor 5; or if the sum of the charging power P4 of the low-voltage storage battery 20 and the charging power P3 of the power battery 3 is greater than or equal to the difference between the minimum output power Pmin corresponding to the optimal economical area of the engine 1 and the entire vehicle requirement power P2, the control module 101 obtains the output power of the engine 1 in the preset optimal economical area according to the sum of the charging power P3 of the power battery 3, the charging power P4 of the low-voltage storage battery 20 and the entire vehicle requirement power P2, and controls the engine 1 to perform power generation at the obtained output power to adjust the power generation power of the auxiliary motor 5.

It should be noted that, a first relationship table between the SOC value change rate of the power battery 3 and the charging power P3 of the power battery 3 may be pre-stored in the control module 101. Therefore, after obtaining an SOC value change rate of the power battery 3, the control module 101 may obtain a corresponding charging power P3 of the power battery 3 by performing matching on the first relationship table. For example, a first relationship table between the SOC value change rate of the power battery 3 and the charging power P3 of the power battery 3 may be shown in Table 1.

TABLE 1

| | | | | | |
|---|---|---|---|---|---|
| SOC value change rate of the power battery 3 | A1 | A2 | A3 | A4 | A5 |
| Charging power of the power battery 3 | B1 | B2 | B3 | B4 | B5 |

It can be learned from Table 1 that, when an SOC value change rate of the power battery 3 is A1, a corresponding charging power P3 of the power battery 3 that the control module 101 may obtain is B 1; when an SOC value change rate of the power battery 3 is A2, a corresponding charging power P3 of the power battery 3 that the control module 101 may obtain is B2; when an SOC value change rate of the power battery 3 is A3, a corresponding charging power P3 of the power battery 3 that the control module 101 may obtain is B3; when an SOC value change rate of the power battery 3 is A4, a corresponding charging power P3 of the power battery 3 that the control module 101 may obtain is B4; and when an SOC value change rate of the power battery 3 is A5, a corresponding charging power P3 of the power battery 3 that the control module 101 may obtain is B5.

Similarly, a second relationship table between the SOC value change rate of the low-voltage storage battery 20 and the charging power P4 of the low-voltage storage battery 20 may be pre-stored in the control module 101. Therefore, after obtaining an SOC value change rate of the low-voltage storage battery 20, the control module 101 may obtain a corresponding charging power P4 of the low-voltage storage battery 20 by performing matching on the second relationship table. For example, a second relationship table between the SOC value change rate of the low-voltage storage battery 20 and the charging power P4 of the low-voltage storage battery 20 may be shown in Table 2.

TABLE 2

| SOC value change rate of the low-voltage storage battery 20 | A11 | A12 | A13 | A14 | A15 |
|---|---|---|---|---|---|
| Charging power of the low-voltage storage battery 20 | B11 | B12 | B13 | B14 | B15 |

It can be learned from Table 2 that, when an SOC value change rate of the low-voltage storage battery 20 is A11, a corresponding charging power P4 of the low-voltage storage battery 20 that the control module 101 may obtain is B11; when an SOC value change rate of the low-voltage storage battery 20 is A12, a corresponding charging power P4 of the low-voltage storage battery 20 that the control module 101 may obtain is B12; when an SOC value change rate of the low-voltage storage battery 20 is A13, a corresponding charging power P4 of the low-voltage storage battery 20 that the control module 101 may obtain is B13; when an SOC value change rate of the low-voltage storage battery 20 is A14, a corresponding charging power P4 of the low-voltage storage battery 20 that the control module 101 may obtain is B14; and when an SOC value change rate of the low-voltage storage battery 20 is A15, a corresponding charging power P4 of the low-voltage storage battery 20 that the control module 101 may obtain is B15.

Specifically, after the auxiliary motor 5 enters the power generation power adjustment mode, the control module 101 may obtain the SOC value of the low-voltage storage battery 20, the SOC value of the power battery 3, and the entire vehicle requirement power P2 (the sum of the entire vehicle drive power P11 and the electric appliance device power P21), and then determine whether the SOC value of the low-voltage storage battery 20 is greater than the preset low power level threshold.

If the SOC value of the low-voltage storage battery 20 is greater than the preset low power level threshold, the control module 101 obtains the SOC value change rate of the power battery 3, and queries for the charging power P3 of the power battery 3 corresponding to the SOC value change rate of the power battery 3, so as to select an appropriate charging power P3 to enable the SOC value of the power battery 3 to increase; and further determines whether the charging power P3 of the power battery 3 is less than the difference between the minimum output power Pmin corresponding to the optimal economical area of the engine 1 and the entire vehicle requirement power P2. If yes, that is, $P3<Pmin-P2$, the control module 101 controls the engine 1 to perform power generation at the minimum output power Pmin to adjust the power generation power of the auxiliary motor 5, that is, controls the engine 1 to run at the minimum output power Pmin corresponding to the optimal economical area; or if not, that is, $P3 \geq Pmin-P2$, the control module 101 obtains the output power of the engine 1 in the preset optimal economical area according to the sum of the charging power P3 of the power battery 3 and the entire vehicle requirement power P2, and controls the engine 1 to perform power generation at the obtained output power to adjust the power generation power of the auxiliary motor 5. To be specific, the control module 101 searches for a corresponding output power in the preset optimal economical area of the engine 1, where the obtained output power may be the sum of the charging power P3 of the power battery 3 and the entire vehicle requirement power P2, that is, (P2+P3 or P11+P21+P3), and in this case, may control the engine 1 to perform power generation at the obtained output power.

If the SOC value of the low-voltage storage battery 20 is less than or equal to the preset low power level threshold, the control module 101 obtains the SOC value change rate of the power battery 3, and queries for the charging power P3 of the power battery 3 corresponding to the SOC value change rate of the power battery 3, so as to select an appropriate charging power P3 to enable the SOC value of the power battery 3 to increase; obtains the SOC value change rate of the low-voltage storage battery 20, and queries for the charging power P4 of the low-voltage storage battery 20 corresponding to the SOC value change rate of the low-voltage storage battery 20, to select an appropriate charging power P4 to enable the SOC value of the low-voltage storage battery 20 to increase; and further determines whether the sum of the charging power P4 of the low-voltage storage battery 20 and the charging power P3 of the power battery 3 is less than the difference between the minimum output power Pmin corresponding to the optimal economical area of the engine 1 and the entire vehicle requirement power P2. If yes, that is, $P3+P4<Pmin-P2$, the control module 101 controls the engine 1 to perform power generation at the minimum output power Pmin to adjust the power generation power of the auxiliary motor 5, that is, controls the engine 1 to run at the minimum output power Pmin corresponding to the optimal economical area, and to charge the power battery 3 and the low-voltage storage battery 20 at a power equal to the minimum output power Pmin corresponding to the optimal economical area minus the entire vehicle requirement power P2, that is, Pmin−P2; or if not, that is, $P3+P4 \geq Pmin-P2$, the control module 101 obtains the output power of the engine 1 in the preset optimal economical area according to the sum of the charging power P3 of the power battery 3, the charging power P4 of the low-voltage storage battery 20 and the entire vehicle requirement power P2, and controls the engine 1 to perform power generation at the obtained output power to adjust the power generation power of the auxiliary motor 5. To be specific, the control module 101 searches for a corresponding power in the preset optimal economical area of the engine 1, where the obtained output power is the sum of the charging power P3 of the power battery 3, the charging power P4 of the low-voltage storage battery 20 and the entire vehicle requirement power P2, that is, (P2+P3+P4 or P11+P21+P3+P4), and controls the engine 1 to perform power generation at the obtained output power.

Therefore, at a low speed, the engine can operate in an economical area, and perform only power generation but does not participate in drive, and therefore the clutch is not used, thereby reducing abrasion or slip friction of the clutch, reducing an unsmooth feeling, improving comfortableness, reducing fuel consumption, and reducing noise of the engine, so as to maintain low-speed electric balance and low-speed smoothness of the entire vehicle and improve performance of the entire vehicle.

To sum up, according to the power system of a hybrid power automobile proposed in this embodiment of the present invention, the engine outputs power to the wheels of the hybrid power automobile through the clutch, the power motor outputs a drive force to the wheels of the hybrid power automobile, the power battery supplies power to the power motor, and when performing power generation under driving of the engine, the auxiliary motor implements at least one of charging the power battery, supplying power to the power motor, and supplying power to the DC-DC converter, and the control module obtains the SOC value of the power battery, the SOC value of the low-voltage storage battery and the speed of the hybrid power automobile, and controls, according to the SOC value of the power battery and the speed of the hybrid power automobile, the auxiliary motor to enter the power generation power adjustment mode, so that the engine runs in the preset optimal economical area. After the auxiliary motor enters the power generation power adjustment mode, the control module is further configured to adjust the power generation power of the auxiliary motor according to the SOC value of the low-voltage storage battery. Therefore, the engine is enabled not to participate in drive at a low speed, and therefore the clutch is not used, thereby reducing abrasion or slip friction of the clutch, reducing an unsmooth feeling, and improving comfortableness; and at a low speed, the engine is enabled to operate in an economical area, to perform only power generation but does not perform drive, thereby reducing fuel consumption, reducing noise of the engine, maintaining low-speed electric balance and low-speed smoothness of the entire vehicle, and improving performance of the entire vehicle.

Embodiment 5

In some embodiments of the present invention, the control module 101 is configured to obtain an SOC (state of charge, also referred to as remaining power level) value of the power battery 3, an SOC value of the low-voltage storage battery 20 and a speed of the hybrid power automobile, control a power generation power of the auxiliary motor 5 according to the SOC value of the power battery 3, the SOC value of the low-voltage storage battery 20 and the speed of the hybrid power automobile, and obtaining a power generation power of the engine 1 according to the power generation power of the auxiliary motor 5 to control the engine 1 to run in a preset optimal economical area.

It should be noted that, the SOC value of the power battery 3 and the SOC value of the low-voltage storage battery 20 may be collected through a battery management system of the hybrid power automobile, and therefore the battery management system sends the SOC value of the power battery 3 and the SOC value of the low-voltage storage battery 20 that are collected to the control module 101, so that the control module 101 obtains the SOC value of the power battery 3 and the SOC value of the low-voltage storage battery 20.

It should be further noted that, the preset optimal economical area of the engine 1 may be determined with reference to a diagram of an engine universal characteristic curve. FIG. 7 shows an example of the diagram of the engine universal characteristic curve, where a vertical coordinate indicates an output torque of the engine 1, a horizontal coordinate indicates a rotational speed of the engine 1, and a curve a is a fuel economy curve of the engine 1. An area corresponding to the fuel economy curve is the optimal economical area of the engine. To be specific, when a torsional moment and a torque of the engine 1 are located on an optimal fuel economy curve of the engine, the engine is located in the optimal economical area. Therefore, in this embodiment of the present invention, the control module 101 may enable, by controlling the rotational speed and the output torque of the engine 1 to fall on the fuel economy curve of the engine, for example, the curve a, the engine 1 to run in the preset optimal economical area.

Specifically, when the hybrid power automobile is travelling, the engine 1 may output power to the wheels 7 of the hybrid power automobile through the clutch 6, and the engine 1 may further drive the auxiliary motor 5 to perform power generation. Therefore, the output power of the engine mainly includes two parts, one part is output to the auxiliary motor 5, that is, the power generation power for driving the auxiliary motor 5 to perform power generation, and the other part is output to the wheels 7, that is, the drive power for driving the wheels 7.

When the engine 1 drives the auxiliary motor 5 to perform power generation, the control module 101 may first obtain the SOC value of the power battery 3, the SOC value of the low-voltage storage battery 20 and the speed of the hybrid power automobile, then control the power generation power of the auxiliary motor 5 according to the SOC value of the power battery 3, the SOC value of the low-voltage storage battery 20 and the speed of the hybrid power automobile, and further obtain the power generation power of the engine 1 according to the power generation power of the auxiliary motor 5, so as to control the engine 1 to run in the preset optimal economical area. In other words, the control module 101 may control the power generation power of the auxiliary motor 5 on the premise of enabling the engine 1 to operate in the preset optimal economical area.

Therefore, the engine 1 is enabled to operate in the preset optimal economical area, and because the engine 1 has lowest fuel consumption and highest fuel economy in the preset optimal economical area, fuel consumption of the engine 1 may be reduced, noise of the engine 1 may be reduced, and running economy of the entire vehicle may be improved. Moreover, because the auxiliary motor 5 has relatively high power generation power and power generation efficiency at a low speed, power consumption requirements of low-speed travelling may be satisfied, and low-speed electric balance of the entire vehicle and low-speed smoothness of the entire vehicle may be maintained, to improve power performance of the entire vehicle. By charging the power battery, power consumption requirements of the power motor and the high-voltage electric appliance device may be ensured, and further it is ensured that the power motor drives the entire vehicle to normally travel; and by charging the low-voltage storage battery, power consumption requirements of the low-voltage electric appliance device may be ensured, and when the auxiliary motor stops power generation and the power battery is faulty or has an insufficient power level, low-voltage power supply of the entire vehicle may be implemented through the low-voltage storage battery, and further it is ensured that the entire vehicle may travel in the pure fuel mode, thereby improving travelling mileage of the entire vehicle.

Further, according to an embodiment of the present invention, the control module 101 configured to: when the SOC value of the power battery 3 is greater than a preset limit value and is less than or equal to a first preset value, control the power generation power of the auxiliary motor 5 if the speed of the hybrid power automobile is less than a first preset speed.

The first preset value may be a preset upper limit value of the SOC value of the power battery 3, for example, a value of determining to stop charging, and may be preferably 30%. The preset limit value may be a preset lower limit value of the SOC value of the power battery 3, for example, a value of determining to stop discharging, and may be preferably 10%. SOC values of the power battery 3 may be divided into three ranges according to the first preset value and the preset limit value, that is, a first power level range, a second power level range, and a third power level range. When the SOC value of the power battery 3 is less than or equal to the preset limit value, the SOC value of the power battery 3 falls within the first power level range. In this case, the power battery 3 performs only charging but does not perform discharging. When the SOC value of the power battery 3 is greater than the preset limit value and is less than or equal to the first preset value, the SOC value of the power battery 3 falls within the second power level range. In this case, the power battery 3 has a charging requirement, that is, the power battery 3 may be actively charged. When the SOC value of the power battery 3 is greater than the first preset value, the SOC value of the power battery 3 falls within the third power level range. In this case, the power battery 3 may be not charged, that is, the power battery 3 is not actively charged. Specifically, after obtaining the SOC value of the power battery 3 and the speed of the hybrid power automobile, the control module 101 may determine a range within which the SOC value of the power battery 3 falls. If the SOC value of the power battery 3 falls within the second power level range, and the SOC value of the power battery 3 is greater than the preset limit value and is less than or equal to the first preset value, it indicates that the power battery 3 may be charged. In this case, the control module 101 further determines whether the speed of the hybrid power automobile is less than the first preset speed. If the speed of the hybrid power automobile is less than the first preset speed, the control module 101 controls the power generation power of the auxiliary motor 5. In this case, the speed of the hybrid power automobile is relatively low, a needed drive force is relatively small, the power motor 2 is sufficient to drive the hybrid power automobile to travel, and the engine 1 may drive only the auxiliary motor 5 to perform power generation, but does not participate in drive.

Therefore, at a low speed, the engine performs only power generation but does not participate in drive, and because the engine does not participate in drive, the clutch does not need to be used, thereby reducing abrasion or slip friction of the clutch, reducing an unsmooth feeling, and improving comfortableness.

Further, the control module 101 is further configured to: when the SOC value of the power battery 3 is greater than the preset limit value and is less than or equal to the first preset value, and the speed of the hybrid power automobile is less than the first preset speed, obtain an entire vehicle requirement power of the hybrid power automobile; and when the entire vehicle requirement power is less than or equal to a maximum allowed power generation power of the auxiliary motor 5, control the power generation power of the auxiliary motor 5.

To be specific, after determining that the SOC value of the power battery 3 is greater than the preset limit value and is less than or equal to the first preset value, and the speed of the hybrid power automobile is less than the first preset speed, the control module 101 may further determine whether the entire vehicle requirement power is greater than the maximum allowed power generation power of the auxiliary motor 5. If the entire vehicle requirement power is less than or equal to the maximum allowed power generation power of the auxiliary motor 5, the control module 101 controls the power generation power of the auxiliary motor 5. In this case, a drive force needed by the entire vehicle is relatively small, the entire vehicle requirement power is relatively small, the power motor 2 is sufficient to drive the hybrid power automobile to travel, and the engine 1 may drive only the auxiliary motor 5 to perform power generation, but does not participate in drive.

Therefore, at a low speed, the engine performs only power generation but does not participate in drive, and because the engine does not participate in drive, the clutch does not need to be used, thereby reducing abrasion or slip friction of the clutch, reducing an unsmooth feeling, and improving comfortableness.

Furthermore, the control module 101 is further configured to: when the SOC value of the power battery 3 is greater than the preset limit value and is less than or equal to the first preset value, the speed of the hybrid power automobile is less than the first preset speed, and the entire vehicle requirement power is less than or equal to the maximum allowed power generation power of the auxiliary motor 5, obtain an accelerator pedal depth of the hybrid power automobile and an entire vehicle resistance of the hybrid power automobile; and when the accelerator pedal depth is less than or equal to a first preset depth and the entire vehicle resistance of the hybrid power automobile is less than or equal to a first preset resistance, control the power generation power of the auxiliary motor 5.

It should be noted that, the entire vehicle resistance of the hybrid power automobile may be travelling resistances of the hybrid power automobile, for example, a rolling resistance, an accelerating resistance, a grade resistance, and an air resistance.

To be specific, after determining that the SOC value of the power battery 3 is greater than the preset limit value and is less than or equal to the first preset value, the speed of the hybrid power automobile is less than the first preset speed, and the entire vehicle requirement power is less than or equal to the maximum allowed power generation power of the auxiliary motor 5, the control module 101 may further determine whether the accelerator pedal depth is greater than the first preset depth or whether the entire vehicle resistance of the hybrid power automobile is greater than the first preset resistance. If the accelerator pedal depth is less than or equal to the first preset depth and the entire vehicle resistance of the hybrid power automobile is less than or equal to the first preset resistance, the control module 101 controls the power generation power of the auxiliary motor 5. In this case, a drive force needed by the entire vehicle is relatively small, the entire vehicle requirement power is relatively small, the accelerator pedal depth is relatively small, the entire vehicle resistance is also relatively small, the power motor 2 is sufficient to drive the hybrid power automobile to travel, and the engine 1 may drive only the auxiliary motor 5 to perform power generation, but does not participate in drive.

Therefore, at a low speed, the engine performs only power generation but does not participate in drive, and because the engine does not participate in drive, the clutch does not need to be used, thereby reducing abrasion or slip friction of the clutch, reducing an unsmooth feeling, and improving comfortableness.

As described above, when the hybrid power automobile is travelling at a low speed, the engine 1 may perform only power generation but does not participate in drive, and because the engine does not participate in drive, the clutch does not need to be used, thereby reducing abrasion or slip friction of the clutch, reducing an unsmooth feeling, and improving comfortableness. Moreover, the low speed enables the engine to operate in an economical area, and because the engine has lowest fuel consumption and highest fuel economy in the preset optimal economical area, thereby reducing fuel consumption, reducing noise of the engine, and improving running economy of the entire vehicle, so as to maintain low-speed electric balance and low-speed smoothness of the entire vehicle and improve performance of the entire vehicle.

According to a specific embodiment of the present invention, the control module 101 is further configured to: when controlling the engine 1 to individually drive the auxiliary motor 5 to perform power generation and controlling the power motor 2 to output a drive force alone, obtain the power generation power of the engine 1 according to the following formula:

$$P0 = P1/\eta/\zeta$$

where P0 is the power generation power of the engine 1, P1 is the power generation power of the auxiliary motor 5, η is belt transmission efficiency, and ζ is efficiency of the auxiliary motor 5.

To be specific, if the engine 1 may perform only power generation but does not participate in drive, the control module 101 may calculate the power generation power P0 of the engine 1 according to the power generation power of the auxiliary motor 5, the belt transmission efficiency η and the efficiency ζ of the auxiliary motor 5, and control the engine 1 to drive the auxiliary motor 5 at the obtained power generation power P0 to perform power generation, so as to control the power generation power of the auxiliary motor 5.

Additionally, according to an embodiment of the present invention, the control module 101 is further configured to: when the SOC value of the power battery 3 is less than the preset limit value, the speed of the hybrid power automobile is greater than or equal to the first preset speed, the entire vehicle requirement power is greater than the maximum allowed power generation power of the auxiliary motor 5, the accelerator pedal depth is greater than the first preset depth, or the entire vehicle resistance of the hybrid power automobile is greater than the first preset resistance, control the engine 1 to participate in drive.

To be specific, when the SOC value of the power battery 3 is less than the preset limit value M2, the speed of the hybrid power automobile is greater than or equal to the first preset speed, the entire vehicle requirement power is greater than the maximum allowed power generation power of the auxiliary motor 5, the accelerator pedal depth is greater than the first preset depth, or the entire vehicle resistance of the hybrid power automobile is greater than the first preset resistance, the control module 101 controls the engine 1 to participate in drive. In this case, the power battery 3 does not perform discharging again, the entire vehicle needs a relatively large drive force, the entire vehicle requirement power is relatively large, the accelerator pedal depth is relatively large or the entire vehicle resistance is also relatively large, the power motor 2 is insufficient to drive the hybrid power automobile to travel, and the engine 1 participates in drive to perform supplemental drive.

Therefore, the engine 1 may participate in drive when the drive force output by the power motor 2 is insufficient, thereby ensuring normal travelling of the entire vehicle, improving power performance of the entire vehicle, and improving travelling mileage of the entire vehicle.

More specifically, the control module 101 is further configured to: when the entire vehicle requirement power is greater than the maximum allowed power generation power of the auxiliary motor 5, control the engine 1 to participate in drive to enable the engine 1 to output power to wheels through the clutch.

Moreover, the control module 101 is further configured to: when the SOC value of the power battery 3 is less than or equal to the preset limit value, control the engine 1 to participate in drive to enable the engine 1 to output power to wheels through the clutch 6; when the SOC value of the power battery 3 is less than or equal to the first preset value, the speed of the hybrid power automobile is less than the first preset speed and the accelerator pedal depth is greater than the first preset depth, control the engine 1 to participate in drive to enable the engine 1 to output power to the wheels through the clutch 6; and when the SOC value of the power battery 3 is less than or equal to the first preset value, the speed of the hybrid power automobile is less than the first preset speed and the entire vehicle resistance of the hybrid power automobile is greater than the first preset resistance, control the engine 1 to participate in drive to enable the engine 1 to output power to the wheels through the clutch 6.

To be specific, the control module 101 may obtain the SOC value of the power battery 3, the accelerator pedal depth of the hybrid power automobile, the speed, the entire vehicle resistance and the entire vehicle requirement power in real time, and determine the SOC value of the power battery 3, the accelerator pedal depth of the hybrid power automobile, the speed and the entire vehicle resistance:

First, when the SOC value of the power battery 3 is less than the preset limit value, because the power level of the power battery 3 is excessively low, and the power battery 3 cannot provide sufficient electric energy, the control module 101 controls the engine 1 and the power motor 2 to simultaneously participate in drive. In this case, the control module 101 may further control the engine 1 to drive the auxiliary motor 5 to perform power generation, and by controlling the power generation power of the engine 1, the engine 1 is enabled to operate in the preset optimal economical area.

Second, when the SOC value of the power battery 3 is less than or equal to the first preset value, the speed of the hybrid power automobile is less than the first preset speed and the accelerator pedal depth is greater than the first preset depth, because the accelerator pedal depth is relatively large, the control module 101 controls the engine 1 and the power motor 2 to simultaneously participate in drive. In this case, the control module 101 may further control the engine 1 to drive the auxiliary motor 5 to perform power generation, and by controlling the power generation power of the engine 1, the engine 1 is enabled to operate in the preset optimal economical area.

Third, when the SOC value of the power battery 3 is less than or equal to the first preset value, the speed of the hybrid power automobile is less than the first preset speed and the entire vehicle resistance of the hybrid power automobile is greater than the first preset resistance, because the entire vehicle resistance is relatively large, the control module 101 controls the engine 1 and the power motor 2 to simultaneously participate in drive. In this case, the control module 101 may further control the engine 1 to drive the auxiliary motor 5 to perform power generation, and by controlling the power generation power of the engine 1, the engine 1 is enabled to operate in the preset optimal economical area.

Therefore, the engine 1 may participate in drive when the drive force output by the power motor 2 is insufficient, thereby ensuring normal travelling of the entire vehicle, improving power performance of the entire vehicle, and improving travelling mileage of the entire vehicle. Moreover, the engine may be controlled to operate in an economical area, and because the engine 1 has lowest fuel consumption and highest fuel economy in the preset optimal economical area, fuel consumption may be reduced, noise of the engine may be reduced, and economic performance of the entire vehicle may be improved.

Moreover, the control module 101 is further configured to: when the SOC value of the power battery 3 is less than or equal to the preset limit value, and the speed of the hybrid power automobile is greater than the first preset speed, control the engine 1 to participate in drive to enable the engine 1 to output power to the wheels 7 through the clutch 6.

Therefore, the engine 1 may participate in drive when the drive force output by the power motor 2 is insufficient, thereby ensuring normal travelling of the entire vehicle, improving power performance of the entire vehicle, and improving travelling mileage of the entire vehicle.

Certainly, it should be understood that, the control module 101 is further configured to: when the SOC value of the power battery 3 is greater than the first preset value, control the engine 1 not to drive the auxiliary motor 5 to perform power generation. In this case, the power battery 3 has an approximately full power level, and does not need to be charged, and the engine 1 does not drive the auxiliary motor 5 to perform power generation. To be specific, when the power battery 3 has an approximately full power level, the engine 1 does not drive the auxiliary motor 5 to perform power generation, and therefore the auxiliary motor 5 does not charge the power battery 3.

Further, when the engine 1 drives only the auxiliary motor 5 to perform power generation but does not participate in drive, the control module 101 may control the power generation power of the auxiliary motor 5. A process of controlling the power generation power of the control module 101 of this embodiment of the present invention is specifically described below.

According to an embodiment of the present invention, the control module 101 is further configured to: control the power generation power of the auxiliary motor 5 according to the entire vehicle requirement power of the hybrid power automobile, the charging power of the power battery 3 and the charging power of the low-voltage storage battery 20.

Specifically, a formula of controlling the power generation power of the auxiliary motor 5 according to the entire vehicle requirement power of the hybrid power automobile, the charging power of the power battery 3 and the charging power of the low-voltage storage battery 20 is as follows:

$$P1 = P2 + P3 + P4, \text{ where } P2 = P11 + P21.$$

P1 is the power generation power of the auxiliary motor 5, P2 is the entire vehicle requirement power, P3 is the charging power of the power battery 3, P4 is the charging power of the low-voltage storage battery 20, P11 is an entire vehicle drive power, and P21 is an electric appliance device power.

It should be noted that, electric appliance devices include the first electric appliance device 10 and the second electric appliance device 30, that is, the electric appliance device power P21 may include power needed by the high-voltage electric appliance device and the low-voltage electric appliance device.

It should be further noted that, the entire vehicle drive power P11 may include the output power of the power motor 2, and the control module 101 may obtain the entire vehicle drive power P11 according to a preset accelerator-torsional moment curve of the power motor 2 and a rotational speed of the power motor 2, where the preset accelerator-torsional moment curve may be determined during power matching of the hybrid power automobile. The control module 101 may obtain the electric appliance device power P21 in real time according to electric appliance devices running on the entire vehicle, for example, calculate the electric appliance device power P21 through DC consumption on a bus. The control module 101 may obtain the charging power P3 of the power battery 3 according to the SOC value of the power battery 3, and obtain the charging power P4 of the low-voltage storage battery 20 according to the SOC value of the low-voltage storage battery 20.

Specifically, when the hybrid power automobile is travelling, the control module 101 may obtain the charging power P3 of the power battery 3, the charging power P4 of the low-voltage storage battery 20, the entire vehicle drive power P11 and the electric appliance device power P21, and use a sum of the charging power P3 of the power battery 3, the charging power P4 of the low-voltage storage battery 20, the entire vehicle drive power P11 and the electric appliance device power P21 as the power generation power P1 of the auxiliary motor 5. Therefore, the control module 101 may control the power generation power of the auxiliary motor 5 according to the calculated P1 value. For example, the control module 101 may control the output torque and the rotational speed of the engine 1 according to the calculated P1 value, so as to control the power for the engine 1 to drive the auxiliary motor 5 to perform power generation.

Further, according to an embodiment of the present invention, the control module 101 is further configured to: obtain an SOC value change rate of the power battery 3, and control the power generation power of the auxiliary motor 5 according to a relationship between the entire vehicle requirement power P2 and a minimum output power Pmin corresponding to the optimal economical area of the engine 1, the SOC value change rate of the power battery 3, the SOC value of the low-voltage storage battery 20, and the SOC value change rate of the low-voltage storage battery 20.

It should be understood that, the control module 101 may obtain the SOC value change rate of the power battery 3 according to the SOC value of the power battery 3, for example, collect the SOC value of the power battery 3 once at each time interval t. In this way, a ratio of a difference between a current SOC value and a former SOC value of the power battery 3 to the time interval t may be used as the SOC value change rate of the power battery 3. Similarly, the control module 101 may obtain the SOC value change rate of the low-voltage storage battery 20 according to the SOC value of the low-voltage storage battery 20, for example, collect the SOC value of the low-voltage storage battery 20 once at each time interval t. In this way, a ratio of a difference between a current SOC value and a former SOC value of the low-voltage storage battery 20 to the time interval t may be used as the SOC value change rate of the low-voltage storage battery 20.

Specifically, the optimal economical area of the engine may be determined according to the engine universal characteristic curve shown in FIG. 7, and then the minimum output power Pmin corresponding to the optimal economical area of the engine is obtained. After determining the minimum output power Pmin corresponding to the optimal economical area of the engine, the control module 101 may control the power generation power of the auxiliary motor 5 according to the relationship between the entire vehicle requirement power P2 and the minimum output power Pmin corresponding to the optimal economical area of the engine 1, the SOC value change rate of the power battery 3, the SOC value of the low-voltage storage battery 20, and the SOC value change rate of the low-voltage storage battery 20.

Therefore, when the hybrid power automobile is travelling at a low speed, the engine is enabled to operate in an economical area, thereby reducing fuel consumption, reducing noise of the engine, and improving economic performance of the entire vehicle. Moreover, at a low speed, the engine 1 may perform only power generation but does not participate in drive, and because the engine does not participate in drive, the clutch does not need to be used, thereby reducing abrasion or slip friction of the clutch, reducing an unsmooth feeling, and improving comfortableness, so as to maintain low-speed electric balance and low-speed smoothness of the entire vehicle and improve performance of the entire vehicle.

A specific control manner in which when the engine 1 drives only the auxiliary motor 5 to perform power generation but does not participate in drive, the control module 101 adjusts the power generation power of the auxiliary motor 5 according to the relationship between the entire vehicle requirement power P2 and the minimum output power Pmin corresponding to the optimal economical area of the engine 1, the SOC value change rate of the power battery 3, the SOC value of the low-voltage storage battery 20, and the SOC value change rate of the low-voltage storage battery 20 is further described below.

Specifically, the control module 101 is further configured to: when the SOC value of the low-voltage storage battery 20 is greater than a preset low power level threshold, obtain the charging power P3 of the power battery 3 according to the SOC value change rate of the power battery 3, and determine whether the charging power P3 of the power battery 3 is less than the difference between the minimum output power Pmin corresponding to the optimal economical area of the engine 1 and the entire vehicle requirement power P2. If the charging power P3 of the power battery 3 is less than the difference between the minimum output power Pmin corresponding to the optimal economical area of the engine 1 and the entire vehicle requirement power P2, the control module 101 controls the engine 1 to perform power generation at the minimum output power to control the power generation power of the auxiliary motor 5; or if the charging power of the power battery 3 is greater than or equal to the difference between the minimum output power Pmin corresponding to the optimal economical area of the engine 1 and the entire vehicle requirement power P2, the control module 101 obtains the output power of the engine 1 in the preset optimal economical area according to the sum of the charging power P3 of the power battery 3 and the entire vehicle requirement power P2, and controls the engine 1 to perform power generation at the obtained output power to control the power generation power of the auxiliary motor 5.

Specifically, the control module 101 is further configured to: when the SOC value of the low-voltage storage battery 20 is less than or equal to the preset low power level threshold, obtain the SOC value change rate of the low-voltage storage battery 20 and the SOC value change rate of the power battery 3, obtain the charging power P4 of the low-voltage storage battery 20 according to the SOC value change rate of the low-voltage storage battery 20, obtain the charging power P3 of the power battery 3 according to the SOC value change rate of the power battery 3, and determine whether the sum of the charging power P4 of the low-voltage storage battery 20 and the charging power P3 of the power battery 3 is less than the difference between the minimum output power Pmin corresponding to the optimal economical area of the engine 1 and the entire vehicle requirement power P2. If the sum of the charging power P4 of the low-voltage storage battery 20 and the charging power P3 of the power battery 3 is less than the difference between the minimum output power Pmin corresponding to the optimal economical area of the engine 1 and the entire vehicle requirement power P2, the control module 101 controls the engine 1 to perform power generation at the minimum output power Pmin to control the power generation power of the auxiliary motor 5; or if the sum of the charging power P4 of the low-voltage storage battery 20 and the charging power P3 of the power battery 3 is greater than or equal to the difference between the minimum output power Pmin corresponding to the optimal economical area of the engine 1 and the entire vehicle requirement power P2, the control module 101 obtains the output power of the engine 1 in the preset optimal economical area according to the sum of the charging power P3 of the power battery 3, the charging power P4 of the low-voltage storage battery 20 and the entire vehicle requirement power P2, and controls the engine 1 to perform power generation at the obtained output power to control the power generation power of the auxiliary motor 5.

It should be noted that, a first relationship table between the SOC value change rate of the power battery 3 and the charging power P3 of the power battery 3 may be pre-stored in the control module 101. Therefore, after obtaining an SOC value change rate of the power battery 3, the control module 101 may obtain a corresponding charging power P3 of the power battery 3 by performing matching on the first relationship table. For example, a first relationship table between the SOC value change rate of the power battery 3 and the charging power P3 of the power battery 3 may be shown in Table 1.

TABLE 1

| | | | | | |
|---|---|---|---|---|---|
| SOC value change rate of the power battery 3 | A1 | A2 | A3 | A4 | A5 |
| Charging power of the power battery 3 | B1 | B2 | B3 | B4 | B5 |

It can be learned from Table 1 that, when an SOC value change rate of the power battery 3 is A1, a corresponding charging power P3 of the power battery 3 that the control module 101 may obtain is B1; when an SOC value change rate of the power battery 3 is A2, a corresponding charging power P3 of the power battery 3 that the control module 101 may obtain is B2; when an SOC value change rate of the power battery 3 is A3, a corresponding charging power P3 of the power battery 3 that the control module 101 may obtain is B3; when an SOC value change rate of the power battery 3 is A4, a corresponding charging power P3 of the power battery 3 that the control module 101 may obtain is B4; and when an SOC value change rate of the power battery 3 is A5, a corresponding charging power P3 of the power battery 3 that the control module 101 may obtain is B5.

Similarly, a second relationship table between the SOC value change rate of the low-voltage storage battery 20 and the charging power P4 of the low-voltage storage battery 20 may be pre-stored in the control module 101. Therefore, after obtaining an SOC value change rate of the low-voltage storage battery 20, the control module 101 may obtain a corresponding charging power P4 of the low-voltage storage battery 20 by performing matching on the second relationship table. For example, a second relationship table between the SOC value change rate of the low-voltage storage battery 20 and the charging power P4 of the low-voltage storage battery 20 may be shown in Table 2.

TABLE 2

| | | | | | |
|---|---|---|---|---|---|
| SOC value change rate of the low-voltage storage battery 20 | A11 | A12 | A13 | A14 | A15 |
| Charging power of the low-voltage storage battery 20 | B11 | B12 | B13 | B14 | B15 |

It can be learned from Table 2 that, when an SOC value change rate of the low-voltage storage battery 20 is A11, a corresponding charging power P4 of the low-voltage storage battery 20 that the control module 101 may obtain is B11; when an SOC value change rate of the low-voltage storage battery 20 is A12, a corresponding charging power P4 of the low-voltage storage battery 20 that the control module 101 may obtain is B12; when an SOC value change rate of the low-voltage storage battery 20 is A13, a corresponding charging power P4 of the low-voltage storage battery 20 that the control module 101 may obtain is B13; when an SOC value change rate of the low-voltage storage battery 20 is A14, a corresponding charging power P4 of the low-voltage storage battery 20 that the control module 101 may obtain is B14; and when an SOC value change rate of the low-voltage storage battery 20 is A15, a corresponding charging power P4 of the low-voltage storage battery 20 that the control module 101 may obtain is B15.

Specifically, when controlling the power generation power of the auxiliary motor 5, the control module 101 may obtain the SOC value of the low-voltage storage battery 20, the SOC value of the power battery 3, and the entire vehicle requirement power P2 (the sum of the entire vehicle drive power P11 and the electric appliance device power P21), and then determine whether the SOC value of the low-voltage storage battery 20 is greater than the preset low power level threshold.

If the SOC value of the low-voltage storage battery 20 is greater than the preset low power level threshold, the control module 101 obtains the SOC value change rate of the power battery 3, and queries for the charging power P3 of the power battery 3 corresponding to the SOC value change rate of the power battery 3, so as to select an appropriate charging power P3 to enable the SOC value of the power battery 3 to increase; and further determines whether the charging power P3 of the power battery 3 is less than the difference between the minimum output power Pmin corresponding to the optimal economical area of the engine 1 and the entire vehicle requirement power P2. If yes, that is, P3<Pmin−P2, the control module 101 controls the engine 1 to perform power generation at the minimum output power Pmin to control the power generation power of the auxiliary motor 5, that is, controls the engine 1 to run at the minimum output power Pmin corresponding to the optimal economical area; or if not, that is, P3≥Pmin−P2, the control module 101 obtains the output power of the engine 1 in the preset optimal economical area according to the sum of the charging power P3 of the power battery 3 and the entire vehicle requirement power P2, and controls the engine 1 to perform power generation at the obtained output power to control the power generation power of the auxiliary motor 5. To be specific, the control module 101 searches for a corresponding output power in the preset optimal economical area of the engine 1, where the obtained output power may be the sum of the charging power P3 of the power battery 3 and the entire vehicle requirement power P2, that is, (P2+P3 or P11+P21+P3), and in this case, may control the engine 1 to perform power generation at the obtained output power.

If the SOC value of the low-voltage storage battery 20 is less than or equal to the preset low power level threshold, the control module 101 obtains the SOC value change rate of the power battery 3, and queries for the charging power P3 of the power battery 3 corresponding to the SOC value change rate of the power battery 3, so as to select an appropriate charging power P3 to enable the SOC value of the power battery 3 to increase; obtains the SOC value change rate of the low-voltage storage battery 20, and queries for the charging power P4 of the low-voltage storage battery 20 corresponding to the SOC value change rate of the low-voltage storage battery 20, to select an appropriate charging power P4 to enable the SOC value of the low-voltage storage battery 20 to increase; and further determines whether the sum of the charging power P4 of the low-voltage storage battery 20 and the charging power P3 of the power battery 3 is less than the difference between the minimum output power Pmin corresponding to the optimal economical area of the engine 1 and the entire vehicle requirement power P2. If yes, that is, P3+P4<Pmin−P2, the control module 101 controls the engine 1 to perform power generation at the minimum output power Pmin to control the power generation power of the auxiliary motor 5, that is, controls the engine 1 to run at the minimum output power Pmin corresponding to the optimal economical area, and to charge the power battery 3 and the low-voltage storage battery 20 at a power equal to the minimum output power Pmin corresponding to the optimal economical area minus the entire vehicle requirement power P2, that is, Pmin−P2; or if not, that is, P3+P4≥Pmin−P2, the control module 101 obtains the power of the engine 1 in the preset optimal economical area according to the sum of the charging power P3 of the power battery 3, the charging power P4 of the low-voltage storage battery 20 and the entire vehicle requirement power P2, and controls the engine 1 to perform power generation at the obtained output power to control the power generation power of the auxiliary motor 5. To be specific, the control module 101 searches for a corresponding power in the preset optimal economical area of the engine 1, where the obtained output power may be the sum of the charging power P3 of the power battery 3, the charging power P4 of the low-voltage storage battery 20 and the entire vehicle requirement power P2, that is, (P2+P3+P4 or P11+P21+P3+P4), and controls the engine 1 to perform power generation at the obtained output power.

Therefore, at a low speed, the engine can operate in an economical area, and perform only power generation but does not participate in drive, and therefore the clutch is not used, thereby reducing abrasion or slip friction of the clutch, reducing an unsmooth feeling, improving comfortableness, reducing fuel consumption, and reducing noise of the engine, so as to maintain low-speed electric balance and low-speed smoothness of the entire vehicle and improve performance of the entire vehicle.

To sum up, according to the power system of a hybrid power automobile proposed in this embodiment of the present invention, the engine outputs power to the wheels of the hybrid power automobile through the clutch, the power motor outputs a drive force to the wheels of the hybrid power automobile, the power battery supplies power to the power motor, and when performing power generation under driving of the engine, the auxiliary motor implements at least one of charging the power battery, supplying power to the power motor, and supplying power to the DC-DC converter, and the control module obtains the SOC value of the power battery, the SOC value of the low-voltage storage battery and the speed of the hybrid power automobile, controls the power generation power of the auxiliary motor according to the SOC value of the power battery, the SOC value of the low-voltage storage battery and the speed of the hybrid power automobile, and obtains the power generation power of the engine according to the power generation power of the auxiliary motor to control the engine to run in the preset optimal economical area. Therefore, the engine is enabled not to participate in drive at a low speed, and therefore the clutch is not used, thereby reducing abrasion or slip friction of the clutch, reducing an unsmooth feeling, and improving comfortableness; and at a low speed, the engine is enabled to operate in an economical area, to perform only power generation but does not perform drive, thereby reducing fuel consumption, reducing noise of the engine, maintaining low-speed electric balance and low-speed smoothness of the entire vehicle, and improving performance of the entire vehicle.

Moreover, an embodiment of the present invention further proposes a rectification voltage stabilization circuit for power generation of a motor in a power system of a hybrid power automobile. The rectification voltage stabilization circuit for power generation of a motor in a power system of a hybrid power automobile of this embodiment of the present invention is described below with reference to accompanying drawings.

Figure 8:
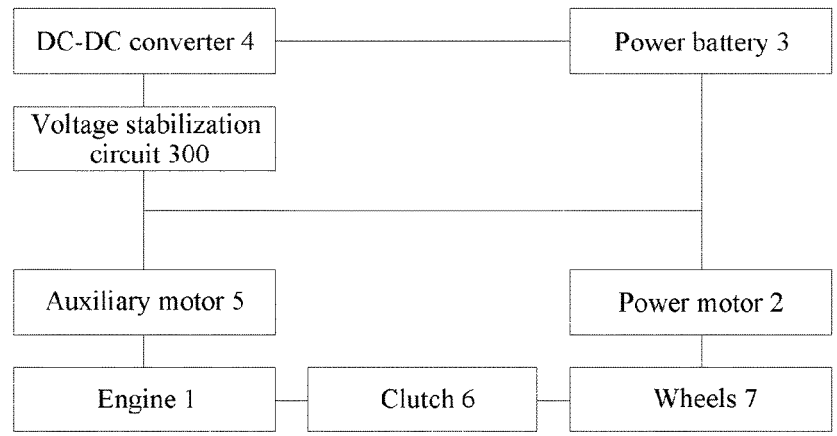
FIG. 8 is a structural block diagram of a power system of a hybrid power automobile according to an embodiment of the present invention.

FIG. 8 is a structural block diagram of a power system of a hybrid power automobile according to an embodiment of the present invention. As shown in FIG. 8, the power system of a hybrid power automobile includes: an engine 1, a power motor 2, a power battery 3, a DC-DC converter 4, an auxiliary motor 5, and a voltage stabilization circuit 300.

Figure 9A:
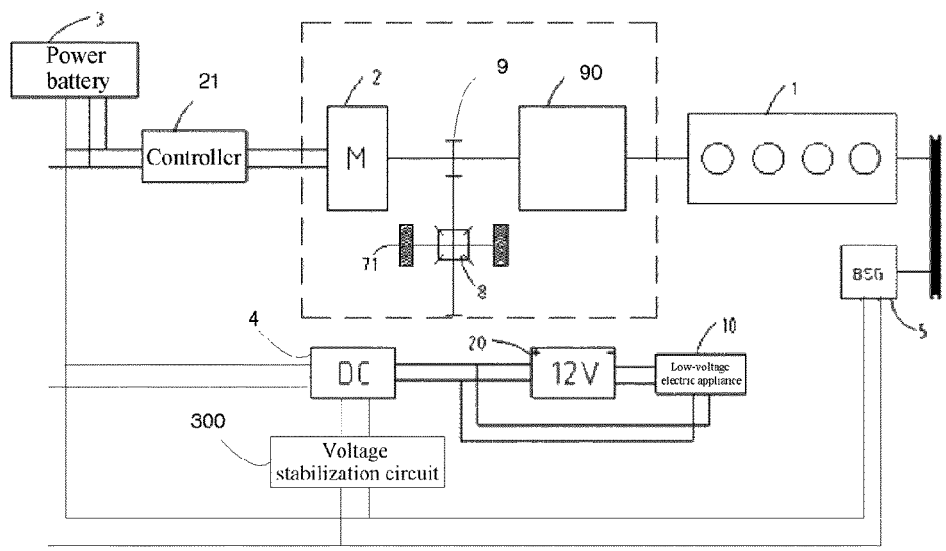
FIG. 9a is a schematic structural diagram of a power system of a hybrid power automobile according to an embodiment of the present invention.
Figure 9B:
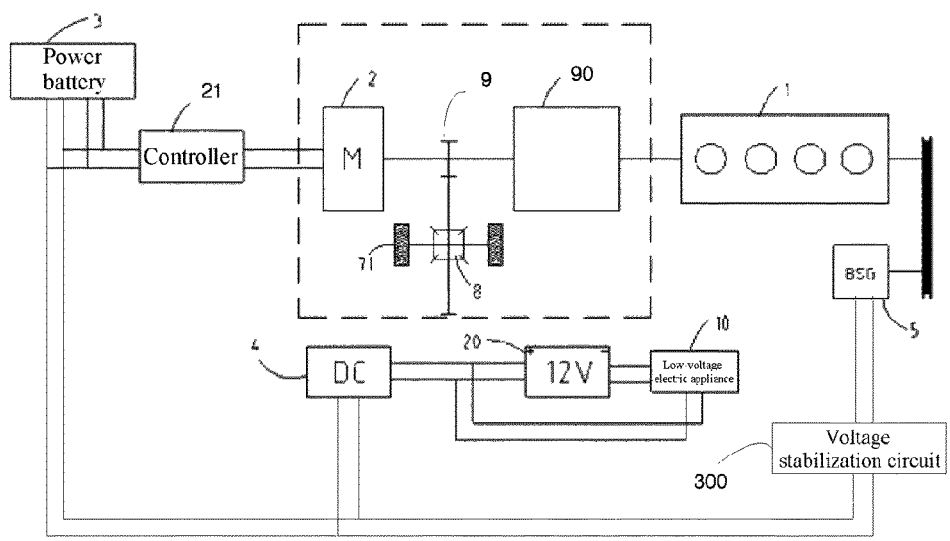
FIG. 9b is a schematic structural diagram of a power system of a hybrid power automobile according to another embodiment of the present invention.
Figure 9C:
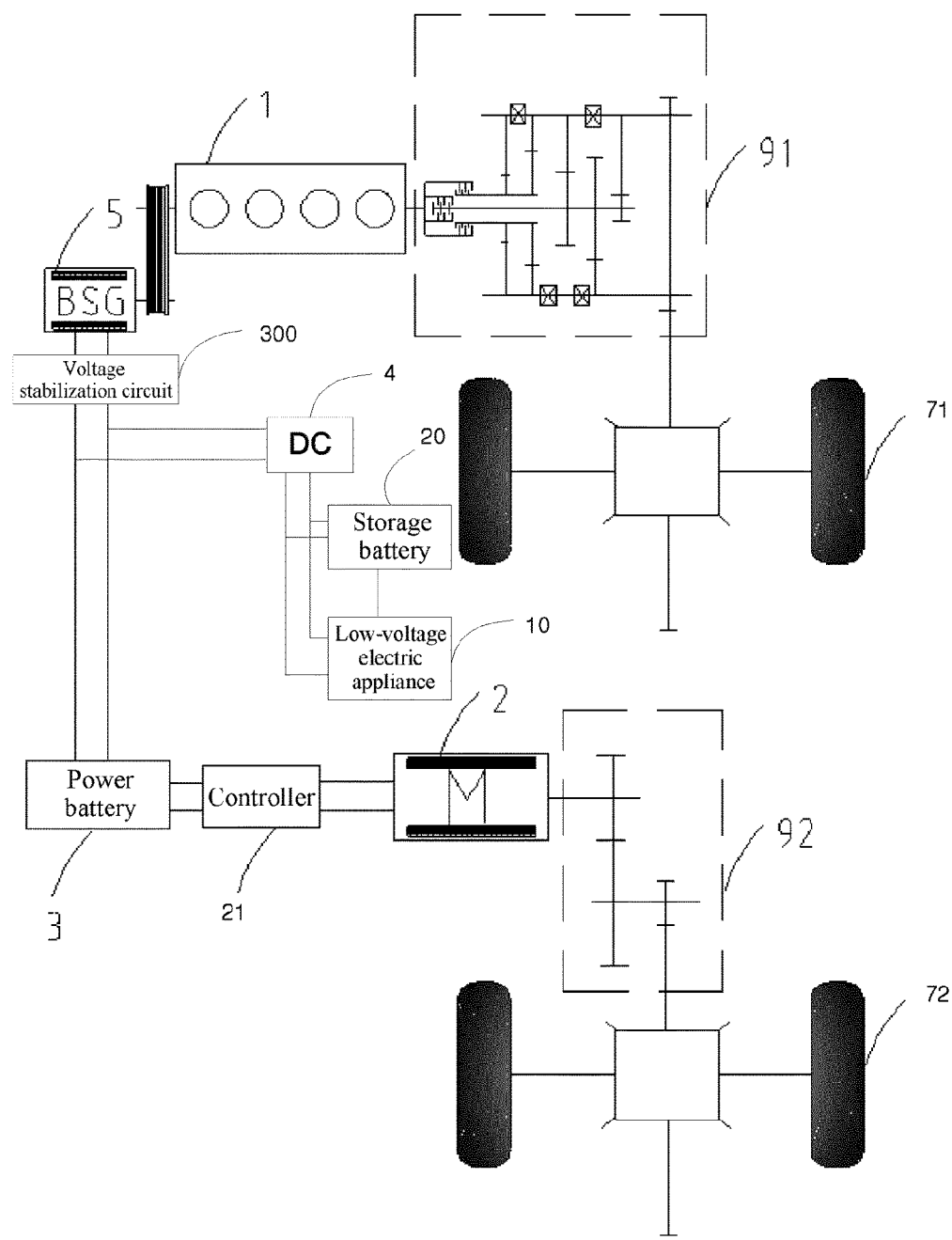
FIG. 9c is a schematic structural diagram of a power system of a hybrid power automobile according to still another embodiment of the present invention.
Figure 10:
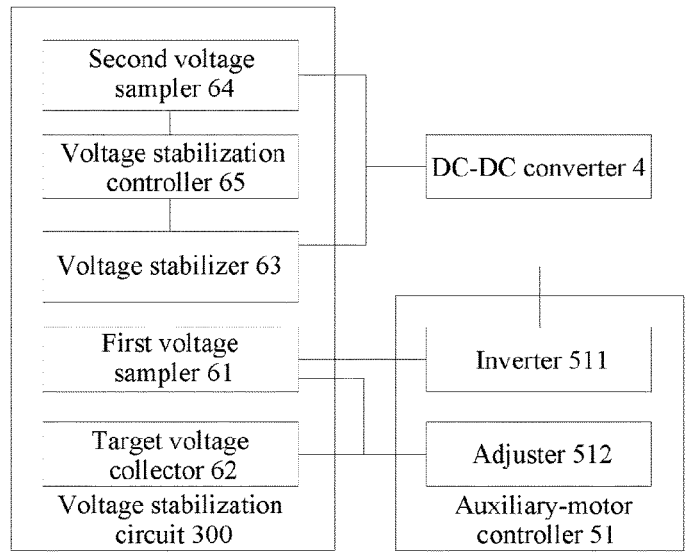
FIG. 10 is a structural block diagram of a voltage stabilization circuit according to an embodiment of the present invention.

As shown in FIG. 8 to FIG. 10, the engine 1 outputs power to wheels 7 of the hybrid power automobile through a clutch 6; and the power motor 2 is configured to output a drive force to the wheels 7 of the hybrid power automobile. To be specific, the power system of this embodiment of the present invention may provide power for normal travelling of the hybrid power automobile through the engine 1 and/or the power motor 2. In other words, in some embodiments of the present invention, power sources of the power system may be the engine 1 and the power motor 2, and either of the engine 1 and the power motor 2 may individually output power to the wheels 7, or the engine 1 and the power motor 2 may simultaneously output power to the wheels 7.

The power battery 3 is configured to supply power to the power motor 2. The auxiliary motor 5 is connected to the engine 1. For example, the auxiliary motor 5 may be connected to the engine 1 through a wheel train side of the engine 1, and the auxiliary motor 5 is connected to the power motor 2, the DC-DC converter 4 and the power battery 3. The voltage stabilization circuit 300 is connected to between the auxiliary motor 5 and the DC-DC converter 4, and the voltage stabilization circuit 300 performs voltage stabilization processing on a direct current that is output to the DC-DC converter 4 when the auxiliary motor 5 performs power generation, so that a stabilized voltage supplies power to a low-voltage electric appliance of the entire vehicle through the DC-DC converter 4. In other words, after electric energy that is output when the auxiliary motor 5 performs power generation passes through the voltage stabilization circuit 300, a stabilized voltage is output and supplied to the DC-DC converter 4.

Therefore, the power motor 2 and the auxiliary motor 5 may respectively serve as a drive motor and a generator correspondingly, so that the auxiliary motor 5 may have relatively high power generation power and power generation efficiency at a low speed, thereby satisfying power consumption requirements of low-speed travelling, maintaining low-speed electric balance of the entire vehicle, maintaining low-speed smoothness, and improving performance of the entire vehicle. Moreover, voltage stabilization processing may be performed, through the voltage stabilization circuit 300, on the direct current that is output to the DC-DC converter 4 when the auxiliary motor 5 performs power generation, so that an input voltage of the DC-DC converter 4 is kept stable, thereby ensuring normal operating of the DC-DC converter.

Further, when performing power generation under driving of the engine 1, the auxiliary motor 5 may implement at least one of charging the power battery 3, supplying power to the power motor 2, and supplying power to the DC-DC converter 4. In other words, the engine 1 may drive the auxiliary motor 5 to perform power generation, and electric energy generated by the auxiliary motor 5 may be provided to at least one of the power battery 3, the power motor 2, and the DC-DC converter 4. It should be understood that, the engine 1 may drive, while outputting power to the wheels 7, the auxiliary motor 5 to perform power generation, or may individually drive the auxiliary motor 5 to perform power generation.

The auxiliary motor 5 may be a BSG motor. It should be noted that, the auxiliary motor 5 belongs to a high-voltage motor. For example, a power generation voltage of the auxiliary motor 5 is equivalent to a voltage of the power battery 3, and therefore electric energy generated by the auxiliary motor 5 may directly charge the power battery 3 without voltage conversion, and may further supply power to the power motor 2 and/or the DC-DC converter 4. Moreover, the auxiliary motor 5 may also belong to an efficient generator. For example, power generation efficiency above 97% may be achieved provided that the auxiliary motor 5 is driven at an idling rotational speed of the engine 1 to perform power generation.

It should be noted that, the voltage stabilization circuit 300 may be disposed on an output line of the auxiliary motor 5, and the auxiliary motor 5 is connected to the power motor 2, the power battery 3 and the DC-DC converter 4 through the voltage stabilization circuit 300, as shown in FIG. 9b and FIG. 9c. In this case, when performing power generation, the auxiliary motor 5 may output a stabilized voltage through the voltage stabilization circuit 300, to charge the power battery 3 at the stabilized voltage, supply power to the power motor 2 at the stabilized voltage, and supply power to the DC-DC converter 4 at the stabilized voltage. Therefore, regardless of whether the power battery 3 is connected to the DC-DC converter 4, normal operating of the DC-DC converter 4 can be ensured. The voltage stabilization circuit 300 may alternatively be disposed on an incoming line of the DC-DC converter 4, the auxiliary motor 5 may be connected to the DC-DC converter 4 and the power battery 3, and furthermore the power battery 3 may be connected to the DC-DC converter 4, as shown in FIG. 8 and FIG. 9a. Therefore, when the power battery 3 is disconnected from the DC-DC converter 4, the voltage that is output to the DC-DC converter 4 when the auxiliary motor 5 performs power generation is still stable, thereby ensuring normal operating of the DC-DC converter 4.

Further, the auxiliary motor 5 may be configured to start the engine 1, that is, the auxiliary motor 5 may implement a function of starting the engine 1. For example, when starting the engine 1, the auxiliary motor 5 may drive a crank shaft of the engine 1 to rotate, so that a piston of the engine 1 reaches an ignition location, thereby starting the engine 1. Therefore, the auxiliary motor 5 may implement a function of a starter in a related technology.

As described above, both the engine 1 and the power motor 2 may be configured to drive the wheels 7 of the hybrid power automobile. For example, as shown in FIG. 9a and FIG. 9b, the engine 1 and the power motor 2 jointly drive same wheels of the hybrid power automobile, for example, a pair of front wheels 7 (including a left front wheel and a right front wheel). For another example, as shown in FIG. 9c, the engine 1 may drive first wheels of the hybrid power automobile, for example, a pair of front wheels 71 (including a left front wheel and a right front wheel), and the power motor 2 may drive second wheels of the hybrid power automobile, for example, a pair of rear wheels 72 (including a left rear wheel and a right rear wheel).

In other words, when the engine 1 and the power motor 2 jointly drive the pair of front wheels 71, a drive force of the power system is output to the pair of front wheels 71, and the entire vehicle uses a drive manner of two-wheel drive; or when the engine 1 drives the pair of front wheels 71 and the power motor 2 drives the pair of rear wheels 72, a drive force of the power system is output to the pair of front wheels 71 and the pair of rear wheels 72, and the entire vehicle uses a drive manner of four-wheel drive.

Further, in the two-wheel drive manner, with reference to FIG. 9a and FIG. 9b, the power system of a hybrid power automobile further includes a differential 8, a main reducer 9, and a transmission 90, where the engine 1 outputs power to the first wheels of the hybrid power automobile, for example, the pair of front wheels 71 through the clutch 6, the transmission 90, the main reducer 9, and the differential 8, and the power motor 2 outputs a drive force to the first wheels of the hybrid power automobile, for example, the pair of front wheels 71 through the main reducer 9 and the differential 8. The clutch 6 and the transmission 90 may be integrated.

In the four-wheel drive manner, with reference to FIG. 9c, the power system of a hybrid power automobile further includes a first transmission 91 and a second transmission 92, where the engine 1 outputs power to the first wheels of the hybrid power automobile, for example, the pair of front wheels 71 through the clutch 6 and the first transmission 91, and the power motor 2 outputs a drive force to the second wheels of the hybrid power automobile, for example, the pair of rear wheels 72 through the second transmission 92.

The clutch 6 and the first transmission 91 may be integrated.

In an embodiment of the present invention, because the power generation voltage of the auxiliary motor 5 is usually connected between two ends of the power battery 3, when the power battery 3 is connected to the DC-DC converter 4, the voltage that is input to the DC-DC converter 4 is stable. When the power battery 3 is invalid or damaged and is disconnected from the DC-DC converter 4, the alternating current that is output when the auxiliary motor 5 performs power generation needs to be controlled, that is, voltage stabilization processing may be performed, through the voltage stabilization circuit 300, on the direct current that is output to the DC-DC converter 4 when the auxiliary motor 5 performs power generation.

In some embodiments of the present invention, as shown in FIG. 10, the auxiliary motor 5 includes an auxiliary-motor controller 51, the auxiliary-motor controller 51 includes an inverter 511 and an adjuster 512, and the adjuster 512 is configured to: when the power battery 3 is disconnected from the DC-DC converter 4, output a first adjustment signal and a second adjustment signal according to an output signal of the voltage stabilization circuit 300, so that a direct-current bus-bar voltage output by the inverter 511 is kept stable, where the first adjustment signal is used to adjust a d-axis current of the auxiliary motor 5, and the second adjustment signal is used to adjust a q-axis current of the auxiliary motor 5.

Further, in some embodiments, as shown in FIG. 10, the voltage stabilization circuit 300 includes a first voltage sampler 61 and a target voltage collector 62. The first voltage sampler 61 performs sampling on the direct-current bus-bar voltage output by the inverter 511 to obtain a first voltage sampling value, and outputs the first voltage sampling value to the adjuster 512, and the target voltage collector 62 obtains a target reference voltage, and sends the target reference voltage to the adjuster 512. The adjuster 512 is configured to output the first adjustment signal and the second adjustment signal according to a voltage difference between the target reference voltage and the first voltage sampling value. The output signal of the voltage stabilization circuit 300 includes the first voltage sampling value and the target reference voltage.

Specifically, the auxiliary-motor controller 51 is connected to the DC-DC converter 4 through the voltage stabilization circuit 300. The auxiliary-motor controller 51 outputs the direct-current bus-bar voltage through the inverter 511, and the first voltage sampler 61 performs sampling on the direct-current bus-bar voltage output by the inverter 511 to obtain the first voltage sampling value, and outputs the first voltage sampling value to the adjuster 512. The target voltage collector 62 obtains the target reference voltage, and sends the target reference voltage to the adjuster 512, and the adjuster 512 outputs the first adjustment signal and the second adjustment signal according to the voltage difference between the target reference voltage and the first voltage sampling value. The d-axis current of the auxiliary motor 5 is adjusted through the first adjustment signal, and the q-axis current of the auxiliary motor 5 is adjusted through the second adjustment signal, so that when the power battery 3 is disconnected from the DC-DC converter 4, the auxiliary-motor controller 51 controls the inverter 511 according to the d-axis current and the q-axis current of the auxiliary motor 5, and therefore the direct-current bus-bar voltage output by the inverter 511 is kept stable.

Figure 11:
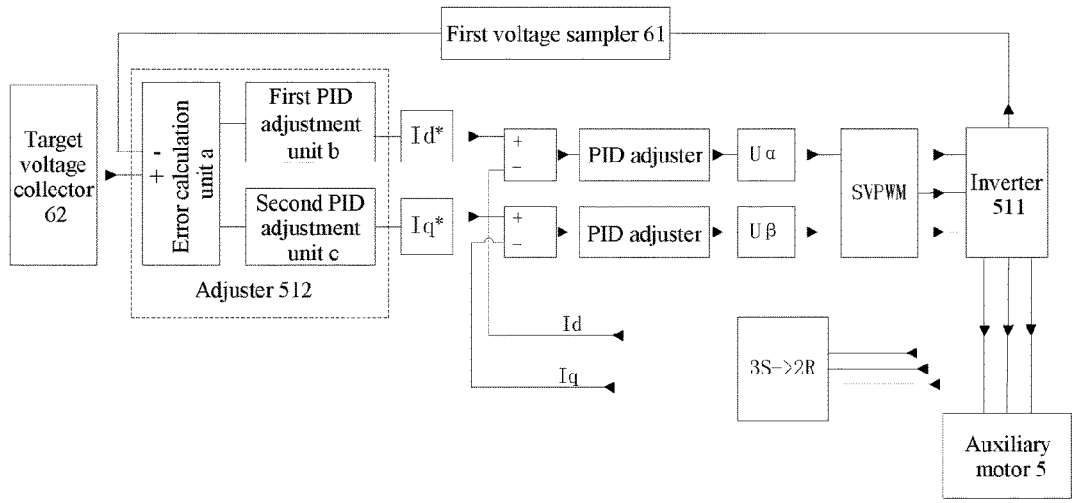
FIG. 11 is a principle diagram of voltage stabilization control according to an embodiment of the present invention.

In some examples, the inverter 511 may be controlled by using a PWM (pulse width modulation) technology, so that the direct-current bus-bar voltage output by the inverter 511 is kept stable. As shown in FIG. 11, the adjuster 512 includes an error calculation unit a, a first PID adjustment unit b, and a second PID adjustment unit c.

The error calculation unit a is connected to the first voltage sampler 61 and the target voltage collector 62, and the error calculation unit a is configured to obtain the voltage difference between the target reference voltage and the first voltage sampling value. The first PID adjustment unit b is connected to the error calculation unit a, and the first PID adjustment unit b adjusts the voltage difference between the target reference voltage and the first voltage sampling value to output the first adjustment signal. The second PID adjustment unit c is connected to the error calculation unit a, and the second PID adjustment unit c adjusts the voltage difference between the target reference voltage and the first voltage sampling value to output the second adjustment signal.

Specifically, as shown in FIG. 11, the first voltage sampler 61 performs, in real time, sampling on the direct-current bus-bar voltage output by the inverter 511 to obtain a first voltage sampling value, and outputs the first voltage sampling value to the error calculation unit a, and the target voltage collector 62 obtains a target reference voltage, and outputs the target reference voltage to the error calculation unit a. The error calculation unit a obtains the voltage difference between the target reference voltage and the first voltage sampling value, and inputs the difference to the first PID adjustment unit b and the second PID adjustment unit c, to output the first adjustment signal (that is, Id* in FIG. 11) through the first PID adjustment unit b and output the second adjustment signal (that is, Iq* in FIG. 11) through the second PID adjustment unit c. In this case, a three-phase current output by the auxiliary motor 5 is converted into a d-axis current Id and a q-axis current Iq in a dq coordinate system through 3S/2R conversion, a difference between Id* and Id and a difference between Iq* and Iq are respectively obtained, and the differences are respectively controlled through corresponding PID adjusters to obtain an α-axis voltage Uα of the auxiliary motor 5 and a β-axis voltage Uβ of the auxiliary motor 5. Uα and Uβ are input to an SVPWM module, to output a three-phase duty cycle, the inverter 511 is controlled through the duty cycle, and the d-axis current Id and the q-axis current Iq output by the auxiliary motor 5 are adjusted through the inverter 511; and then the adjusted d-axis current of the auxiliary motor is adjusted again through the first adjustment signal, and the q-axis current of the auxiliary motor is adjusted again through the second adjustment signal. Therefore, closed-loop control is formed on the d-axis current and the q-axis current of the auxiliary motor. Through the closed-loop control, the direct-current bus-bar voltage output by the inverter 511 can be kept stable, that is, the direct-current voltage output to the DC-DC converter 4 when the auxiliary motor 5 performs power generation is kept stable.

It should be noted that, the direct-current voltage output by the inverter 511 in the auxiliary-motor controller 51 and a counter electromotive force output by the auxiliary motor 5 have a particular correlation. To ensure control efficiency, the voltage output by the inverter 511 may be set to 3/2 of a phase voltage (that is, a maximum phase voltage in a drive state is 2/3 of the direct-current bus-bar voltage). Therefore, the direct-current voltage output by the inverter 511 and the rotational speed of the auxiliary motor 5 have a particular relationship. When the rotational speed of the auxiliary motor 5 is higher, the direct-current voltage output by the inverter 511 is higher; and when the rotational speed of the auxiliary motor 5 is lower, the direct-current voltage output by the inverter 511 is lower.

Further, to ensure that the direct-current voltage input to the DC-DC converter 4 falls within a preset voltage range, in some embodiments of the present invention, as shown in FIG. 10, the voltage stabilization circuit 300 may further include a voltage stabilizer 63, a second voltage sampler 64 and a voltage stabilization controller 65.

The voltage stabilizer 63 is connected to a direct-current output end of the inverter 511, the voltage stabilizer 63 performs voltage stabilization processing on the direct-current bus-bar voltage output by the inverter 511, and an output end of the voltage stabilizer 63 is connected to an input end of the DC-DC converter 4. The second voltage sampler 64 performs sampling on an output voltage of the voltage stabilizer 63 to obtain a second voltage sampling value. The voltage stabilization controller 65 is connected to the voltage stabilizer 63 and the second voltage sampler 64, and the voltage stabilization controller 65 is configured to control the output voltage of the voltage stabilizer 63 according to a preset reference voltage and the second voltage sampling value to enable the output voltage of the voltage stabilizer 63 to fall within the preset voltage range.

In some examples, a switch-type voltage stabilization circuit, for example, a boost circuit may be used as the voltage stabilizer 63, and not only can perform boost, but also has high control precision. A silicon carbide MOSFET, for example, IMW120R45M1 of Infineon may be used a switch device in the boost circuit, may withstand a voltage of 1200 V, has an internal resistance of 45 mΩ, is characterized by a high withstand voltage, a small internal resistance, and good heat-conducting performance, and has a loss dozens of times smaller than that of a high-speed IGBT of a same specification. 1EDI60N12AF of Infineon may be used as a drive chip of the voltage stabilizer 63, where core-less voltage transformation and isolation is used, and control is safe and reliable. It may be understood that, the drive chip may generate a drive signal.

In some other examples, a buck-boost circuit may be used as the voltage stabilizer 63, can perform buck when the rotational speed of the motor is high and perform boost when the rotational speed of the motor is low, and has high control precision.

In still some other examples, a linear voltage stabilization circuit or a three-terminal voltage stabilization circuit (for example, LM317 and 7805) may be further used as the voltage stabilizer 63.

It may be understood that, for ease of circuit design, the first voltage sampler 61 and the second voltage sampler 64 may have a same circuit structure. For example, the first voltage sampler 61 and the second voltage sampler 64 may each include a differential voltage circuit that is characterized by high precision and convenient adjustment of a magnification factor.

Optionally, a PWM dedicated modulation chip SG3525 may be used as the voltage stabilization controller 65, and is characterized by a small volume, simple control, and a stable PWM wave that can be output.

For example, an operating process of the foregoing power system of a hybrid power automobile is: The second voltage sampler 64 performs sampling on the output voltage of the voltage stabilizer 63 to obtain the second voltage sampling value, and outputs the second voltage sampling value to the chip SG3525, and the chip SG3525 may set the reference voltage, and compare the reference voltage with the second voltage sampling value; and then may generate two paths of PWM waves with reference to a triangular wave generated by the chip SG3525, and control the voltage stabilizer 63 through the two paths of PWM waves to enable the voltage output by the voltage stabilizer 63 to the DC-DC converter 4 to fall within the preset voltage range, for example, 11 V to 13 V. Therefore, normal operating of low-voltage load in the hybrid power automobile can be ensured.

It should be noted that, if the output direct-current bus-bar voltage is excessively low, and the second voltage sampling value is quite small, SG3525 may send a PWM wave whose duty cycle is relatively large, to perform boost.

Therefore, the auxiliary motor 5 and the DC-DC converter 4 have one individual voltage stabilization power supply channel, and when the power battery 3 is faulty, and is disconnected from the DC-DC converter 4, the individual voltage stabilization power supply channel of the auxiliary motor 5 and the DC-DC converter 4 may ensure low-voltage power consumption of the entire vehicle, to ensure that the entire vehicle may implement travelling in the pure fuel mode, and improve travelling mileage of the entire vehicle.

Figure 12:
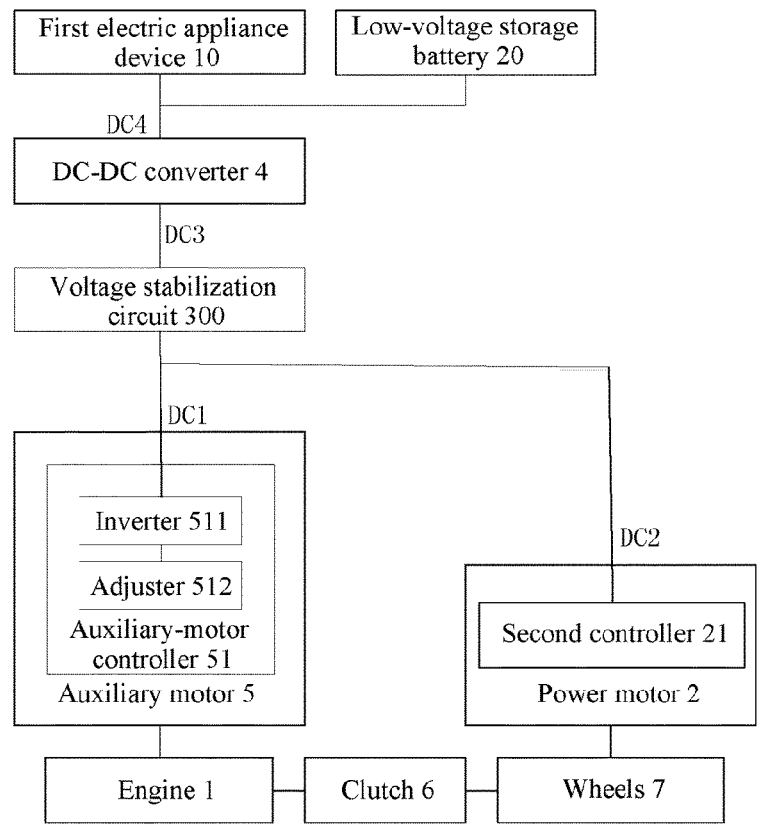
FIG. 12 is a structural block diagram of a power system of a hybrid power automobile according to a specific embodiment of the present invention.

In a specific of the present invention, as shown in FIG. 12, when the power battery 3 is damaged and is disconnected from the DC-DC converter 4, the voltage stabilization circuit 300 is connected to an incoming line end of the DC-DC converter 4.

The power motor 2 further includes a second controller 21, and the auxiliary-motor controller 51 is connected to the second controller 21 and connected to the DC-DC converter 4 through the voltage stabilization circuit 300. When performing power generation, the auxiliary motor 5 generates an alternating current, and the inverter 511 may convert the alternating current generated by the auxiliary motor 5 during power generation into a high-voltage direct current, for example, a 600V high-voltage direct current, so as to supply power to at least one of the power motor 2 and the DC-DC converter 4.

It may be understood that, the second controller 21 may have a DC-AC conversion unit, and the DC-AC conversion unit may convert the high-voltage direct current output by the inverter 511 into an alternating current, so as to charge the power motor 4.

Specifically, as shown in FIG. 12, the inverter 511 of the auxiliary-motor controller 51 has a first direct-current end DC1, the second controller 21 has a second direct-current end DC2, and the DC-DC converter 4 has a third direct-current end DC3. The first direct-current end DC1 of the auxiliary-motor controller 51 is connected to the third direct-current end DC3 of the DC-DC converter 4 through the voltage stabilization circuit 300, so as to provide a stabilized voltage to the DC-DC converter 4, and the DC-DC converter 4 may perform DC-DC conversion on a direct current after voltage stabilization. Moreover, the inverter 511 of the auxiliary-motor controller 51 may further output a high-voltage direct current to the second controller 21 through the first direct-current end DC1 to supply power to the power motor 2.

Further, as shown in FIG. 12, the DC-DC converter 4 is further connected to an electric appliance device 10 and a low-voltage storage battery 20 in the hybrid power automobile to supply power to the electric appliance device 10 and the low-voltage storage battery 20, and the low-voltage storage battery 20 is further connected to the electric appliance device 10.

Specifically, as shown in FIG. 12, the DC-DC converter 4 further has a fourth direct current end DC4, and the DC-DC converter 4 may convert a high-voltage direct current output by the auxiliary motor 5 through the auxiliary-motor controller 51 into a low-voltage direct current, and output the low-voltage direct current through the fourth direct current end DC4. The fourth direct current end DC4 of the DC-DC converter 4 is connected to the first electric appliance device 10, so as to supply power to the first electric appliance device 10, where the first electric appliance device 10 may be a low-voltage power consumption device, and includes but is not limited to a lamp and a radio. The fourth direct current end DC4 of the DC-DC converter 4 may be further connected to the low-voltage storage battery 20, so as to charge the low-voltage storage battery 20. The low-voltage storage battery 20 is connected to the first electric appliance device 10, so as to supply power to the first electric appliance device 10. Particularly, when the auxiliary motor 5 stops power generation, the low-voltage storage battery 20 may supply power to the first electric appliance device 10, thereby ensuring low-voltage power consumption of the entire vehicle, ensuring that the entire vehicle may implement travelling in a pure fuel mode, and improving travelling mileage of the entire vehicle.

It should be noted that, in this embodiment of the present invention, a low voltage may be a voltage of 12 V or 24 V, a high voltage may be a voltage of 600 V, and a preset voltage range may be 11 V to 13 V or 23 to 25 V, but this embodiment is not limited thereto.

To sum up, the power system of a hybrid power automobile of this embodiment of the present invention not only can maintain low-speed electric balance and low-speed smoothness of the entire vehicle, but also can ensure normal operating of the DC-DC converter when the power battery is invalid or is damaged and disconnected from the DC-DC converter; and has high control precision and a small loss.

Moreover, an embodiment of the present invention further proposes a hybrid power automobile.

Figure 13:
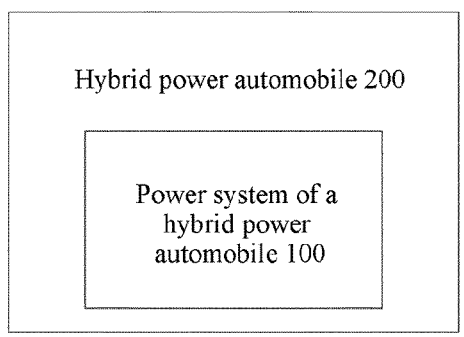
FIG. 13 is a schematic block diagram of a hybrid power automobile according to an embodiment of the present invention.

FIG. 13 is a schematic block diagram of a hybrid power automobile according to an embodiment of the present invention. As shown in FIG. 13, the hybrid power automobile 200 includes the power system 100 of a hybrid power automobile of the foregoing embodiment.

According to the hybrid power automobile proposed in this embodiment of the present invention, low-speed electric balance and low-speed smoothness of the entire vehicle can be maintained.

Based on the hybrid power automobile and the power system thereof of the foregoing embodiments, an embodiment of the present invention further proposes a power generation control method for a hybrid power automobile.

Figure 14:
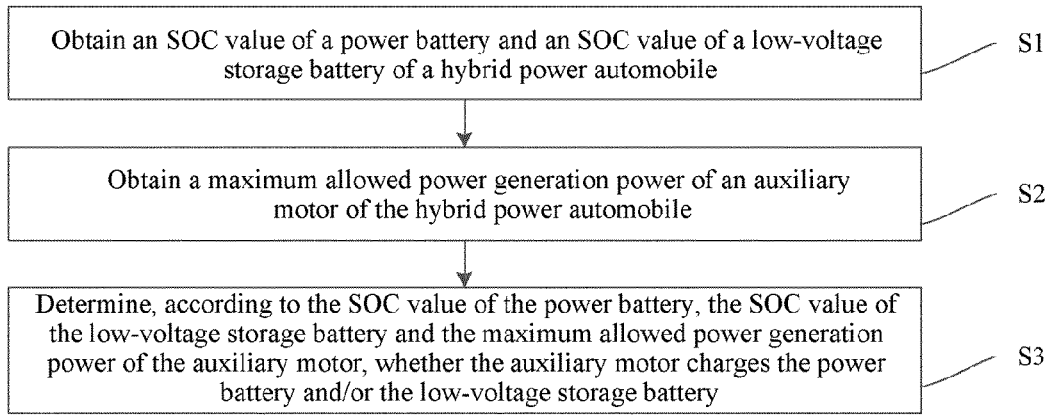
FIG. 14 is a flowchart of a power generation control method for a power system of a hybrid power automobile according to an embodiment of the present invention.

FIG. 14 is a flowchart of a power generation control method for a power system of a hybrid power automobile according to an embodiment of the present invention. As shown in FIG. 14, the power generation control method for a hybrid power automobile includes the following steps:

S1: Obtain an SOC value of a power battery and an SOC value of a low-voltage storage battery of the hybrid power automobile.

It should be noted that, the SOC value of the power battery and the SOC value of the low-voltage storage battery may be collected through a battery management system of the hybrid power automobile, so as to obtain the SOC value of the power battery and the SOC value of the low-voltage storage battery.

S2: Obtain a maximum allowed power generation power of an auxiliary motor of the hybrid power automobile.

According to a specific example of the present invention, the maximum allowed power generation power of the auxiliary motor is related to performance parameters and the like of the auxiliary motor and an engine. In other words, the maximum allowed power generation power of the auxiliary motor may be preset according to the performance parameters and the like of the auxiliary motor and the engine.

S3: Determine, according to the SOC value of the power battery, the SOC value of the low-voltage storage battery and the maximum allowed power generation power of the auxiliary motor, whether the auxiliary motor charges the power battery and/or the low-voltage storage battery.

Therefore, by charging the power battery, power consumption requirements of the power motor and the high-voltage electric appliance device may be ensured, and further it is ensured that the power motor drives the entire vehicle to normally travel; and by charging the low-voltage storage battery, power consumption requirements of the low-voltage electric appliance device may be ensured, and when the auxiliary motor stops power generation and the power battery is faulty or has an insufficient power level, low-voltage power supply of the entire vehicle may be implemented through the low-voltage storage battery, and further it is ensured that the entire vehicle may travel in the pure fuel mode, thereby improving travelling mileage of the entire vehicle.

Further, according to an embodiment of the present invention, when the SOC value of the power battery is less than a first preset SOC value and the SOC value of the low-voltage storage battery is greater than or equal to a second preset SOC value, the engine of the hybrid power automobile is controlled to drive the auxiliary motor to perform power generation to charge the power battery.

It should be understood that, the first preset SOC value may be a charging limit value of the power battery, the second preset SOC value may be a charging limit value of the low-voltage storage battery, and the first preset SOC value and the second preset SOC value may be independently set according to performance of the batteries.

Specifically, after the SOC value of the power battery and the SOC value of the low-voltage storage battery are obtained, whether the SOC value of the power battery is less than the first preset SOC value may be determined, and whether the SOC value of the low-voltage storage battery is less than the second preset SOC value may be determined. If the SOC value of the power battery is less than the first preset SOC value and the SOC value of the low-voltage storage battery is greater than or equal to the second preset SOC value, it indicates that the power battery has a relatively low remaining power level and needs to be charged, and the low-voltage storage battery has a relatively high remaining power level and does not need to be charged. In this case, a control module controls the engine to drive the auxiliary motor to perform power generation to charge the power battery.

As described above, the auxiliary motor belongs to a high-voltage motor. For example, a power generation voltage of the auxiliary motor is equivalent to a voltage of the power battery, and therefore electric energy generated by the auxiliary motor may directly charge the power battery without voltage conversion.

Similarly, when the SOC value of the power battery is greater than or equal to the first preset SOC value and the SOC value of the low-voltage storage battery is less than the second preset SOC value, the engine of the hybrid power automobile is controlled to drive the auxiliary motor to perform power generation to charge the low-voltage storage battery through a DC-DC converter of the hybrid power automobile.

To be specific, if the SOC value of the power battery is greater than or equal to the first preset SOC value and the SOC value of the low-voltage storage battery is less than the second preset SOC value, it indicates the power battery has a relatively high remaining power level and does not need to be charged, and the low-voltage storage battery has a relatively low remaining power level and needs to be charged. In this case, the control module controls the engine to drive the auxiliary motor to perform power generation to charge the low-voltage storage battery through the DC-DC converter.

As described above, the auxiliary motor belongs to a high-voltage motor. For example, a power generation voltage of the auxiliary motor is equivalent to a voltage of the power battery, and therefore electric energy generated by the auxiliary motor needs to be subjected to voltage conversion through the DC-DC converter and then charge the low-voltage storage battery.

Furthermore, according to an embodiment of the present invention, when the SOC value of the power battery is less than the first preset SOC value and the SOC value of the low-voltage storage battery is less than the second preset SOC value, a charging power of the power battery is obtained according to the SOC value of the power battery, and a charging power of the low-voltage storage battery is obtained according to the SOC value of the low-voltage storage battery; and when a sum of the charging power of the power battery and the charging power of the low-voltage storage battery is greater than the maximum allowed power generation power of the auxiliary motor, the engine of the hybrid power automobile is controlled to drive the auxiliary motor to perform power generation to charge the low-voltage storage battery through the DC-DC converter of the hybrid power automobile.

Moreover, when the sum of the charging power of the power battery and the charging power of the low-voltage storage battery is less than or equal to the maximum allowed power generation power of the auxiliary motor, the engine is controlled to drive the auxiliary motor to perform power generation to charge the power battery, and to simultaneously charge the low-voltage storage battery through the DC-DC converter.

To be specific, if the SOC value of the power battery is less than the first preset SOC value and the SOC value of the low-voltage storage battery is less than the second preset SOC value, it indicates that the power battery and the low-voltage storage battery each have a relatively low remaining power level, and need to be charged. In this case, whether the sum of the charging power of the power battery and the charging power of the low-voltage storage battery is greater than the maximum allowed power generation power of the auxiliary motor is further determined.

If the sum of the charging power of the power battery and the charging power of the low-voltage storage battery is greater than the maximum allowed power generation power of the auxiliary motor, it indicates that the electric energy that can be generated by the auxiliary motor is insufficient to simultaneously charge the two batteries. In this case, the low-voltage storage battery is preferentially charged, that is, the engine is controlled to drive the auxiliary motor to perform power generation to charge the low-voltage storage battery through the DC-DC converter.

If the sum of the charging power of the power battery and the charging power of the low-voltage storage battery is less than or equal to the maximum allowed power generation power of the auxiliary motor, it indicates that the electric energy that can be generated by the auxiliary motor can simultaneously charge the two batteries. In this case, the power battery and the low-voltage storage battery are simultaneously charged, that is, the engine is controlled to drive the auxiliary motor to perform power generation to charge the power battery, and simultaneously charge the low-voltage storage battery through the DC-DC converter.

Therefore, by preferentially charging the low-voltage storage battery, power consumption requirements of the low-voltage electric appliance device may be preferentially ensured, and further it may be ensured that the entire vehicle travels in the pure fuel mode when the power battery has an insufficient power level, thereby improving travelling mileage of the entire vehicle.

Certainly, it should be understood that, when the SOC value of the power battery is greater than or equal to the first preset SOC value and the SOC value of the low-voltage storage battery is greater than or equal to the second preset SOC value, it indicates that the power battery and the low-voltage storage battery each have a relatively high remaining power level, and do not need to be charged. In this case, the power battery and the low-voltage storage battery may be not charged.

Figure 15:
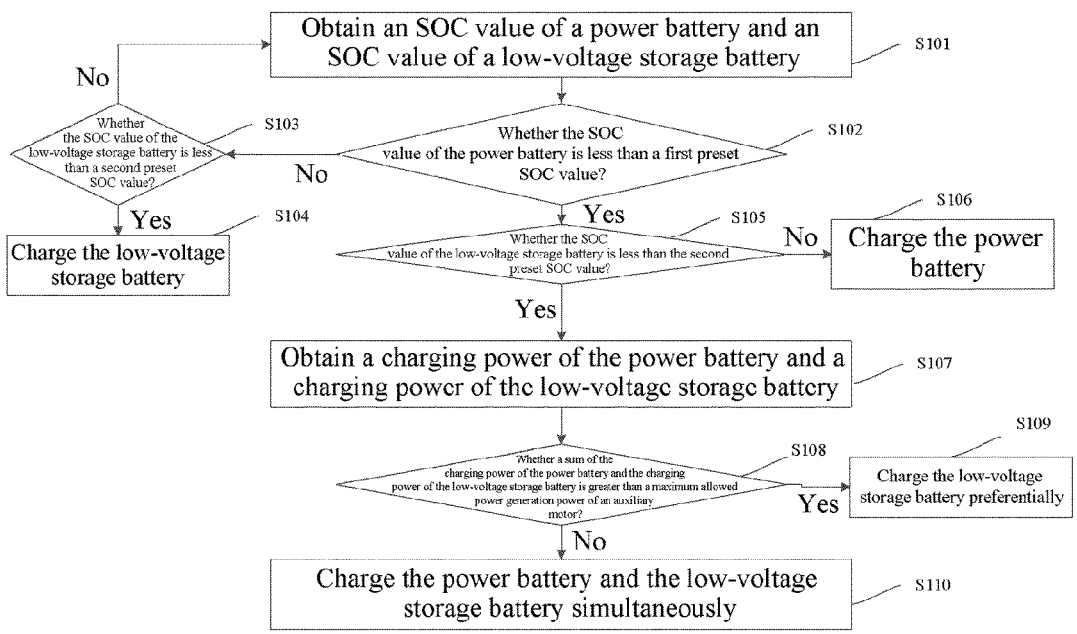
FIG. 15 is a flowchart of a power generation control method for a power system of a hybrid power automobile according to a specific embodiment of the present invention.

Specifically, as shown in FIG. 15, a power generation control method for a hybrid power automobile of an embodiment of the present invention specifically includes the following steps:

S101: Obtain an SOC value of a power battery and an SOC value of a low-voltage storage battery.

S102: Determine whether the SOC value of the power battery is less than a first preset SOC value.

If yes, step S105 is performed; or if not, step S103 is performed.

S103: Determine whether the SOC value of the low-voltage storage battery is less than a second preset SOC value.

If yes, step S104 is performed; or if not, the process returns to step S101.

S104: Charge the low-voltage storage battery, that is, control an engine to drive an auxiliary motor to perform power generation to charge the low-voltage storage battery through a DC-DC converter.

S105: Determine whether the SOC value of the low-voltage storage battery is less than a second preset SOC value.

If yes, step S107 is performed; or if not, step S106 is performed.

S106: Charge the power battery, that is, control the engine to drive the auxiliary motor to perform power generation to charge the power battery.

S107: Obtain a charging power of the power battery and a charging power of the low-voltage storage battery.

S108: Determine whether a sum of the charging power of the power battery and the charging power of the low-voltage storage battery is greater than a maximum allowed power generation power of the auxiliary motor.

If yes, step S109 is performed; or if not, step S110 is performed.

S109: Charge the low-voltage storage battery preferentially, that is, control the engine to drive the auxiliary motor to perform power generation to charge the low-voltage storage battery through the DC-DC converter.

S110: Charge the power battery and the low-voltage storage battery simultaneously, that is, control the engine to drive the auxiliary motor to perform power generation to charge the power battery, and simultaneously charge the low-voltage storage battery through the DC-DC converter.

To sum up, according to the power generation control method for a hybrid power automobile proposed in this embodiment of the present invention, whether the auxiliary motor charges the power battery and/or the low-voltage storage battery is determined according to the SOC value of the power battery, the SOC value of the low-voltage storage battery and the maximum allowed power generation power of the auxiliary motor. Therefore, the method not only may charge the power battery, but also may charge the low-voltage storage battery. Therefore, power consumption requirements of the power motor and the high-voltage electric appliance device may be ensured, and further it is ensured that the power motor drives the entire vehicle to normally travel; and power consumption requirements of the low-voltage electric appliance device may be ensured, and further when the auxiliary motor stops power generation and the power battery is faulty or has an insufficient power level, it may be ensured that the entire vehicle may travel in the pure fuel mode, thereby improving travelling mileage of the entire vehicle.

Based on the hybrid power automobile and the power system thereof of the foregoing embodiments, an embodiment of the present invention further proposes another power generation control method for a hybrid power automobile.

Figure 16:
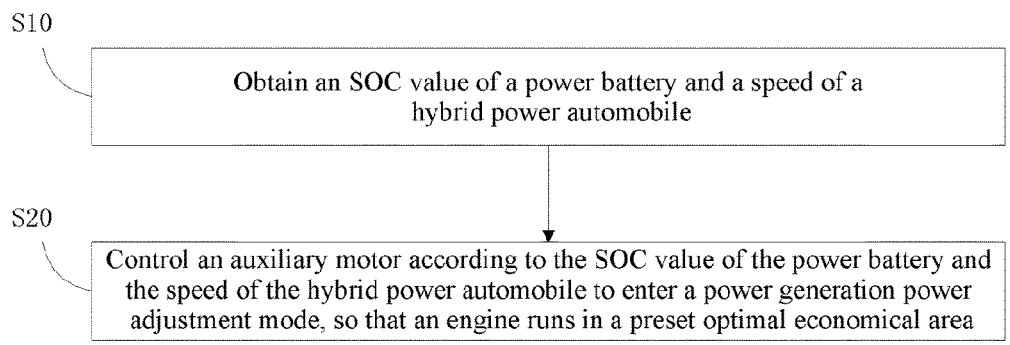
FIG. 16 is a flowchart of a power generation control method for a power system of a hybrid power automobile according to another embodiment of the present invention.

FIG. 16 is a flowchart of a power generation control method for a power system of a hybrid power automobile according to an embodiment of the present invention. As shown in FIG. 16, the power generation control method for a hybrid power automobile includes the following steps:

S10: Obtain an SOC value of a power battery and a speed of the hybrid power automobile.

It should be noted that, the SOC value of the power battery may be collected through a battery management system of the hybrid power automobile, so as to obtain the SOC value of the power battery.

S20: control, according to the SOC value of the power battery and the speed of the hybrid power automobile, an auxiliary motor to enter a power generation power adjustment mode, so that an engine runs in a preset optimal economical area.

It should be further noted that, the preset optimal economical area of the engine may be determined with reference to a diagram of an engine universal characteristic curve. FIG. 7 shows an example of the diagram of the engine universal characteristic curve, where a vertical coordinate indicates an output torque of the engine, a horizontal coordinate indicates a rotational speed of the engine, and a curve a is a fuel economy curve of the engine. An area corresponding to the fuel economy curve is the optimal economical area of the engine. To be specific, when a torsional moment and a torque of the engine are located on an optimal fuel economy curve of the engine, the engine is located in the optimal economical area. Therefore, in this embodiment of the present invention, the engine may be enabled, by controlling the rotational speed and the output torque of the engine to fall on the fuel economy curve of the engine, for example, the curve a, to run in the preset optimal economical area.

Further, according to an embodiment of the present invention, when the hybrid power automobile is travelling, the SOC value of the power battery and the speed V of the hybrid power automobile are obtained, and the auxiliary motor is controlled according to the SOC value of the power battery and the speed V of the hybrid power automobile to enter the power generation power adjustment mode, so that the engine runs in the preset optimal economical area. The power generation power adjustment mode is a mode of adjusting a power generation power of the engine, and in the power generation power adjustment mode, the power generation power of the auxiliary motor 5 may be adjusted by controlling the engine 1 to drive the auxiliary motor 5 to perform power generation.

Specifically, when the hybrid power automobile is travelling, the engine may output power to wheels of the hybrid power automobile through a clutch, and the engine may further drive the auxiliary motor to perform power generation. Therefore, the output power of the engine mainly includes two parts, one part is output to the auxiliary motor, that is, the power for driving the auxiliary motor to perform power generation, and the other part is output to the wheels, that is, the power for driving the wheels.

When the engine drives the auxiliary motor to perform power generation, the SOC value of the power battery and the speed of the hybrid power automobile may be first obtained, and then the auxiliary motor is controlled according to the SOC value of the power battery and the speed of the hybrid power automobile to enter the power generation power adjustment mode, so that the engine operates in the preset optimal economical area. In the power generation power adjustment mode, the power generation power of the auxiliary motor may be adjusted on the premise of enabling the engine to operate in the preset optimal economical area.

Therefore, the engine is enabled to operate in the preset optimal economical area, and because the engine has lowest fuel consumption and highest fuel economy in the preset optimal economical area, fuel consumption of the engine may be reduced, noise of the engine may be reduced, and running economy of the entire vehicle may be improved.

Moreover, because the auxiliary motor has relatively high power generation power and power generation efficiency at a low speed, power consumption requirements of low-speed travelling may be satisfied, and low-speed electric balance of the entire vehicle and low-speed smoothness of the entire vehicle may be maintained, to improve power performance of the entire vehicle. By charging the power battery, power consumption requirements of the power motor and the high-voltage electric appliance device may be ensured, and further it is ensured that the power motor drives the entire vehicle to normally travel.

Further, according to an embodiment of the present invention, when the SOC value of the power battery is greater than a preset limit value and is less than or equal to a first preset value, if the speed V of the hybrid power automobile is less than a first preset speed, the auxiliary motor is controlled to enter the power generation power adjustment mode.

The first preset value may be a preset upper limit value of the SOC value of the power battery, for example, a value of determining to stop charging, and may be preferably 30%. The preset limit value may be a preset lower limit value of the SOC value of the power battery, for example, a value of determining to stop discharging, and may be preferably 10%. SOC values of the power battery may be divided into three ranges according to the first preset value and the preset limit value, that is, a first power level range, a second power level range, and a third power level range. When the SOC value of the power battery is less than or equal to the preset limit value, the SOC value of the power battery falls within the first power level range. In this case, the power battery performs only charging but does not perform discharging. When the SOC value of the power battery is greater than the preset limit value and is less than or equal to the first preset value, the SOC value of the power battery falls within the second power level range. In this case, the power battery has a charging requirement, that is, the power battery may be actively charged. When the SOC value of the power battery is greater than the first preset value, the SOC value of the power battery falls within the third power level range. In this case, the power battery may be not charged, that is, the power battery is not actively charged.

Specifically, after the SOC value of the power battery and the speed V of the hybrid power automobile are obtained, a range within which the SOC value of the power battery falls may be determined. If the SOC value of the power battery falls within the second power level range, and the SOC value of the power battery is greater than the preset limit value and is less than or equal to the first preset value, it indicates that the power battery may be charged. In this case, whether the speed V of the hybrid power automobile is less than the first preset speed V1 is further determined. If the speed V of the hybrid power automobile is less than the first preset speed V1, the auxiliary motor is controlled to enter the power generation power adjustment mode. In this case, the speed of the hybrid power automobile is relatively low, a needed drive force is relatively small, the power motor is sufficient to drive the hybrid power automobile to travel, and the engine may drive only the auxiliary motor to perform power generation, but does not participate in drive.

Therefore, at a low speed, the engine performs only power generation but does not participate in drive, and because the engine does not participate in drive, the clutch does not need to be used, thereby reducing abrasion or slip friction of the clutch, reducing an unsmooth feeling, and improving comfortableness.

Further, according to an embodiment of the present invention, when the SOC value of the power battery is greater than the preset limit value M2 and is less than or equal to the first preset value M1, and the speed V of the hybrid power automobile is less than the first preset speed V1, an entire vehicle requirement power P2 of the hybrid power automobile is further obtained; and when the entire vehicle requirement power P2 is less than or equal to a maximum allowed power generation power Pmax of the auxiliary motor, the auxiliary motor is controlled to enter the power generation power adjustment mode.

Specifically, when the hybrid power automobile is travelling, if the SOC value of the power battery is greater than the preset limit value M2 and is less than or equal to the first preset value M1, and the speed V of the hybrid power automobile is less than the first preset speed V1, that is, the speed of the hybrid power automobile is relatively low, the entire vehicle requirement power P2 of the hybrid power automobile is obtained; and when the entire vehicle requirement power P2 is less than or equal to the maximum allowed power generation power Pmax of the auxiliary motor, the auxiliary motor is controlled to enter the power generation power adjustment mode.

Therefore, at a low speed, the engine performs only power generation but does not participate in drive, and because the engine does not participate in drive, the clutch does not need to be used, thereby reducing abrasion or slip friction of the clutch, reducing an unsmooth feeling, and improving comfortableness.

Furthermore, according to an embodiment of the present invention, when the SOC value of the power battery is greater than the preset limit value and is less than or equal to the first preset value M1, the speed V of the hybrid power automobile is less than the first preset speed V1, and the entire vehicle requirement power P2 is less than or equal to the maximum allowed power generation power Pmax of the auxiliary motor, an accelerator pedal depth D of the hybrid power automobile and an entire vehicle resistance F of the hybrid power automobile are further obtained; and when the accelerator pedal depth D is less than or equal to a first preset depth D1 and the entire vehicle resistance F of the hybrid power automobile is less than or equal to a first preset resistance F1, the auxiliary motor is controlled to enter the power generation power adjustment mode.

It should be noted that, the entire vehicle resistance of the hybrid power automobile may be travelling resistances of the hybrid power automobile, for example, a rolling resistance, an accelerating resistance, a grade resistance, and an air resistance.

Specifically, if the SOC value of the power battery is greater than the preset limit value and is less than or equal to the first preset value M1, the speed V of the hybrid power automobile is less than the first preset speed V1, and the entire vehicle requirement power P2 is less than or equal to the maximum power automobile and the entire vehicle resistance F of the hybrid power automobile are obtained in real time; and when the accelerator pedal depth D is less than or equal to the first preset depth D1 and the entire vehicle resistance F of the hybrid power automobile is less than or equal to the first preset resistance F1, indicating that the hybrid power automobile runs in a low speed mode, the auxiliary motor is controlled to enter the power generation power adjustment mode.

Therefore, at a low speed, the engine performs only power generation but does not participate in drive, and because the engine does not participate in drive, the clutch does not need to be used, thereby reducing abrasion or slip friction of the clutch, reducing an unsmooth feeling, and improving comfortableness.

As described above, when the hybrid power automobile is travelling at a low speed, the engine 1 may perform only power generation but does not participate in drive, and because the engine does not participate in drive, the clutch does not need to be used, thereby reducing abrasion or slip friction of the clutch, reducing an unsmooth feeling, and improving comfortableness. Moreover, the low speed enables the engine to operate in an economical area, and because the engine has lowest fuel consumption and highest fuel economy in the preset optimal economical area, thereby reducing fuel consumption, reducing noise of the engine, and improving running economy of the entire vehicle, so as to maintain low-speed electric balance and low-speed smoothness of the entire vehicle and improve performance of the entire vehicle.

Correspondingly, when the SOC value of the power battery, the speed V, the accelerator pedal depth D and the entire vehicle resistance F of the hybrid power automobile do not satisfy the foregoing conditions, the engine may participate in drive, and a specific operating process thereof is as follows:

According to an embodiment of the present invention, when the SOC value of the power battery is less than the preset limit value, the speed of the hybrid power automobile is greater than or equal to the first preset speed, the entire vehicle requirement power is greater than the maximum allowed power generation power of the auxiliary motor, the accelerator pedal depth is greater than the first preset depth, or the entire vehicle resistance of the hybrid power automobile is greater than the first preset resistance, the engine is controlled to participate in drive.

To be specific, when the SOC value of the power battery is less than the preset limit value M2, the speed of the hybrid power automobile is greater than or equal to the first preset speed, the entire vehicle requirement power is greater than the maximum allowed power generation power of the auxiliary motor, the accelerator pedal depth is greater than the first preset depth, or the entire vehicle resistance of the hybrid power automobile is greater than the first preset resistance, the engine is controlled to participate in drive. In this case, the power battery does not perform discharging again, the entire vehicle needs a relatively large drive force, the entire vehicle requirement power is relatively large, the accelerator pedal depth is relatively large or the entire vehicle resistance is also relatively large, the power motor is insufficient to drive the hybrid power automobile to travel, and the engine participates in drive to perform supplemental drive.

Therefore, the engine may participate in drive when the drive force output by the power motor is insufficient, thereby ensuring normal travelling of the entire vehicle, improving power performance of the entire vehicle, and improving travelling mileage of the entire vehicle.

More specifically, when the entire vehicle requirement power is greater than the maximum allowed power generation power of the auxiliary motor, the engine is further controlled to participate in drive to enable the engine to output power to wheels through the clutch.

Moreover, when the SOC value of the power battery is less than or equal to the preset limit value M2, the engine is further controlled to participate in drive to enable the engine to output power to wheels through the clutch; when the SOC value of the power battery is less than or equal to the first preset value M1, the speed V of the hybrid power automobile is less than the first preset speed V1 and the accelerator pedal depth D is greater than the first preset depth D1, the engine is further controlled to participate in drive to enable the engine to output power to the wheels through the clutch; and when the SOC value of the power battery is less than or equal to the first preset value M1, the speed V of the hybrid power automobile is less than the first preset speed V1 and the entire vehicle resistance F of the hybrid power automobile is greater than the first preset resistance F1, the engine is further controlled to participate in drive to enable the engine to output power to the wheels through the clutch.

Specifically, when the engine drives the auxiliary motor to perform power generation and the power motor outputs a drive force to the wheels of the hybrid power automobile, the SOC value of the power battery, the accelerator pedal depth D of the hybrid power automobile, the speed V and the entire vehicle resistance F are obtained in real time, and the SOC value of the power battery, the accelerator pedal depth D of the hybrid power automobile, the speed V and the entire vehicle resistance F are determined; and the power generation power of the auxiliary motor is adjusted according to the following three determining results:

First, when the SOC value of the power battery is less than the preset limit value M2, the engine is controlled to output power to the wheels through the clutch, so that the engine and the power motor simultaneously participate in drive, and load of the power motor is reduced to reduce power consumption of the power battery, thereby ensuring that the engine operates in the preset optimal economical area and preventing the SOC value of the power battery from quick decreasing.

Second, when the SOC value of the power battery is less than or equal to the first preset value M1, the speed V of the hybrid power automobile is less than the first preset speed V1 and the accelerator pedal depth D is greater than the first preset depth D1, the engine is controlled to output power to the wheels through the clutch, so that the engine and the power motor simultaneously participate in drive, and load of the power motor is reduced to reduce power consumption of the power battery, thereby ensuring that the engine operates in the preset optimal economical area and preventing the SOC value of the power battery from quick decreasing.

Third, when the SOC value of the power battery is less than or equal to the first preset value M1, the speed V of the hybrid power automobile is less than the first preset speed V1 and the resistance F of the hybrid power automobile is greater than the first preset resistance F1, the engine is controlled to output power to the wheels through the clutch, so that the engine and the power motor simultaneously participate in drive, and load of the power motor is reduced to reduce power consumption of the power battery, thereby ensuring that the engine operates in the preset optimal economical area and preventing the SOC value of the power battery from quick decreasing.

Therefore, the engine may participate in drive when the drive force output by the power motor is insufficient, thereby ensuring normal travelling of the entire vehicle, improving power performance of the entire vehicle, and improving travelling mileage of the entire vehicle. Moreover, the engine may be controlled to operate in an economical area, and because the engine has lowest fuel consumption and highest fuel economy in the preset optimal economical area, fuel consumption may be reduced, noise of the engine may be reduced, and economic performance of the entire vehicle may be improved.

Moreover, when the SOC value of the power battery is less than or equal to the preset limit value, and the speed of the hybrid power automobile is greater than the first preset speed, the engine is controlled to participate in drive to enable the engine to output power to the wheels through the clutch.

Therefore, the engine may participate in drive when the drive force output by the power motor is insufficient, thereby ensuring normal travelling of the entire vehicle, improving power performance of the entire vehicle, and improving travelling mileage of the entire vehicle.

Certainly, it should be understood that, when the SOC value of the power battery is greater than the first preset value, the engine does not drive the auxiliary motor to perform power generation. In this case, the power battery has an approximately full power level, and does not need to be charged, and the engine does not drive the auxiliary motor to perform power generation. To be specific, when the power battery has an approximately full power level, the engine does not drive the auxiliary motor to perform power generation, and therefore the auxiliary motor does not charge the power battery.

Further, after the auxiliary motor enters the power generation power adjustment mode, the power generation power of the auxiliary motor may be adjusted. A process of adjusting the power generation power of this embodiment of the present invention is specifically described below.

According to an embodiment of the present invention, after the auxiliary motor enters the power generation power adjustment mode, a power generation power P1 of the auxiliary motor is adjusted according to the entire vehicle requirement power P2 of the hybrid power automobile and a charging power P3 of the power battery.

According to an embodiment of the present invention, a formula of adjusting the power generation power P1 of the auxiliary motor according to the entire vehicle requirement power P2 of the hybrid power automobile and the charging power P3 of the power battery is as follows:

$$P1=P2+P3, \text{ where } P2=P11+P21.$$

P1 is the power generation power of the auxiliary motor, P2 is the entire vehicle requirement power, P3 is the charging power of the power battery, P11 is an entire vehicle drive power, and P21 is an electric appliance device power.

It should be noted that, electric appliance devices include a first electric appliance device and a second electric appliance device, that is, the electric appliance device power P21 may include power needed by the high-voltage electric appliance device and the low-voltage electric appliance device.

It should be further noted that, the entire vehicle drive power P11 may include the output power of the power motor, and the entire vehicle drive power P11 may be obtained according to a preset accelerator-torsional moment curve of the power motor and a rotational speed of the power motor, where the preset accelerator-torsional moment curve may be determined during power matching of the hybrid power automobile. Moreover, the electric appliance device power P21 may be obtained in real time according to electric appliance devices running on the entire vehicle, for example, the electric appliance device power P21 is calculated through DC consumption on a bus. Moreover, the charging power P3 of the power battery may be obtained according to the SOC value of the power battery. Assuming that the entire vehicle drive power P11 obtained in real time is equal to b1 kw, the electric appliance device power P21 is equal to b2 kw, and the charging power P3 of the power battery is equal to b3 kw, the power generation power of the auxiliary motor is equal to b1+b2+b3.

Specifically, when the hybrid power automobile is travelling, the charging power P3 of the power battery, the entire vehicle drive power P11 and the electric appliance device power P21 may be obtained, and a sum of the charging power P3 of the power battery, the entire vehicle drive power P11 and the electric appliance device power P21 is used as the power generation power P1 of the auxiliary motor. Therefore, the power generation power of the auxiliary motor may be adjusted according to the calculated P1 value. For example, the output torque and the rotational speed of the engine may be controlled according to the calculated P1 value, so as to adjust the power for the engine to drive the auxiliary motor to perform power generation.

Further, according to an embodiment of the present invention, the adjusting the power generation power of the auxiliary motor includes: obtaining an SOC value change rate of the power battery, and adjusting the power generation power of the auxiliary motor according to a relationship between the entire vehicle requirement power P2 and a minimum output power Pmin corresponding to the optimal economical area of the engine, and the SOC value change rate of the power battery.

It should be understood that, the SOC value change rate of the power battery may be obtained according to the SOC value of the power battery, for example, the SOC value of the power battery is collected once at each time interval t. In this way, a ratio of a difference between a current SOC value and a former SOC value of the power battery to the time interval t may be used as the SOC value change rate of the power battery 3.

Specifically, the optimal economical area of the engine may be determined according to the engine universal characteristic curve shown in FIG. 7, and then the minimum output power Pmin corresponding to the optimal economical area of the engine is obtained. After the minimum output power Pmin corresponding to the optimal economical area of the engine is determined, the power generation power of the auxiliary motor 5 may be adjusted according to the relationship between the entire vehicle requirement power P2 and the minimum output power Pmin corresponding to the optimal economical area of the engine, and the SOC value change rate of the power battery.

Therefore, when the hybrid power automobile is travelling at a low speed, the engine is enabled to operate in an economical area, thereby reducing fuel consumption, reducing noise of the engine, and improving economic performance of the entire vehicle. Moreover, at a low speed, the engine may perform only power generation but does not participate in drive, and because the engine does not participate in drive, the clutch does not need to be used, thereby reducing abrasion or slip friction of the clutch, reducing an unsmooth feeling, and improving comfortableness, so as to maintain low-speed electric balance and low-speed smoothness of the entire vehicle and improve performance of the entire vehicle.

A specific adjusting manner in which after the auxiliary motor enters the power generation power adjustment mode, the power generation power of the auxiliary motor is adjusted according to the relationship between the entire vehicle requirement power P2 and the minimum output power Pmin corresponding to the optimal economical area of the engine, and the SOC value change rate of the power battery is further described below.

Specifically, when the engine drives the auxiliary motor to perform power generation and the power motor outputs a drive force to the wheels of the hybrid power automobile, the entire vehicle drive power P11 and the electric appliance device power P21 are obtained in real time, so as to obtain the entire vehicle requirement power P2 of the hybrid power automobile, and the entire vehicle requirement power P2 of the hybrid power automobile is determined, where the entire vehicle requirement power P2 may satisfy the following three cases.

In a first case, the entire vehicle requirement power P2 is less than the minimum output power Pmin corresponding to the optimal economical area of the engine; in a second case, the entire vehicle requirement power P2 is greater than or equal to the minimum output power Pmin corresponding to the optimal economical area of the engine and is less than or equal to the maximum allowed power generation power Pmax of the auxiliary motor; and in a third case, the entire vehicle requirement power P2 is greater than the maximum allowed power generation power Pmax of the auxiliary motor.

In an embodiment of the first case, when the entire vehicle requirement power P2 is less than the minimum output power Pmin corresponding to the optimal economical area of the engine, the charging power P3 of the power battery is obtained according to the SOC value change rate of the power battery, and whether the charging power P3 of the power battery is less than the difference between the minimum output power Pmin and the entire vehicle requirement power P2 is determined. If the charging power P3 of the power battery is less than the difference between the minimum output power Pmin and the entire vehicle requirement power P2, the engine is controlled to perform power generation at the minimum output power Pmin to adjust the power generation power of the auxiliary motor; or if the charging power P3 of the power battery is greater than or equal to the difference between the minimum output power Pmin and the entire vehicle requirement power P2, an output power of the engine in the preset optimal economical area is obtained according to a sum of the charging power P3 of the power battery and the entire vehicle requirement power P2, and the engine is controlled to perform power generation at the obtained output power to adjust the power generation power P1 of the auxiliary motor.

It should be noted that, a first relationship table between the SOC value change rate of the power battery and the charging power P3 of the power battery may be pre-stored. Therefore, after an SOC value change rate of the power battery is obtained, a corresponding charging power P3 of the power battery may be obtained by performing matching on the first relationship table. The SOC value change rate of the power battery and the charging power P3 of the power battery satisfy a relationship shown in Table 1.

TABLE 1

| SOC value change rate of the power battery 3 | A1 | A2 | A3 | A4 | A5 |
|---|---|---|---|---|---|
| Charging power P3 of the power battery 3 | B1 | B2 | B3 | B4 | B5 |

It is learned from Table 1 that, when an obtained SOC value change rate is A1, an obtained corresponding charging power P3 of the power battery is B1; when an obtained SOC value change rate is A2, an obtained corresponding charging power P3 of the power battery is B2; when an obtained SOC value change rate is A3, an obtained corresponding charging power P3 of the power battery is B3; when an obtained SOC value change rate is A4, an obtained corresponding charging power P3 of the power battery is B4; and when an obtained SOC value change rate is A5, an obtained corresponding charging power P3 of the power battery is B5.

Specifically, after the auxiliary motor enters the power generation power adjustment mode, the entire vehicle drive power P11 and the electric appliance device power P21 are obtained in real time, so as to obtain the entire vehicle requirement power P2 of the hybrid power automobile, and the entire vehicle requirement power P2 of the hybrid power automobile is determined. When the entire vehicle requirement power P2 is less than the minimum output power Pmin corresponding to the optimal economical area of the engine, the charging power P3 of the power battery may be obtained according to the SOC value change rate of the power battery, and whether the charging power P3 of the power battery is less than the difference between the minimum output power Pmin and the entire vehicle requirement power P2 is determined.

When the entire vehicle requirement power P2 is less than the minimum output power Pmin corresponding to the optimal economical area of the engine 1, if the charging power P3 of the power battery is less than the difference between the minimum output power Pmin and the entire vehicle requirement power P2, that is, P3<Pmin–P2, the engine is controlled to perform power generation at the minimum output power Pmin to adjust the power generation power of the auxiliary motor 1. If the charging power P3 of the power battery is greater than or equal to the difference between the minimum output power Pmin and the entire vehicle requirement power P2, that is, P3≥Pmin–P2, the output power of the engine in the preset optimal economical area is obtained according to the sum of the charging power P3 of the power battery and the entire vehicle requirement power P2, and the engine is controlled to perform power generation at the obtained output power to adjust the power generation power of the auxiliary motor.

Therefore, when the entire vehicle requirement power P2 is less than the minimum output power Pmin corresponding to the optimal economical area of the engine, the power generation power of the engine is obtained according to the relationship between the charging power P3 of the power battery and the difference between the minimum output power Pmin corresponding to the optimal economical area of the engine and the entire vehicle requirement power P2, so that the engine runs in the preset optimal economical area, and the engine performs only power generation but does not participate in drive, thereby reducing fuel consumption of the engine, and reducing noise of the engine.

In an embodiment of the second case, when the entire vehicle requirement power P2 is greater than or equal to the minimum output power Pmin corresponding to the optimal economical area of the engine and is less than or equal to the maximum allowed power generation power Pmax of the auxiliary motor, the charging power P3 of the power battery is obtained according to the SOC value change rate of the power battery, an output power of the engine in the preset optimal economical area is obtained according to a sum of the charging power P3 of the power battery and the entire vehicle requirement power P2, and the engine is controlled to perform power generation at the obtained output power to adjust the power generation power P1 of the auxiliary motor.

Specifically, when the entire vehicle requirement power P2 is greater than or equal to the minimum output power Pmin corresponding to the optimal economical area of the engine and is less than the maximum allowed power generation power Pmax of the auxiliary motor, the charging power P3 of the power battery is further obtained according to the SOC value change rate of the power battery when the engine is controlled to operate in the preset optimal economical area, and the output power of the engine in the preset optimal economical area is obtained according to the sum of the charging power P3 of the power battery and the entire vehicle requirement power P2, where the obtained output power is equal to P3+P2. Then, the engine is controlled to perform power generation at the obtained output power to adjust the power generation power P1 of the auxiliary motor, thereby increasing the SOC value of the power battery, and enabling the engine to operate in the preset optimal economical area.

Therefore, when the entire vehicle requirement power P2 is greater than or equal to the minimum output power Pmin corresponding to the optimal economical area of the engine and is less than the maximum allowed power generation power Pmax of the auxiliary motor, the output power of the engine is obtained according to the sum of the charging power P3 of the power battery and the entire vehicle requirement power P2, so that the engine runs in the preset optimal economical area, and the engine performs only power generation but does not participate in drive, thereby reducing fuel consumption of the engine, and reducing noise of the engine.

In an embodiment of the third case, when the entire vehicle requirement power P2 is greater than the maximum allowed power generation power Pmax of the auxiliary motor, the engine is further controlled to participate in drive to enable the engine to output power to wheels through the clutch.

Specifically, when the entire vehicle requirement power P2 is greater than the maximum allowed power generation power Pmax of the auxiliary motor, that is, the entire vehicle requirement power P2 of the hybrid power automobile is greater than the power generation power P1 of the auxiliary motor, the engine is further controlled to output a drive force to the wheels through the clutch to enable the engine to participate in drive. Therefore, the engine undertakes a part of a drive power P, so as to reduce a requirement of the auxiliary motor on the power generation power P1, so that the engine operates in the preset optimal economical area.

Therefore, when the entire vehicle requirement power P2 is greater than the maximum allowed power generation power Pmax of the auxiliary motor, the power battery discharges outward to supply power to the power motor. In this case, the engine and the power motor are controlled to simultaneously output power to the wheels of the hybrid power automobile, so that the engine operates in the preset optimal economical area.

Figure 17:
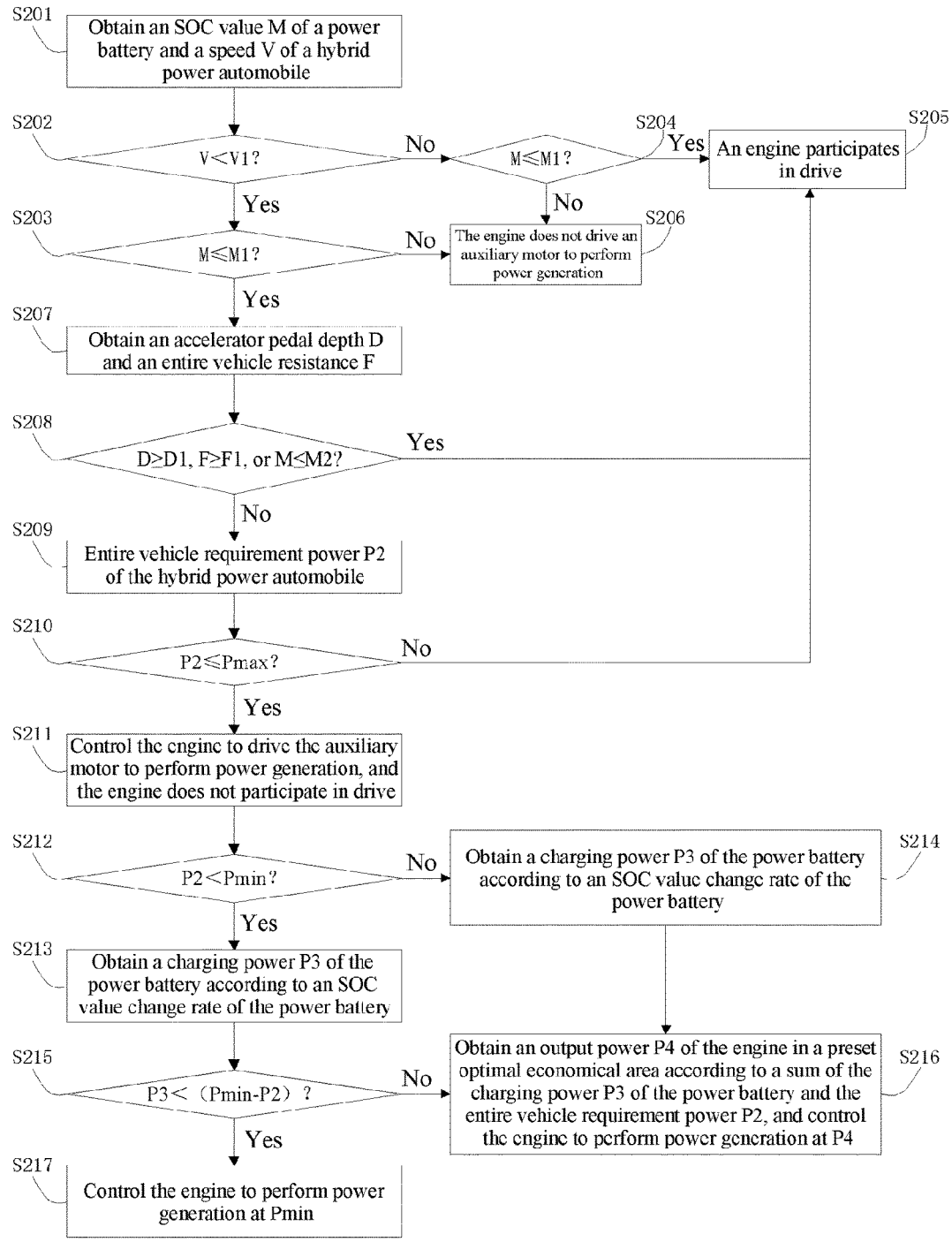
FIG. 17 is a flowchart of a power generation control method for a power system of a hybrid power automobile according to another specific embodiment of the present invention.

As described above, as shown in FIG. 17, a power generation control method for a hybrid power automobile of an embodiment of the present invention specifically includes the following steps:

S201: Obtain an SOC value M of a power battery and a speed V of the hybrid power automobile.

S202: Determine whether the speed V of the hybrid power automobile is less than a first preset speed V1.

If yes, step S203 is performed; or if not, step S204 is performed.

S203: Determine whether the SOC value M of the power battery is less than or equal to a first preset value M1.

If yes, step S207 is performed; or if not, step S206 is performed.

S204: Determine whether the SOC value M of the power battery is less than or equal to a first preset value M1.

If yes, step S205 is performed; or if not, step S206 is performed.

S205: Control an engine to participate in drive.

S206: Control the engine not to drive an auxiliary motor to perform power generation.

S207: Obtain an accelerator pedal depth D of the hybrid power automobile and an entire vehicle resistance F of the hybrid power automobile.

S208: Determine whether the accelerator pedal depth D is greater than a first preset depth D1, whether the entire vehicle resistance F of the hybrid power automobile is greater than a first preset resistance F1, or whether the SOC value M of the power battery is less than a preset limit value M2.

If yes, step S205 is performed; or if not, step S209 is performed.

S209: Obtain an entire vehicle requirement power P2 of the hybrid power automobile.

S210: Determine whether the entire vehicle requirement power P2 is less than or equal to a maximum allowed power generation power Pmax of the auxiliary motor.

If yes, step S211 is performed; or if not, step S205 is performed.

S211: Control the engine to drive the auxiliary motor to perform power generation, and the engine not to participate in drive.

In this case, the auxiliary motor is controlled to enter a power generation power adjustment mode.

S212: Determine whether the entire vehicle requirement power P2 is less than a minimum output power Pmin corresponding to an optimal economical area of the engine.

If yes, step S213 is performed; or if not, step S214 is performed.

S213: Obtain a charging power P3 of the power battery according to an SOC value change rate of the power battery, and perform step S215.

S214: Obtain a charging power P3 of the power battery according to an SOC value change rate of the power battery, and perform step S216.

S215: Determine whether the charging power P3 of the power battery is less than a difference between the minimum output power Pmin and the entire vehicle requirement power P2.

If yes, step S217 is performed; or if not, step S216 is performed.

S216: Obtain an output power of the engine in the preset optimal economical area according to a sum of the charging power P3 of the power battery and the entire vehicle requirement power P2, and control the engine to perform power generation at the obtained output power.

S217: Control the engine to perform power generation at the minimum output power Pmin.

To sum up, according to the power generation control method for a hybrid power automobile of this embodiment of the present invention, the SOC value of the power battery and the speed of the hybrid power automobile are first obtained, and the auxiliary motor is controlled according to the SOC value of the power battery and the speed of the hybrid power automobile to enter the power generation power adjustment mode, so that the engine runs in the preset optimal economical area, thereby reducing fuel consumption of the engine, improving running economy of the entire vehicle, reducing noise of the engine, implementing a plurality of drive modes, maintaining low-speed electric balance and low-speed smoothness of the entire vehicle, and improving performance of the entire vehicle.

Based on the hybrid power automobile and the power system thereof of the foregoing embodiments, an embodiment of the present invention further proposes still another power generation control method for a hybrid power automobile.

Figure 18:
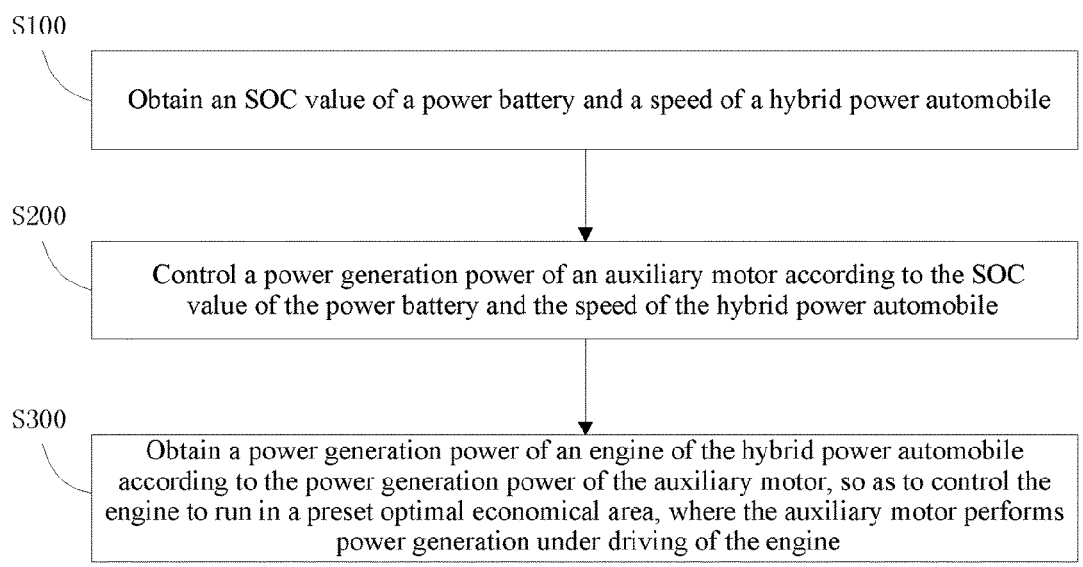
FIG. 18 is a flowchart of a power generation control method for a power system of a hybrid power automobile according to still another embodiment of the present invention.

FIG. 18 is a flowchart of a power generation control method for a power system of a hybrid power automobile according to an embodiment of the present invention. As shown in FIG. 18, the power generation control method for a hybrid power automobile includes the following steps:

S100: Obtain an SOC value of a power battery and a speed of the hybrid power automobile.

It should be noted that, the SOC value of the power battery may be collected through a battery management system of the hybrid power automobile, so as to obtain the SOC value of the power battery.

S200: Control a power generation power P1 of an auxiliary motor according to the SOC value of the power battery and the speed of the hybrid power automobile.

S300: Obtain a power generation power of an engine of the hybrid power automobile according to the power generation power of the auxiliary motor, so as to control the engine to run in a preset optimal economical area, where the auxiliary motor performs power generation under driving of the engine.

It should be further noted that, the preset optimal economical area of the engine may be determined with reference to a diagram of an engine universal characteristic curve. FIG. 7 shows an example of the diagram of the engine universal characteristic curve, where a vertical coordinate indicates an output torque of the engine, a horizontal coordinate indicates a rotational speed of the engine, and a curve a is a fuel economy curve of the engine. An area corresponding to the fuel economy curve is the optimal economical area of the engine. To be specific, when a torsional moment and a torque of the engine are located on an optimal fuel economy curve of the engine, the engine is located in the optimal economical area. Therefore, in this embodiment of the present invention, the engine may be enabled, by controlling the rotational speed and the output torque of the engine to fall on the fuel economy curve of the engine, for example, the curve a, to run in the preset optimal economical area.

Further, according to an embodiment of the present invention, when the hybrid power automobile is travelling, the SOC value of the power battery and the speed V of the hybrid power automobile are obtained, the power generation power P1 of the auxiliary motor is controlled according to the SOC value of the power battery and the speed V of the hybrid power automobile, and the power generation power P0 of the engine 1 is obtained according to the power generation power P1 of the auxiliary motor to control the engine to run in the preset optimal economical area.

Specifically, when the hybrid power automobile is travelling, the engine may output power to wheels of the hybrid power automobile through a clutch, and the engine may further drive the auxiliary motor to perform power generation. Therefore, the output power of the engine mainly includes two parts, one part is output to the auxiliary motor, that is, the power for driving the auxiliary motor to perform power generation, and the other part is output to the wheels, that is, the power for driving the wheels.

When the engine drives the auxiliary motor to perform power generation, the SOC value of the power battery 3 and the speed of the hybrid power automobile may be first obtained, the power generation power P1 of the auxiliary motor is then controlled according to the SOC value of the power battery 3 and the speed of the hybrid power automobile, and the power generation power P0 of the engine 1 is obtained according to the power generation power P1 of the auxiliary motor to control the engine to run in the preset optimal economical area. Power for the engine to drive the auxiliary motor to perform power generation is determined on the premise of enabling the engine to operate in the preset optimal economical area, thereby adjusting the power generation power P1 of the auxiliary motor.

Therefore, the engine is enabled to operate in the preset optimal economical area, and because the engine has lowest fuel consumption and highest fuel economy in the preset optimal economical area, fuel consumption of the engine may be reduced, noise of the engine may be reduced, and running economy of the entire vehicle may be improved. Moreover, because the auxiliary motor has relatively high power generation power and power generation efficiency at a low speed, power consumption requirements of low-speed travelling may be satisfied, and low-speed electric balance of the entire vehicle and low-speed smoothness of the entire vehicle may be maintained, to improve power performance of the entire vehicle. By charging the power battery, power consumption requirements of the power motor and the high-voltage electric appliance device may be ensured, and further it is ensured that the power motor drives the entire vehicle to normally travel.

Further, according to an embodiment of the present invention, when the SOC value of the power battery is greater than a preset limit value and is less than or equal to a first preset value, if the speed V of the hybrid power automobile is less than a first preset speed V1, the power generation power P1 of the auxiliary motor is controlled.

The first preset value may be a preset upper limit value of the SOC value of the power battery, for example, a value of determining to stop charging, and may be preferably 30%. The preset limit value may be a preset lower limit value of the SOC value of the power battery, for example, a value of determining to stop discharging, and may be preferably 10%. SOC values of the power battery may be divided into three ranges according to the first preset value and the preset limit value, that is, a first power level range, a second power level range, and a third power level range. When the SOC value of the power battery is less than or equal to the preset limit value, the SOC value of the power battery falls within the first power level range. In this case, the power battery performs only charging but does not perform discharging. When the SOC value of the power battery is greater than the preset limit value and is less than or equal to the first preset value, the SOC value of the power battery falls within the second power level range. In this case, the power battery has a charging requirement, that is, the power battery may be actively charged. When the SOC value of the power battery is greater than the first preset value, the SOC value of the power battery falls within the third power level range. In this case, the power battery may be not charged, that is, the power battery is not actively charged.

Specifically, after the SOC value of the power battery and the speed V of the hybrid power automobile are obtained, a range within which the SOC value of the power battery falls may be determined. If the SOC value of the power battery falls within the second power level range, and the SOC value of the power battery is greater than the preset limit value and is less than or equal to the first preset value, it indicates that the power battery may be charged. In this case, whether the speed V of the hybrid power automobile is less than the first preset speed V1 is further determined. If the speed V of the hybrid power automobile is less than the first preset speed V1, the power generation power P1 of the auxiliary motor 5 is controlled. In this case, the speed of the hybrid power automobile is relatively low, a needed drive force is relatively small, the power motor is sufficient to drive the hybrid power automobile to travel, and the engine may drive only the auxiliary motor to perform power generation, but does not participate in drive.

Therefore, at a low speed, the engine performs only power generation but does not participate in drive, and because the engine does not participate in drive, the clutch does not need to be used, thereby reducing abrasion or slip friction of the clutch, reducing an unsmooth feeling, and improving comfortableness.

Further, according to an embodiment of the present invention, when the SOC value of the power battery is greater than the preset limit value M2 and is less than or equal to the first preset value M1, and the speed V of the hybrid power automobile is less than the first preset speed V1, an entire vehicle requirement power P2 of the hybrid power automobile is further obtained; and when the entire vehicle requirement power P2 is less than or equal to a maximum allowed power generation power Pmax of the auxiliary motor, the power generation power P1 of the auxiliary motor is controlled.

Specifically, when the hybrid power automobile is travelling, if the SOC value of the power battery is greater than the preset limit value M2 and is less than or equal to the first preset value M1, and the speed V of the hybrid power automobile is less than the first preset speed V1, that is, the speed of the hybrid power automobile is relatively low, the entire vehicle requirement power P2 of the hybrid power automobile is obtained; and when the entire vehicle requirement power P2 is less than or equal to the maximum allowed power generation power Pmax of the auxiliary motor, the power generation power P1 of the auxiliary motor is controlled.

Therefore, at a low speed, the engine performs only power generation but does not participate in drive, and because the engine does not participate in drive, the clutch does not need to be used, thereby reducing abrasion or slip friction of the clutch, reducing an unsmooth feeling, and improving comfortableness.

Furthermore, according to an embodiment of the present invention, when the SOC value of the power battery is greater than the preset limit value and is less than or equal to the first preset value M1, the speed V of the hybrid power automobile is less than the first preset speed V1, and the entire vehicle requirement power P2 is less than or equal to the maximum allowed power generation power Pmax of the auxiliary motor, an accelerator pedal depth D of the hybrid power automobile and an entire vehicle resistance F of the hybrid power automobile are further obtained; and when the accelerator pedal depth D is less than or equal to a first preset depth D1 and the entire vehicle resistance F of the hybrid power automobile is less than or equal to a first preset resistance F1, the power generation power P1 of the auxiliary motor is controlled.

It should be noted that, the entire vehicle resistance of the hybrid power automobile may be travelling resistances of the hybrid power automobile, for example, a rolling resistance, an accelerating resistance, a grade resistance, and an air resistance.

Specifically, if the SOC value of the power battery is greater than the preset limit value and is less than or equal to the first preset value M1, the speed V of the hybrid power automobile is less than the first preset speed V1, and the entire vehicle requirement power P2 is less than or equal to the maximum power automobile and the entire vehicle resistance F of the hybrid power automobile are obtained in real time; and when the accelerator pedal depth D is less than or equal to the first preset depth D1 and the entire vehicle resistance F of the hybrid power automobile is less than or equal to the first preset resistance F1, indicating that the hybrid power automobile runs in a low speed mode, the power generation power P1 of the auxiliary motor is controlled.

Therefore, at a low speed, the engine performs only power generation but does not participate in drive, and because the engine does not participate in drive, the clutch does not need to be used, thereby reducing abrasion or slip friction of the clutch, reducing an unsmooth feeling, and improving comfortableness.

As described above, when the hybrid power automobile is travelling at a low speed, the engine 1 may perform only power generation but does not participate in drive, and because the engine does not participate in drive, the clutch does not need to be used, thereby reducing abrasion or slip friction of the clutch, reducing an unsmooth feeling, and improving comfortableness. Moreover, the low speed enables the engine to operate in an economical area, and because the engine has lowest fuel consumption and highest fuel economy in the preset optimal economical area, thereby reducing fuel consumption, reducing noise of the engine, and improving running economy of the entire vehicle, so as to maintain low-speed electric balance and low-speed smoothness of the entire vehicle and improve performance of the entire vehicle.

According to an embodiment of the present invention, when the engine is controlled to individually drive the auxiliary motor to perform power generation and the power motor is controlled to output a drive force alone, the power generation power P0 of the engine is obtained according to the following formula:

$$P0 = P1/\eta/\zeta$$

where P1 represents the power generation power of the auxiliary motor, represents belt transmission efficiency, and represents efficiency of the auxiliary motor.

To be specific, if the engine may perform only power generation but does not participate in drive, the power generation power P0 of the engine may be calculated according to the power generation power of the auxiliary motor, the belt transmission efficiency 11 and the efficiency of the auxiliary motor, and the engine is controlled to drive the auxiliary motor at the obtained power generation power P0 to perform power generation, so as to control the power generation power of the auxiliary motor.

Correspondingly, when the SOC value of the power battery, the speed V, the accelerator pedal depth D and the entire vehicle resistance F of the hybrid power automobile do not satisfy the foregoing conditions, the engine may participate in drive, and a specific operating process thereof is as follows:

According to an embodiment of the present invention, when the SOC value of the power battery is less than the preset limit value, the speed of the hybrid power automobile is greater than or equal to the first preset speed, the entire vehicle requirement power is greater than the maximum allowed power generation power of the auxiliary motor, the accelerator pedal depth is greater than the first preset depth, or the entire vehicle resistance of the hybrid power automobile is greater than the first preset resistance, the engine is controlled to participate in drive.

To be specific, when the SOC value of the power battery is less than the preset limit value M2, the speed of the hybrid power automobile is greater than or equal to the first preset speed, the entire vehicle requirement power is greater than the maximum allowed power generation power of the auxiliary motor, the accelerator pedal depth is greater than the first preset depth, or the entire vehicle resistance of the hybrid power automobile is greater than the first preset resistance, the engine is controlled to participate in drive. In this case, the power battery does not perform discharging again, the entire vehicle needs a relatively large drive force, the entire vehicle requirement power is relatively large, the accelerator pedal depth is relatively large or the entire vehicle resistance is also relatively large, the power motor is insufficient to drive the hybrid power automobile to travel, and the engine participates in drive to perform supplemental drive.

Therefore, the engine may participate in drive when the drive force output by the power motor is insufficient, thereby ensuring normal travelling of the entire vehicle, improving power performance of the entire vehicle, and improving travelling mileage of the entire vehicle.

More specifically, when the entire vehicle requirement power is greater than the maximum allowed power generation power of the auxiliary motor, the engine is further controlled to participate in drive to enable the engine to output power to wheels through the clutch.

Moreover, when the SOC value of the power battery is less than or equal to the preset limit value M2, the engine is further controlled to participate in drive to enable the engine to output power to wheels through the clutch; when the SOC value of the power battery is less than or equal to the first preset value M1, the speed V of the hybrid power automobile is less than the first preset speed V1 and the accelerator pedal depth D is greater than the first preset depth D1, the engine is further controlled to participate in drive to enable the engine to output power to the wheels through the clutch; and when the SOC value of the power battery is less than or equal to the first preset value M1, the speed V of the hybrid power automobile is less than the first preset speed V1 and the entire vehicle resistance F of the hybrid power automobile is greater than the first preset resistance F1, the engine is further controlled to participate in drive to enable the engine to output power to the wheels through the clutch.

Specifically, when the engine drives the auxiliary motor to perform power generation and the power motor outputs a drive force to the wheels of the hybrid power automobile, the SOC value of the power battery, the accelerator pedal depth D of the hybrid power automobile, the speed V and the entire vehicle resistance F are obtained in real time, and the SOC value of the power battery, the accelerator pedal depth D of the hybrid power automobile, the speed V and the entire vehicle resistance F are determined; and the power generation power of the auxiliary motor is adjusted according to the following three determining results:

First, when the SOC value of the power battery is less than the preset limit value M2, the engine is controlled to output power to the wheels through the clutch, so that the engine and the power motor simultaneously participate in drive, and load of the power motor is reduced to reduce power consumption of the power battery, thereby ensuring that the engine operates in the preset optimal economical area and preventing the SOC value of the power battery from quick decreasing.

Second, when the SOC value of the power battery is less than or equal to the first preset value M1, the speed V of the hybrid power automobile is less than the first preset speed V1 and the accelerator pedal depth D is greater than the first preset depth D1, the engine is controlled to output power to the wheels through the clutch, so that the engine and the power motor simultaneously participate in drive, and load of the power motor is reduced to reduce power consumption of the power battery, thereby ensuring that the engine operates in the preset optimal economical area and preventing the SOC value of the power battery from quick decreasing.

Third, when the SOC value of the power battery is less than or equal to the first preset value M1, the speed V of the hybrid power automobile is less than the first preset speed V1 and the resistance F of the hybrid power automobile is greater than the first preset resistance F1, the engine is controlled to output power to the wheels through the clutch, so that the engine and the power motor simultaneously participate in drive, and load of the power motor is reduced to reduce power consumption of the power battery, thereby ensuring that the engine operates in the preset optimal economical area and preventing the SOC value of the power battery from quick decreasing.

Therefore, the engine may participate in drive when the drive force output by the power motor is insufficient, thereby ensuring normal travelling of the entire vehicle, improving power performance of the entire vehicle, and improving travelling mileage of the entire vehicle. Moreover, the engine may be controlled to operate in an economical area, and because the engine has lowest fuel consumption and highest fuel economy in the preset optimal economical area, fuel consumption may be reduced, noise of the engine may be reduced, and economic performance of the entire vehicle may be improved.

Moreover, when the SOC value of the power battery is less than or equal to the preset limit value, and the speed of the hybrid power automobile is greater than the first preset speed, the engine is controlled to participate in drive to enable the engine to output power to the wheels through the clutch.

Therefore, the engine may participate in drive when the drive force output by the power motor is insufficient, thereby ensuring normal travelling of the entire vehicle, improving power performance of the entire vehicle, and improving travelling mileage of the entire vehicle.

Certainly, it should be understood that, when the SOC value of the power battery is greater than the first preset value, the engine does not drive the auxiliary motor to perform power generation. In this case, the power battery has an approximately full power level, and does not need to be charged, and the engine does not drive the auxiliary motor to perform power generation. To be specific, when the power battery has an approximately full power level, the engine does not drive the auxiliary motor to perform power generation, and therefore the auxiliary motor does not charge the power battery.

Further, after the auxiliary motor enters the power generation power adjustment mode, the power generation power of the auxiliary motor may be adjusted. A process of adjusting the power generation power of this embodiment of the present invention is specifically described below.

According to an embodiment of the present invention, after the auxiliary motor enters the power generation power adjustment mode, a power generation power $P1$ of the auxiliary motor is controlled according to the entire vehicle requirement power $P2$ of the hybrid power automobile and a charging power $P3$ of the power battery.

According to an embodiment of the present invention, a formula of controlling the power generation power $P1$ of the auxiliary motor according to the entire vehicle requirement power P2 of the hybrid power automobile and the charging power P3 of the power battery is as follows:

$P1=P2+P3$, where $P2=P11+P21$.

P1 is the power generation power of the auxiliary motor, P2 is the entire vehicle requirement power, P3 is the charging power of the power battery, P11 is an entire vehicle drive power, and P21 is an electric appliance device power.

It should be noted that, electric appliance devices may include a first electric appliance device and a second electric appliance device, that is, the electric appliance device power P21 may include power needed by the high-voltage electric appliance device and the low-voltage electric appliance device.

It should be further noted that, the entire vehicle drive power P11 may include the output power of the power motor 2, and the entire vehicle drive power P11 may be obtained according to a preset accelerator-torsional moment curve of the power motor and a rotational speed of the power motor, where the preset accelerator-torsional moment curve may be determined during power matching of the hybrid power automobile. Moreover, the electric appliance device power P21 may be obtained in real time according to electric appliance devices running on the entire vehicle, for example, the electric appliance device power P21 is calculated through DC consumption on a bus. Moreover, the charging power P3 of the power battery may be obtained according to the SOC value of the power battery. Assuming that the entire vehicle drive power P11 obtained in real time is equal to b1 kw, the electric appliance device power P21 is equal to b2 kw, and the charging power P3 of the power battery is equal to b3 kw, the power generation power of the auxiliary motor is equal to b1+b2+b3.

Specifically, when the hybrid power automobile is travelling, the charging power P3 of the power battery, the entire vehicle drive power P11 and the electric appliance device power P21 may be obtained, and a sum of the charging power P3 of the power battery, the entire vehicle drive power P11 and the electric appliance device power P21 is used as the power generation power P1 of the auxiliary motor. Therefore, the power generation power of the auxiliary motor may be controlled according to the calculated P1 value. For example, the output torque and the rotational speed of the engine may be controlled according to the calculated P1 value, so as to control the power for the engine to drive the auxiliary motor to perform power generation.

Further, according to an embodiment of the present invention, the adjusting the power generation power of the auxiliary motor includes: obtaining an SOC value change rate of the power battery, and controlling the power generation power of the auxiliary motor according to a relationship between the entire vehicle requirement power P2 and a minimum output power Pmin corresponding to the optimal economical area of the engine, and the SOC value change rate of the power battery.

Specifically, the optimal economical area of the engine may be determined according to the engine universal characteristic curve shown in FIG. 7, and then the minimum output power Pmin corresponding to the optimal economical area of the engine is obtained. After the minimum output power Pmin corresponding to the optimal economical area of the engine is determined, the power generation power of the auxiliary motor 5 may be controlled according to the relationship between the entire vehicle requirement power P2 and the minimum output power Pmin corresponding to the optimal economical area of the engine, and the SOC value change rate of the power battery.

Therefore, when the hybrid power automobile is travelling at a low speed, the engine is enabled to operate in an economical area, thereby reducing fuel consumption, reducing noise of the engine, and improving economic performance of the entire vehicle. Moreover, at a low speed, the engine may perform only power generation but does not participate in drive, and because the engine does not participate in drive, the clutch does not need to be used, thereby reducing abrasion or slip friction of the clutch, reducing an unsmooth feeling, and improving comfortableness, so as to maintain low-speed electric balance and low-speed smoothness of the entire vehicle and improve performance of the entire vehicle.

A specific adjusting manner in which after the auxiliary motor enters the power generation power adjustment mode, the power generation power of the auxiliary motor is controlled according to the relationship between the entire vehicle requirement power P2 and the minimum output power Pmin corresponding to the optimal economical area of the engine, and the SOC value change rate of the power battery is further described below.

Specifically, when the engine drives the auxiliary motor to perform power generation and the power motor outputs a drive force to the wheels of the hybrid power automobile, the entire vehicle drive power P11 and the electric appliance device power P21 are obtained in real time, so as to obtain the entire vehicle requirement power P2 of the hybrid power automobile, and the entire vehicle requirement power P2 of the hybrid power automobile is determined, where the entire vehicle requirement power P2 may satisfy the following three cases.

In a first case, the entire vehicle requirement power P2 is less than the minimum output power Pmin corresponding to the optimal economical area of the engine; in a second case, the entire vehicle requirement power P2 is greater than or equal to the minimum output power Pmin corresponding to the optimal economical area of the engine and is less than or equal to the maximum allowed power generation power Pmax of the auxiliary motor; and in a third case, the entire vehicle requirement power P2 is greater than the maximum allowed power generation power Pmax of the auxiliary motor.

In an embodiment of the first case, when the entire vehicle requirement power P2 is less than the minimum output power Pmin corresponding to the optimal economical area of the engine, the charging power P3 of the power battery is obtained according to the SOC value change rate of the power battery, and whether the charging power P3 of the power battery is less than the difference between the minimum output power Pmin and the entire vehicle requirement power P2 is determined. If the charging power P3 of the power battery is less than the difference between the minimum output power Pmin and the entire vehicle requirement power P2, the engine is controlled to perform power generation at the minimum output power Pmin to control the power generation power of the auxiliary motor; or if the charging power P3 of the power battery is greater than or equal to the difference between the minimum output power Pmin and the entire vehicle requirement power P2, an output power of the engine in the preset optimal economical area is obtained according to a sum of the charging power P3 of the power battery and the entire vehicle requirement power P2, and the engine is controlled to perform power generation at the obtained output power to control the power generation power P1 of the auxiliary motor.

It should be noted that, a first relationship table between the SOC value change rate of the power battery and the charging power P3 of the power battery may be pre-stored. Therefore, after an SOC value change rate of the power battery is obtained, a corresponding charging power P3 of the power battery may be obtained by performing matching on the first relationship table. The SOC value change rate of the power battery and the charging power P3 of the power battery satisfy a relationship shown in Table 1.

TABLE 1

| SOC value change rate of the power battery 3 | A1 | A2 | A3 | A4 | A5 |
|---|---|---|---|---|---|
| Charging power P3 of the power battery 3 | B1 | B2 | B3 | B4 | B5 |

It is learned from Table 1 that, when an obtained SOC value change rate is A1, an obtained corresponding charging power P3 of the power battery is B1; when an obtained SOC value change rate is A2, an obtained corresponding charging power P3 of the power battery is B2; when an obtained SOC value change rate is A3, an obtained corresponding charging power P3 of the power battery is B3; when an obtained SOC value change rate is A4, an obtained corresponding charging power P3 of the power battery is B4; and when an obtained SOC value change rate is A5, an obtained corresponding charging power P3 of the power battery is B5.

Specifically, when performing power generation power control on the auxiliary motor, the entire vehicle drive power P11 and the electric appliance device power P21 are obtained in real time, so as to obtain the entire vehicle requirement power P2 of the hybrid power automobile, and the entire vehicle requirement power P2 of the hybrid power automobile is determined. When the entire vehicle requirement power P2 is less than the minimum output power Pmin corresponding to the optimal economical area of the engine, the charging power P3 of the power battery may be obtained according to the SOC value change rate of the power battery, and whether the charging power P3 of the power battery is less than or equal to the difference between the minimum output power Pmin and the entire vehicle requirement power P2 is determined.

When the entire vehicle requirement power P2 is less than the minimum output power Pmin corresponding to the optimal economical area of the engine 1, if the charging power P3 of the power battery is less than the difference between the minimum output power Pmin and the entire vehicle requirement power P2, that is, P3<Pmin−P2, the engine is controlled to perform power generation at the minimum output power Pmin to control the power generation power of the auxiliary motor 1. If the charging power P3 of the power battery is greater than or equal to the difference between the minimum output power Pmin and the entire vehicle requirement power P2, that is, P3≥Pmin−P2, the output power of the engine in the preset optimal economical area is obtained according to the sum of the charging power P3 of the power battery and the entire vehicle requirement power P2, and the engine is controlled to perform power generation at the obtained output power to control the power generation power of the auxiliary motor.

Therefore, when the entire vehicle requirement power P2 is less than the minimum output power Pmin corresponding to the optimal economical area of the engine, the power generation power of the engine is obtained according to the relationship between the charging power P3 of the power battery and the difference between the minimum output power Pmin corresponding to the optimal economical area of the engine and the entire vehicle requirement power P2, so that the engine runs in the preset optimal economical area, and the engine performs only power generation but does not participate in drive, thereby reducing fuel consumption of the engine, and reducing noise of the engine.

In an embodiment of the second case, when the entire vehicle requirement power P2 is greater than or equal to the minimum output power Pmin corresponding to the optimal economical area of the engine and is less than or equal to the maximum allowed power generation power Pmax of the auxiliary motor, the charging power P3 of the power battery is obtained according to the SOC value change rate of the power battery, an output power of the engine in the preset optimal economical area is obtained according to a sum of the charging power P3 of the power battery and the entire vehicle requirement power P2, and the engine is controlled to perform power generation at the obtained output power to control the power generation power P1 of the auxiliary motor.

Specifically, when the entire vehicle requirement power P2 is greater than or equal to the minimum output power Pmin corresponding to the optimal economical area of the engine and is less than the maximum allowed power generation power Pmax of the auxiliary motor, the charging power P3 of the power battery is further obtained according to the SOC value change rate of the power battery when the engine is controlled to operate in the preset optimal economical area, and the output power of the engine in the preset optimal economical area is obtained according to the sum of the charging power P3 of the power battery and the entire vehicle requirement power P2, where the obtained output power is equal to P3+P2. Then, the engine is controlled to perform power generation at the obtained output power to control the power generation power P1 of the auxiliary motor, thereby increasing the SOC value of the power battery, and enabling the engine to operate in the preset optimal economical area.

Therefore, when the entire vehicle requirement power P2 is greater than or equal to the minimum output power Pmin corresponding to the optimal economical area of the engine 1 and is less than the maximum allowed power generation power Pmax of the auxiliary motor 5, the output power of the engine 1 is obtained according to the sum of the charging power P3 of the power battery 3 and the entire vehicle requirement power P2, so that the engine 1 runs in the preset optimal economical area, and the engine 1 performs only power generation but does not participate in drive, thereby reducing fuel consumption of the engine, and reducing noise of the engine.

In an embodiment of the third case, when the entire vehicle requirement power P2 is greater than the maximum allowed power generation power Pmax of the auxiliary motor, the engine is further controlled to participate in drive to enable the engine to output power to wheels through the clutch.

Specifically, when the entire vehicle requirement power P2 is greater than the maximum allowed power generation power Pmax of the auxiliary motor, that is, the entire vehicle requirement power P2 of the hybrid power automobile is greater than the power generation power P1 of the auxiliary motor, the engine is further controlled to output a drive force to the wheels through the clutch to enable the engine to participate in drive. Therefore, the engine undertakes a part of a drive power P, so as to reduce a requirement of the auxiliary motor on the power generation power P1, so that the engine operates in the preset optimal economical area.

Therefore, when the entire vehicle requirement power P2 is greater than the maximum allowed power generation power Pmax of the auxiliary motor, the power battery discharges outward to supply power to the power motor. In this case, the power motor is controlled to output power to the wheels of the hybrid power automobile, so that the engine operates in the preset optimal economical area.

Therefore, at a low speed, the engine can operate in an economical area, and perform only power generation but does not participate in drive, and therefore the clutch is not used, thereby reducing abrasion or slip friction of the clutch, reducing an unsmooth feeling, improving comfortableness, reducing fuel consumption, and reducing noise of the engine, so as to maintain low-speed electric balance and low-speed smoothness of the entire vehicle and improve performance of the entire vehicle.

Figure 19:
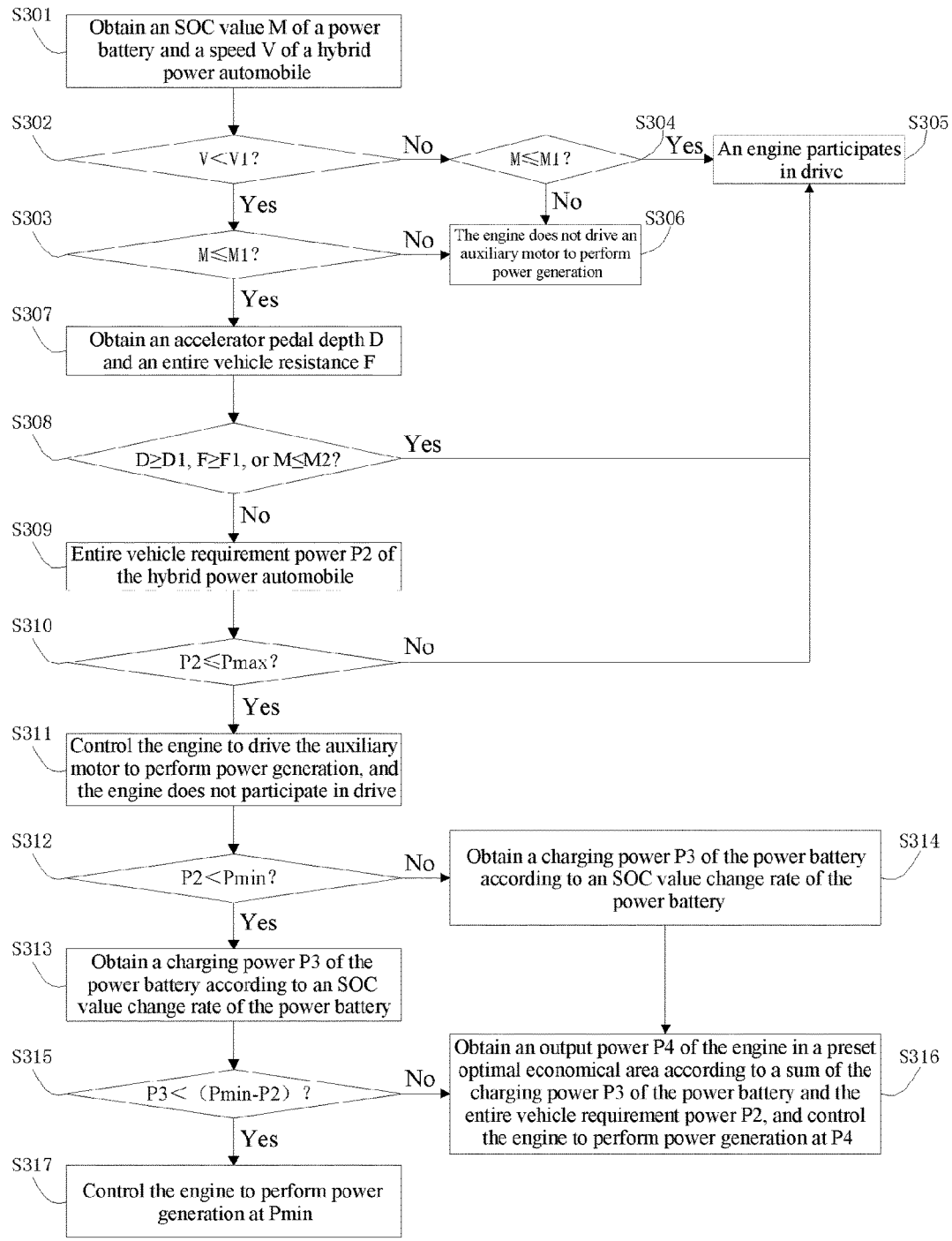
FIG. 19 is a flowchart of a power generation control method for a power system of a hybrid power automobile according to still another specific embodiment of the present invention.

As described above, as shown in FIG. 19, a power generation control method for a hybrid power automobile of an embodiment of the present invention specifically includes the following steps:

S301: Obtain an SOC value M of a power battery and a speed V of the hybrid power automobile.

S302: Determine whether the speed V of the hybrid power automobile is less than a first preset speed V1.

If yes, step S303 is performed; or if not, step S304 is performed.

S303: Determine whether the SOC value M of the power battery is less than or equal to a first preset value M1.

If yes, step S307 is performed; or if not, step S306 is performed.

S304: Determine whether the SOC value M of the power battery is less than or equal to a first preset value M1.

If yes, step S305 is performed; or if not, step S306 is performed.

S305: Control an engine to participate in drive.

S306: Control the engine not to drive an auxiliary motor to perform power generation.

S307: Obtain an accelerator pedal depth D of the hybrid power automobile and an entire vehicle resistance F of the hybrid power automobile.

S308: Determine whether the accelerator pedal depth D is greater than a first preset depth D1, whether the entire vehicle resistance F of the hybrid power automobile is greater than a first preset resistance F1, or whether the SOC value M of the power battery is less than a preset limit value M2.

If yes, step S305 is performed; or if not, step S309 is performed.

S309: Obtain an entire vehicle requirement power P2 of the hybrid power automobile.

S310: Determine whether the entire vehicle requirement power P2 is less than or equal to a maximum allowed power generation power Pmax of the auxiliary motor.

If yes, step S311 is performed; or if not, step S305 is performed.

S311: Control the engine to drive the auxiliary motor to perform power generation, and the engine not to participate in drive.

S312: Determine whether the entire vehicle requirement power P2 is less than a minimum output power Pmin corresponding to an optimal economical area of the engine.

If yes, step S313 is performed; or if not, step S314 is performed.

S313: Obtain a charging power P3 of the power battery according to an SOC value change rate of the power battery, and perform step S315.

S314: Obtain a charging power P3 of the power battery according to an SOC value change rate of the power battery, and perform step S316.

S315: Determine whether the charging power P3 of the power battery is less than a difference between the minimum output power Pmin and the entire vehicle requirement power P2.

If yes, step S317 is performed; or if not, step S316 is performed.

S316: Obtain an output power of the engine in the preset optimal economical area according to a sum of the charging power P3 of the power battery and the entire vehicle requirement power P2, and control the engine to perform power generation at the obtained output power.

S317: Control the engine to perform power generation at the minimum output power Pmin.

To sum up, according to the power generation control method for a hybrid power automobile of this embodiment of the present invention, the SOC value of the power battery and the speed of the hybrid power automobile are first obtained, and the auxiliary motor is controlled according to the SOC value of the power battery and the speed of the hybrid power automobile to enter the power generation power adjustment mode, so that the engine runs in the preset optimal economical area, thereby reducing fuel consumption of the engine, improving running economy of the entire vehicle, reducing noise of the engine, implementing a plurality of drive modes, maintaining low-speed electric balance and low-speed smoothness of the entire vehicle, and improving performance of the entire vehicle.

Based on the hybrid power automobile and the power system thereof of the foregoing embodiments, an embodiment of the present invention further proposes yet another power generation control method for a hybrid power automobile.

Figure 20:
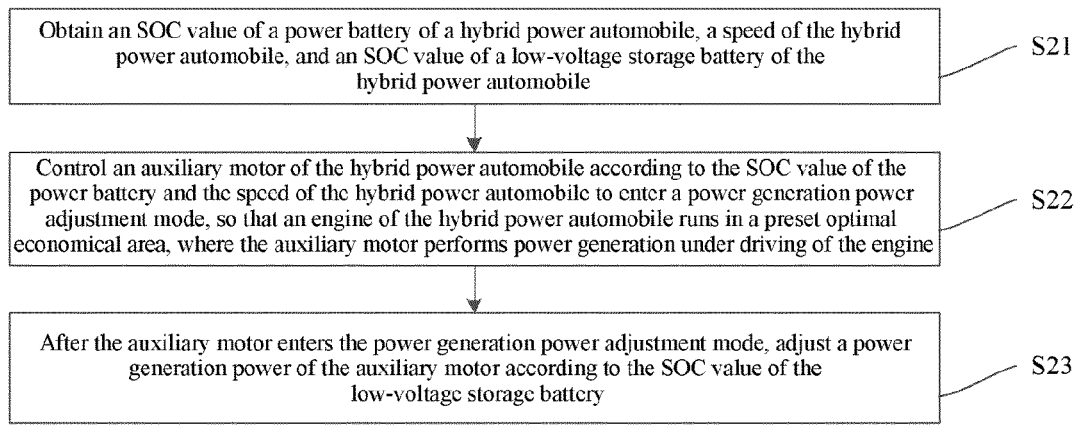
FIG. 20 is a flowchart of a power generation control method for a power system of a hybrid power automobile according to yet another embodiment of the present invention.

FIG. 20 is a flowchart of a power generation control method for a power system of a hybrid power automobile according to an embodiment of the present invention. As shown in FIG. 20, the power generation control method for a hybrid power automobile includes the following steps:

S21: Obtain an SOC value of a power battery of the hybrid power automobile, a speed of the hybrid power automobile, and an SOC value of a low-voltage storage battery of the hybrid power automobile.

It should be noted that, the SOC value of the power battery and the SOC value of the low-voltage storage battery may be collected through a battery management system of the hybrid power automobile, so as to obtain the SOC value of the power battery and the SOC value of the low-voltage storage battery.

S22: Control an auxiliary motor of the hybrid power automobile according to the SOC value of the power battery and the speed of the hybrid power automobile to enter a power generation power adjustment mode, so that an engine of the hybrid power automobile runs in a preset optimal economical area, where the auxiliary motor performs power generation under driving of the engine.

The power generation power adjustment mode is a mode of adjusting a power generation power of the engine, and in the power generation power adjustment mode, the power generation power of the auxiliary motor may be adjusted by controlling the engine to drive the auxiliary motor to perform power generation.

It should be further noted that, the preset optimal economical area of the engine may be determined with reference to a diagram of an engine universal characteristic curve. FIG. 7 shows an example of the diagram of the engine universal characteristic curve, where a vertical coordinate indicates an output torque of the engine, a horizontal coordinate indicates a rotational speed of the engine, and a curve a is a fuel economy curve of the engine. An area corresponding to the fuel economy curve is the optimal economical area of the engine. To be specific, when a torsional moment and a torque of the engine are located on an optimal fuel economy curve of the engine, the engine is located in the optimal economical area. Therefore, in this embodiment of the present invention, the engine may be enabled, by controlling the rotational speed and the output torque of the engine to fall on the fuel economy curve of the engine, for example, the curve a, to run in the preset optimal economical area.

S23: Adjust the power generation power of the auxiliary motor according to the SOC value of the low-voltage storage battery after the auxiliary motor enters the power generation power adjustment mode.

Specifically, when the hybrid power automobile is travelling, the engine may output power to wheels of the hybrid power automobile through a clutch, and the engine may further drive the auxiliary motor to perform power generation. Therefore, the output power of the engine mainly includes two parts, one part is output to the auxiliary motor, that is, the power for driving the auxiliary motor to perform power generation, and the other part is output to the wheels, that is, the power for driving the wheels.

When the engine drives the auxiliary motor to perform power generation, the SOC value of the power battery and the speed of the hybrid power automobile may be first obtained, and then the auxiliary motor is controlled according to the SOC value of the power battery and the speed of the hybrid power automobile to enter the power generation power adjustment mode, so that the engine operates in the preset optimal economical area. In the power generation power adjustment mode, the power generation power of the auxiliary motor may be adjusted on the premise of enabling the engine to operate in the preset optimal economical area. After the auxiliary motor enters the power generation power adjustment mode, the power generation power of the auxiliary motor is further adjusted according to the SOC value of the low-voltage storage battery.

Therefore, the engine is enabled to operate in the preset optimal economical area, and because the engine has lowest fuel consumption and highest fuel economy in the preset optimal economical area, fuel consumption of the engine may be reduced, noise of the engine may be reduced, and running economy of the entire vehicle may be improved. Moreover, because the auxiliary motor has relatively high power generation power and power generation efficiency at a low speed, power consumption requirements of low-speed travelling may be satisfied, and low-speed electric balance of the entire vehicle and low-speed smoothness of the entire vehicle may be maintained, to improve power performance of the entire vehicle. By charging the power battery, power consumption requirements of the power motor and the high-voltage electric appliance device may be ensured, and further it is ensured that the power motor drives the entire vehicle to normally travel; and by charging the low-voltage storage battery, power consumption requirements of the low-voltage electric appliance device may be ensured, and when the auxiliary motor stops power generation and the power battery is faulty or has an insufficient power level, low-voltage power supply of the entire vehicle may be implemented through the low-voltage storage battery, and further it is ensured that the entire vehicle may travel in the pure fuel mode, thereby improving travelling mileage of the entire vehicle.

Further, according to an embodiment of the present invention, when the SOC value of the power battery is greater than a preset limit value and is less than or equal to a first preset value, if the speed of the hybrid power automobile is less than a first preset speed, the auxiliary motor is controlled to enter the power generation power adjustment mode.

The first preset value may be a preset upper limit value of the SOC value of the power battery, for example, a value of determining to stop charging, and may be preferably 30%. The preset limit value may be a preset lower limit value of the SOC value of the power battery, for example, a value of determining to stop discharging, and may be preferably 10%. SOC values of the power battery may be divided into three ranges according to the first preset value and the preset limit value, that is, a first power level range, a second power level range, and a third power level range. When the SOC value of the power battery is less than or equal to the preset limit value, the SOC value of the power battery falls within the first power level range. In this case, the power battery performs only charging but does not perform discharging. When the SOC value of the power battery is greater than the preset limit value and is less than or equal to the first preset value, the SOC value of the power battery falls within the second power level range. In this case, the power battery has a charging requirement, that is, the power battery may be actively charged. When the SOC value of the power battery is greater than the first preset value, the SOC value of the power battery falls within the third power level range. In this case, the power battery may be not charged, that is, the power battery is not actively charged.

Specifically, after the SOC value of the power battery and the speed of the hybrid power automobile are obtained, a range within which the SOC value of the power battery falls may be determined. If the SOC value of the power battery falls within the second power level range, and the SOC value of the power battery is greater than the preset limit value and is less than or equal to the first preset value, it indicates that the power battery may be charged. In this case, whether the speed of the hybrid power automobile is less than the first preset speed is further determined. If the speed of the hybrid power automobile is less than the first preset speed, the auxiliary motor is controlled to enter the power generation power adjustment mode. In this case, the speed of the hybrid power automobile is relatively low, a needed drive force is relatively small, the power motor is sufficient to drive the hybrid power automobile to travel, and the engine may drive only the auxiliary motor to perform power generation, but does not participate in drive.

Therefore, at a low speed, the engine performs only power generation but does not participate in drive, and because the engine does not participate in drive, the clutch does not need to be used, thereby reducing abrasion or slip friction of the clutch, reducing an unsmooth feeling, and improving comfortableness.

Further, when the SOC value of the power battery is greater than the preset limit value and is less than or equal to the first preset value, and the speed of the hybrid power automobile is less than the first preset speed, an entire vehicle requirement power of the hybrid power automobile is further obtained; and when the entire vehicle requirement power is less than or equal to a maximum allowed power generation power of the auxiliary motor, the auxiliary motor is controlled to enter the power generation power adjustment mode.

To be specific, after it is determined that the SOC value of the power battery is greater than the preset limit value and is less than or equal to the first preset value, and the speed of the hybrid power automobile is less than the first preset speed, whether the entire vehicle requirement power is greater than the maximum allowed power generation power of the auxiliary motor may be further determine. If the entire vehicle requirement power is less than or equal to the maximum allowed power generation power of the auxiliary motor, the auxiliary motor is controlled to enter the power generation power adjustment mode. In this case, a drive force needed by the entire vehicle is relatively small, the entire vehicle requirement power is relatively small, the power motor is sufficient to drive the hybrid power automobile to travel, and the engine may drive only the auxiliary motor to perform power generation, but does not participate in drive.

Therefore, at a low speed, the engine performs only power generation but does not participate in drive, and because the engine does not participate in drive, the clutch does not need to be used, thereby reducing abrasion or slip friction of the clutch, reducing an unsmooth feeling, and improving comfortableness.

Furthermore, when the SOC value of the power battery is greater than the preset limit value and is less than or equal to the first preset value, the speed of the hybrid power automobile is less than the first preset speed, and the entire vehicle requirement power is less than or equal to the maximum allowed power generation power of the auxiliary motor, an accelerator pedal depth of the hybrid power automobile and an entire vehicle resistance of the hybrid power automobile are further obtained; and when the accelerator pedal depth is less than or equal to a first preset depth and the entire vehicle resistance of the hybrid power automobile is less than or equal to a first preset resistance, the auxiliary motor is controlled to enter the power generation power adjustment mode.

It should be noted that, the entire vehicle resistance of the hybrid power automobile may be travelling resistances of the hybrid power automobile, for example, a rolling resistance, an accelerating resistance, a grade resistance, and an air resistance.

To be specific, after it is determined that the SOC value of the power battery is greater than the preset limit value and is less than or equal to the first preset value, the speed of the hybrid power automobile is less than the first preset speed, and the entire vehicle requirement power is less than or equal to the maximum allowed power generation power of the auxiliary motor, whether the accelerator pedal depth is greater than the first preset depth and whether the entire vehicle resistance of the hybrid power automobile is greater than the first preset resistance may be further determined. If the accelerator pedal depth is less than or equal to the first preset depth and the entire vehicle resistance of the hybrid power automobile is less than or equal to the first preset resistance, the auxiliary motor is controlled to enter the power generation power adjustment mode. In this case, a drive force needed by the entire vehicle is relatively small, the entire vehicle requirement power is relatively small, the accelerator pedal depth is relatively small, the entire vehicle resistance is also relatively small, the power motor is sufficient to drive the hybrid power automobile to travel, and the engine may drive only the auxiliary motor to perform power generation, but does not participate in drive.

Therefore, at a low speed, the engine performs only power generation but does not participate in drive, and because the engine does not participate in drive, the clutch does not need to be used, thereby reducing abrasion or slip friction of the clutch, reducing an unsmooth feeling, and improving comfortableness.

As described above, when the hybrid power automobile is travelling at a low speed, the engine may perform only power generation but does not participate in drive, and because the engine does not participate in drive, the clutch does not need to be used, thereby reducing abrasion or slip friction of the clutch, reducing an unsmooth feeling, and improving comfortableness. Moreover, the low speed enables the engine to operate in an economical area, and because the engine has lowest fuel consumption and highest fuel economy in the preset optimal economical area, thereby reducing fuel consumption, reducing noise of the engine, and improving running economy of the entire vehicle, so as to maintain low-speed electric balance and low-speed smoothness of the entire vehicle and improve performance of the entire vehicle.

Additionally, according to an embodiment of the present invention, when the SOC value of the power battery is less than the preset limit value, the speed of the hybrid power automobile is greater than or equal to the first preset speed, the entire vehicle requirement power is greater than the maximum allowed power generation power of the auxiliary motor, the accelerator pedal depth is greater than the first preset depth, or the entire vehicle resistance of the hybrid power automobile is greater than the first preset resistance, the engine is controlled to participate in drive.

To be specific, when the SOC value of the power battery is less than the preset limit value, the speed of the hybrid power automobile is greater than or equal to the first preset speed, the entire vehicle requirement power is greater than the maximum allowed power generation power of the auxiliary motor, the accelerator pedal depth is greater than the first preset depth, or the entire vehicle resistance of the hybrid power automobile is greater than the first preset resistance, a control module controls the engine to participate in drive. In this case, the power battery does not perform discharging again, the entire vehicle needs a relatively large drive force, the entire vehicle requirement power is relatively large, the accelerator pedal depth is relatively large or the entire vehicle resistance is also relatively large, the power motor is insufficient to drive the hybrid power automobile to travel, and the engine participates in drive to perform supplemental drive.

Therefore, the engine may participate in drive when the drive force output by the power motor is insufficient, thereby ensuring normal travelling of the entire vehicle, improving power performance of the entire vehicle, and improving travelling mileage of the entire vehicle.

More specifically, when the entire vehicle requirement power is greater than the maximum allowed power generation power of the auxiliary motor, the engine is further controlled to participate in drive to enable the engine to output power to wheels of the hybrid power automobile through the clutch.

Moreover, when the SOC value of the power battery is less than or equal to the preset limit value, the engine is further controlled to participate in drive to enable the engine to output power to wheels of the hybrid power automobile through the clutch; when the SOC value of the power battery is less than or equal to the first preset value, the speed of the hybrid power automobile is less than the first preset speed and the accelerator pedal depth is greater than the first preset depth, the engine is further controlled to participate in drive to enable the engine to output power to the wheels through the clutch; and when the SOC value of the power battery is less than or equal to the first preset value, the speed of the hybrid power automobile is less than the first preset speed and the entire vehicle resistance of the hybrid power automobile is greater than the first preset resistance, the engine is further controlled to participate in drive to enable the engine to output power to the wheels through the clutch.

To be specific, the SOC value of the power battery, the accelerator pedal depth of the hybrid power automobile, the speed, the entire vehicle resistance and the entire vehicle requirement power may be obtained in real time, and the SOC value of the power battery, the accelerator pedal depth of the hybrid power automobile, the speed and the entire vehicle resistance are determined:

First, when the SOC value of the power battery is less than the preset limit value, because the power level of the power battery is excessively low, the power battery cannot provide sufficient electric energy, the engine and the power motor are controlled to simultaneously participate in drive, and the engine may be further controlled to drive the auxiliary motor to perform power generation to charge the power battery. In this case, the engine may be further controlled to drive the auxiliary motor to perform power generation, and by adjusting the power generation power of the auxiliary motor, the engine is enabled to operate in the preset optimal economical area.

Second, when the SOC value of the power battery is less than or equal to the first preset value, the speed of the hybrid power automobile is less than the first preset speed and the accelerator pedal depth is greater than the first preset depth, because the accelerator pedal depth is relatively large, the control module controls the engine and the power motor to simultaneously participate in drive. In this case, the engine may be further controlled to drive the auxiliary motor to perform power generation, and by adjusting the power generation power of the auxiliary motor, the engine is enabled to operate in the preset optimal economical area.

Third, when the SOC value of the power battery is less than or equal to the first preset value, the speed of the hybrid power automobile is less than the first preset speed and the entire vehicle resistance of the hybrid power automobile is greater than the first preset resistance, because the entire vehicle resistance is relatively large, the engine and the power motor may be controlled to simultaneously participate in drive. In this case, the engine may be further controlled to drive the auxiliary motor to perform power generation, and by adjusting the power generation power of the auxiliary motor, the engine is enabled to operate in the preset optimal economical area.

Therefore, the engine may participate in drive when the drive force output by the power motor is insufficient, thereby ensuring normal travelling of the entire vehicle, improving power performance of the entire vehicle, and improving travelling mileage of the entire vehicle. Moreover, the engine may be controlled to operate in an economical area, and because the engine 1 has lowest fuel consumption and highest fuel economy in the preset optimal economical area, fuel consumption may be reduced, noise of the engine may be reduced, and economic performance of the entire vehicle may be improved.

Moreover, the control module is further configured to: when the SOC value of the power battery is less than or equal to the preset limit value, and the speed of the hybrid power automobile is greater than the first preset speed, control the engine to participate in drive to enable the engine to output power to the wheels through the clutch.

Therefore, the engine may participate in drive when the drive force output by the power motor is insufficient, thereby ensuring normal travelling of the entire vehicle, improving power performance of the entire vehicle, and improving travelling mileage of the entire vehicle.

Certainly, it should be understood that, the control module is further configured to: when the SOC value of the power battery is greater than the first preset value, control the engine not to drive the auxiliary motor to perform power generation. In this case, the power battery has an approximately full power level, and does not need to be charged, and the engine does not drive the auxiliary motor to perform power generation. To be specific, when the power battery has an approximately full power level, the engine does not drive the auxiliary motor to perform power generation, and therefore the auxiliary motor does not charge the power battery.

Further, after the auxiliary motor enters the power generation power adjustment mode, the power generation power of the auxiliary motor may be adjusted. A process of adjusting the power generation power of this embodiment of the present invention is specifically described below.

According to an embodiment of the present invention, after the auxiliary motor enters the power generation power adjustment mode, the power generation power of the auxiliary motor is adjusted according to the entire vehicle requirement power of the hybrid power automobile, the charging power of the power battery, the charging power of the low-voltage storage battery, and the SOC value of the low-voltage storage battery.

Specifically, a formula of adjusting the power generation power of the auxiliary motor according to the entire vehicle requirement power of the hybrid power automobile, the charging power of the power battery and the charging power of the low-voltage storage battery is as follows:

$$P1=P2+P3+P4, \text{ where } P2=P11+P21.$$

P1 is the power generation power of the auxiliary motor, P2 is the entire vehicle requirement power, P3 is the charging power of the power battery, P4 is the charging power of the low-voltage storage battery, P11 is an entire vehicle drive power, and P21 is an electric appliance device power.

It should be noted that, electric appliance devices include a first electric appliance device and a second electric appliance device, that is, the electric appliance device power P21 may include power needed by the high-voltage electric appliance device and the low-voltage electric appliance device.

It should be further noted that, the entire vehicle drive power P11 may include the output power of the power motor, and the entire vehicle drive power P11 may be obtained according to a preset accelerator-torsional moment curve of the power motor and a rotational speed of the power motor, where the preset accelerator-torsional moment curve may be determined during power matching of the hybrid power automobile. The electric appliance device power P21 may be obtained in real time according to electric appliance devices running on the entire vehicle, for example, the electric appliance device power P21 is calculated through DC consumption on a bus. The charging power P3 of the power battery may be obtained according to the SOC value of the power battery, and the charging power P4 of the low-voltage storage battery is obtained according to the SOC value of the low-voltage storage battery.

Specifically, when the hybrid power automobile is travelling, the charging power P3 of the power battery, the charging power P4 of the low-voltage storage battery, the entire vehicle drive power P11 and the electric appliance device power P21 may be obtained, and a sum of the charging power P3 of the power battery, the charging power P4 of the low-voltage storage battery, the entire vehicle drive power P11 and the electric appliance device power P21 is used as the power generation power P1 of the auxiliary motor. Therefore, the power generation power of the auxiliary motor may be adjusted according to the calculated P1 value. For example, the output torque and the rotational speed of the engine may be controlled according to the calculated P1 value, so as to adjust the power for the engine to drive the auxiliary motor to perform power generation.

Further, according to an embodiment of the present invention, the adjusting the power generation power of the auxiliary motor includes: obtaining an SOC value change rate of the power battery, and adjusting the power generation power of the auxiliary motor according to a relationship between the entire vehicle requirement power P2 and a minimum output power corresponding to the optimal economical area of the engine, the SOC value change rate of the power battery, the SOC value of the low-voltage storage battery, and the SOC value change rate of the low-voltage storage battery.

It should be understood that, the SOC value change rate of the power battery may be obtained according to the SOC value of the power battery, for example, the SOC value of the power battery is collected once at each time interval t. In this way, a ratio of a difference between a current SOC value and a former SOC value of the power battery to the time interval t may be used as the SOC value change rate of the power battery. Similarly, the SOC value change rate of the low-voltage storage battery may be obtained according to the SOC value of the low-voltage storage battery, for example, the SOC value of the low-voltage storage battery is collected once at each time interval t. In this way, a ratio of a difference between a current SOC value and a former SOC value of the low-voltage storage battery to the time interval t may be used as the SOC value change rate of the low-voltage storage battery.

Specifically, the optimal economical area of the engine may be determined according to the engine universal characteristic curve shown in FIG. 7, and then the minimum output power corresponding to the optimal economical area of the engine is obtained. After the minimum output power corresponding to the optimal economical area of the engine is determined, the power generation power of the auxiliary motor may be adjusted according to the relationship between the entire vehicle requirement power P2 and the minimum output power Pmin corresponding to the optimal economical area of the engine, the SOC value change rate of the power battery, the SOC value of the low-voltage storage battery, and the SOC value change rate of the low-voltage storage battery.

Therefore, when the hybrid power automobile is travelling at a low speed, the engine is enabled to operate in an economical area, thereby reducing fuel consumption, reducing noise of the engine, and improving economic performance of the entire vehicle. Moreover, at a low speed, the engine may perform only power generation but does not participate in drive, and because the engine does not participate in drive, the clutch does not need to be used, thereby reducing abrasion or slip friction of the clutch, reducing an unsmooth feeling, and improving comfortableness, so as to maintain low-speed electric balance and low-speed smoothness of the entire vehicle and improve performance of the entire vehicle.

A specific control manner in which after the auxiliary motor 5 enters the power generation power adjustment mode, the power generation power of the auxiliary motor is adjusted according to the relationship between the entire vehicle requirement power P2 and the minimum output power Pmin corresponding to the optimal economical area of the engine, the SOC value change rate of the power battery, the SOC value of the low-voltage storage battery, and the SOC value change rate of the low-voltage storage battery is further described below.

Specifically, when the SOC value of the low-voltage storage battery is greater than a preset low power level threshold, the charging power of the power battery is obtained according to the SOC value change rate of the power battery, and whether the charging power of the power battery is less than the difference between the minimum output power corresponding to the optimal economical area of the engine and the entire vehicle requirement power is determined. If the charging power of the power battery is less than the difference between the minimum output power corresponding to the optimal economical area of the engine and the entire vehicle requirement power, the engine is controlled to perform power generation at the minimum output power to adjust the power generation power of the auxiliary motor; or if the charging power of the power battery is greater than or equal to the difference between the minimum output power corresponding to the optimal economical area of the engine and the entire vehicle requirement power, the output power of the engine in the preset optimal economical area is obtained according to the sum of the charging power of the power battery and the entire vehicle requirement power, and the engine is controlled to perform power generation at the obtained output power to adjust the power generation power of the auxiliary motor.

Specifically, when the SOC value of the low-voltage storage battery is less than or equal to the preset low power level threshold, the SOC value change rate of the low-voltage storage battery and the SOC value change rate of the power battery are obtained, the charging power of the low-voltage storage battery is obtained according to the SOC value change rate of the low-voltage storage battery, the charging power of the power battery is obtained according to the SOC value change rate of the power battery, and whether the sum of the charging power of the low-voltage storage battery and the charging power of the power battery is less than the difference between the minimum output power Pmin corresponding to the optimal economical area of the engine and the entire vehicle requirement power is determined. If the sum of the charging power of the low-voltage storage battery and the charging power of the power battery is less than the difference between the minimum output power corresponding to the optimal economical area of the engine and the entire vehicle requirement power, the engine is controlled to perform power generation at the minimum output power to adjust the power generation power of the auxiliary motor; or if the sum of the charging power of the low-voltage storage battery and the charging power of the power battery is greater than or equal to the difference between the minimum output power corresponding to the optimal economical area of the engine and the entire vehicle requirement power, the output power of the engine in the preset optimal economical area is obtained according to the sum of the charging power of the power battery, the charging power of the low-voltage storage battery and the entire vehicle requirement power, and the engine is controlled to perform power generation at the obtained output power to adjust the power generation power of the auxiliary motor.

It should be noted that, a first relationship table between the SOC value change rate of the power battery and the charging power P3 of the power battery may be pre-stored in the control module. Therefore, after an SOC value change rate of the power battery is obtained, a corresponding charging power P3 of the power battery may be obtained by performing matching on the first relationship table. For example, a first relationship table between the SOC value change rate of the power battery and the charging power P3 of the power battery may be shown in Table 1.

TABLE 1

| SOC value change rate of the power battery | A1 | A2 | A3 | A4 | A5 |
|---|---|---|---|---|---|
| Charging power of the power battery | B1 | B2 | B3 | B4 | B5 |

It can be learned from Table 1 that, when an SOC value change rate of the power battery is A1, a corresponding charging power P3 of the power battery that may be obtained is B1; when an SOC value change rate of the power battery is A2, a corresponding charging power P3 of the power battery that may be obtained is B2; when an SOC value change rate of the power battery is A3, a corresponding charging power P3 of the power battery that may be obtained is B3; when an SOC value change rate of the power battery is A4, a corresponding charging power P3 of the power battery that may be obtained is B4; and when an SOC value change rate of the power battery is A5, a corresponding charging power P3 of the power battery that may be obtained is B5.

Similarly, a second relationship table between the SOC value change rate of the low-voltage storage battery and the charging power P4 of the low-voltage storage battery may be pre-stored in the control module. Therefore, after an SOC value change rate of the low-voltage storage battery is obtained, a corresponding charging power P4 of the low-voltage storage battery may be obtained by performing matching on the second relationship table. For example, a first relationship table between the SOC value change rate of the low-voltage storage battery and the charging power P4 of the low-voltage storage battery may be shown in Table 2.

TABLE 2

| SOC value change rate of the low-voltage storage battery | A11 | A12 | A13 | A14 | A15 |
|---|---|---|---|---|---|
| Charging power of the low-voltage storage battery | B11 | B12 | B13 | B14 | B15 |

It can be learned from Table 2 that, when an SOC value change rate of the low-voltage storage battery is A11, a corresponding charging power P4 of the low-voltage storage battery that may be obtained is B11; when an SOC value change rate of the low-voltage storage battery is A12, a corresponding charging power P4 of the low-voltage storage battery that may be obtained is B12; when an SOC value change rate of the low-voltage storage battery is A13, a corresponding charging power P4 of the low-voltage storage battery that may be obtained is B13; when an SOC value change rate of the low-voltage storage battery is A14, a corresponding charging power P4 of the low-voltage storage battery that may be obtained is B14; and when an SOC value change rate of the low-voltage storage battery is A15, a corresponding charging power P4 of the low-voltage storage battery that may be obtained is B15.

Specifically, after the auxiliary motor 5 enters the power generation power adjustment mode, the SOC value of the low-voltage storage battery, the SOC value of the power battery, and the entire vehicle requirement power P2 (the sum of the entire vehicle drive power P11 and the electric appliance device power P21) may be obtained, and then whether the SOC value of the low-voltage storage battery is greater than the preset low power level threshold is determined.

If the SOC value of the low-voltage storage battery is greater than the preset low power level threshold, the SOC value change rate of the power battery is obtained, and the charging power P3 of the power battery corresponding to the SOC value change rate of the power battery is queried for, so as to select an appropriate charging power P3 to enable the SOC value of the power battery to increase; and whether the charging power P3 of the power battery is less than the difference between the minimum output power Pmin corresponding to the optimal economical area of the engine and the entire vehicle requirement power P2 is further determined. If yes, that is, P3<Pmin−P2, the engine is controlled to perform power generation at the minimum output power Pmin to adjust the power generation power of the auxiliary motor, that is, the engine is controlled to run at the minimum output power Pmin corresponding to the optimal economical area, and to charge the power battery at a power equal to the minimum output power Pmin corresponding to the optimal economical area minus the entire vehicle requirement power P2, that is, Pmin−P2; or if not, that is, P3≥Pmin−P2, the output power of the engine in the preset optimal economical area is obtained according to the sum of the charging power P3 of the power battery and the entire vehicle requirement power P2, and the engine is controlled to perform power generation at the obtained output power to adjust the power generation power of the auxiliary motor. To be specific, a corresponding output power is searched for in the preset optimal economical area of the engine, where the obtained output power may be the sum of the charging power P3 of the power battery and the entire vehicle requirement power P2, that is, (P2+P3 or P11+P21+P3), and the engine is controlled to perform power generation at the obtained output power.

If the SOC value of the low-voltage storage battery is less than or equal to the preset low power level threshold, the SOC value change rate of the power battery is obtained, and the charging power P3 of the power battery corresponding to the SOC value change rate of the power battery is queried for, so as to select an appropriate charging power P3 to enable the SOC value of the power battery to increase; the SOC value change rate of the low-voltage storage battery is obtained, and the charging power P4 of the low-voltage storage battery corresponding to the SOC value change rate of the low-voltage storage battery is queried for, to select an appropriate charging power P4 to enable the SOC value of the low-voltage storage battery to increase; and whether the sum of the charging power P4 of the low-voltage storage battery and the charging power P3 of the power battery is less than the difference between the minimum output power Pmin corresponding to the optimal economical area of the engine and the entire vehicle requirement power P2 is further determined. If yes, that is, P3+P4<Pmin−P2, the engine is controlled to perform power generation at the minimum output power Pmin to adjust the power generation power of the auxiliary motor, that is, the engine is controlled to run at the minimum output power Pmin corresponding to the optimal economical area, and to charge the power battery and the low-voltage storage battery at a power equal to the minimum output power Pmin corresponding to the optimal economical area minus the entire vehicle requirement power P2, that is, Pmin−P2; or if not, that is, P3+P4≥Pmin−P2, the output power of the engine in the preset optimal economical area is obtained according to the sum of the charging power P3 of the power battery, the charging power P4 of the low-voltage storage battery and the entire vehicle requirement power P2, and the engine is controlled to perform power generation at the obtained output power to adjust the power generation power of the auxiliary motor. To be specific, a corresponding output power is searched for in the preset optimal economical area of the engine, where the obtained output power may be the sum of the charging power P3 of the power battery, the charging power P4 of the low-voltage storage battery and the entire vehicle requirement power P2, that is, (P2+P3+P4 or P11+P21+P3+P4), and the engine is controlled to perform power generation at the obtained output power.

Therefore, at a low speed, the engine can operate in an economical area, and perform only power generation but does not participate in drive, and therefore the clutch is not used, thereby reducing abrasion or slip friction of the clutch, reducing an unsmooth feeling, improving comfortableness, reducing fuel consumption, and reducing noise of the engine, so as to maintain low-speed electric balance and low-speed smoothness of the entire vehicle and improve performance of the entire vehicle.

Figure 21:
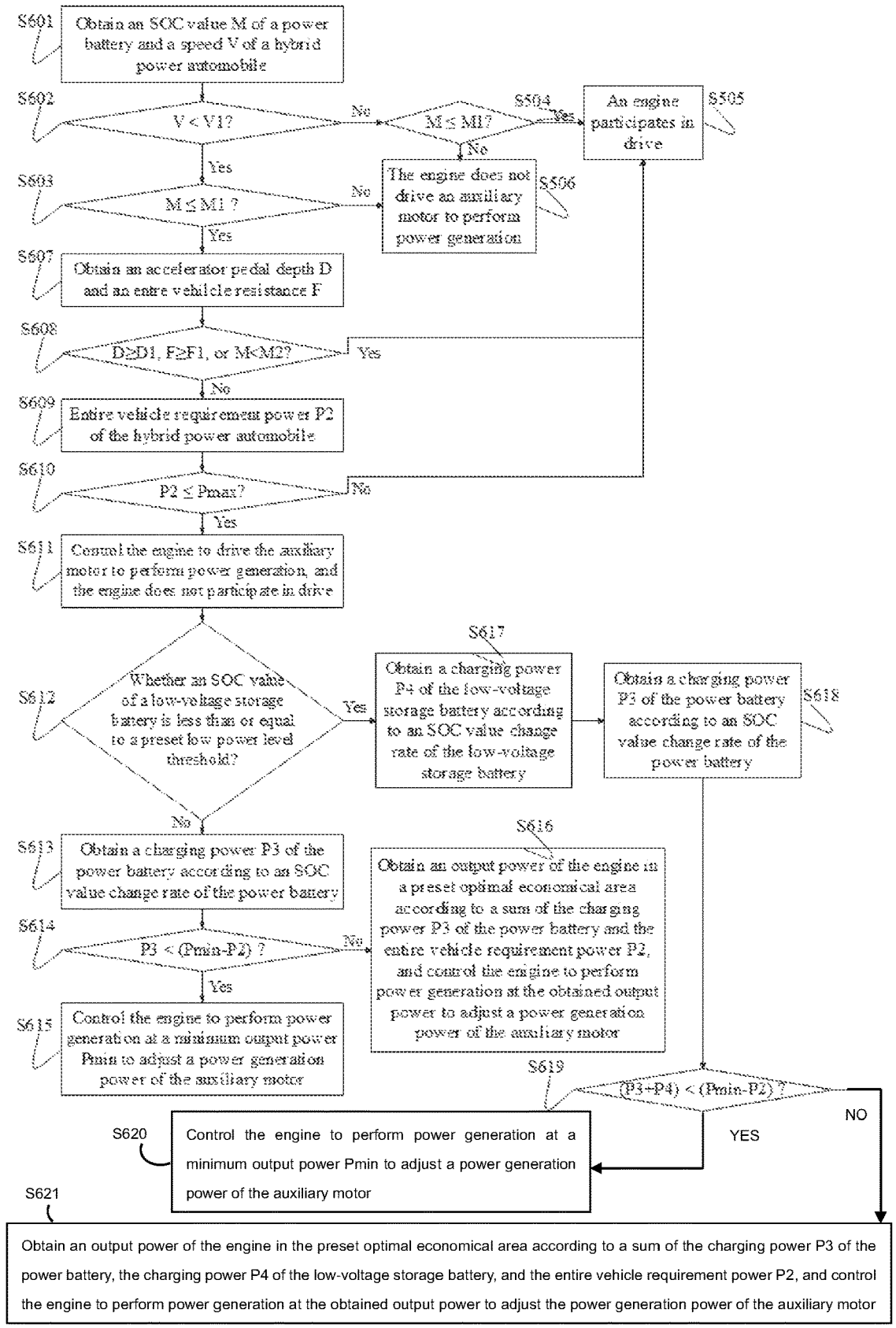
FIG. 21 is a flowchart of a power generation control method for a power system of a hybrid power automobile according to yet another specific embodiment of the present invention.

As described above, as shown in FIG. 21, a power generation control method for a hybrid power automobile of an embodiment of the present invention includes the following steps:

S601: Obtain an SOC value M of a power battery and a speed V of the hybrid power automobile.

S602: Determine whether the speed V of the hybrid power automobile is less than a first preset speed V1.

If yes, step S603 is performed; or if not, step S604 is performed.

S603: Determine whether the SOC value M of the power battery is less than or equal to a first preset value M1.

If yes, step S607 is performed; or if not, step S606 is performed.

S604: Determine whether the SOC value M of the power battery is less than or equal to a first preset value M1.

If yes, step S605 is performed; or if not, step S606 is performed.

S605: Control an engine to participate in drive.

S606: Control the engine not to drive an auxiliary motor to perform power generation.

S607: Obtain an accelerator pedal depth D of the hybrid power automobile and an entire vehicle resistance F of the hybrid power automobile.

S608: Determine whether the accelerator pedal depth D is greater than a first preset depth D1, whether the entire vehicle resistance F of the hybrid power automobile is greater than a first preset resistance F1, or whether the SOC value M of the power battery is less than a preset limit value M2.

If yes, step S605 is performed; or if not, step S609 is performed.

S609: Obtain an entire vehicle requirement power P2 of the hybrid power automobile.

S610: Determine whether the entire vehicle requirement power P2 is less than or equal to a maximum allowed power generation power Pmax of the auxiliary motor.

If yes, step S611 is performed; or if not, step S605 is performed.

S611: Control the engine to drive the auxiliary motor to perform power generation, and the engine not to participate in drive. In this case, the auxiliary motor is controlled to enter a power generation power adjustment mode.

S612: Determine whether an SOC value of a low-voltage storage battery is less than or equal to a preset low power level threshold.

If yes, step S617 is performed; or if not, step S613 is performed.

S613: Obtain a charging power P3 of the power battery according to an SOC value change rate of the power battery.

S614: Determine whether the charging power P3 of the power battery is less than a difference between a minimum output power Pmin corresponding to an optimal economical area of the engine and the entire vehicle requirement power P2.

If yes, step S615 is performed; or if not, step S616 is performed.

S615: Control the engine to perform power generation at the minimum output power Pmin to adjust a power generation power of the auxiliary motor.

S616: Obtain an output power of the engine in the preset optimal economical area according to a sum of the charging power P3 of the power battery and the entire vehicle requirement power P2, and control the engine to perform power generation at the obtained output power to adjust a power generation power of the auxiliary motor.

S617: Obtain a charging power P4 of the low-voltage storage battery according to an SOC value change rate of the low-voltage storage battery.

S618: Obtain a charging power P3 of the power battery according to an SOC value change rate of the power battery.

S619: Determine whether a sum of the charging power P4 of the low-voltage storage battery and the charging power P3 of the power battery is less than a difference between a minimum output power Pmin corresponding to an optimal economical area of the engine and the entire vehicle requirement power P2.

If yes, step S620 is performed; or if not, step S621 is performed.

S620: Control the engine to perform power generation at the minimum output power Pmin to adjust a power generation power of the auxiliary motor.

S621: Obtain an output power of the engine in the preset optimal economical area according to a sum of the charging power P3 of the power battery, the charging power P4 of the low-voltage storage battery and the entire vehicle requirement power P2, and control the engine to perform power generation at the obtained output power to adjust a power generation power of the auxiliary motor.

To sum up, according to the power generation control method for a hybrid power automobile proposed in this embodiment of the present invention, the SOC value of the power battery, the SOC value of the low-voltage storage battery and the speed of the hybrid power automobile are obtained, and the auxiliary motor is controlled according to the SOC value of the power battery and the speed of the hybrid power automobile to enter the power generation power adjustment mode, so that the engine runs in the preset optimal economical area. After the auxiliary motor enters the power generation power adjustment mode, the power generation power of the auxiliary motor is further adjusted according to the SOC value of the low-voltage storage battery. Therefore, the engine is enabled not to participate in drive at a low speed, and therefore the clutch is not used, thereby reducing abrasion or slip friction of the clutch, reducing an unsmooth feeling, and improving comfortableness; and at a low speed, the engine is enabled to operate in an economical area, to perform only power generation but does not perform drive, thereby reducing fuel consumption, reducing noise of the engine, maintaining low-speed electric balance and low-speed smoothness of the entire vehicle, and improving performance of the entire vehicle.

Based on the hybrid power automobile and the power system thereof of the foregoing embodiments, an embodiment of the present invention further proposes yet another power generation control method for a hybrid power automobile.

Figure 22:
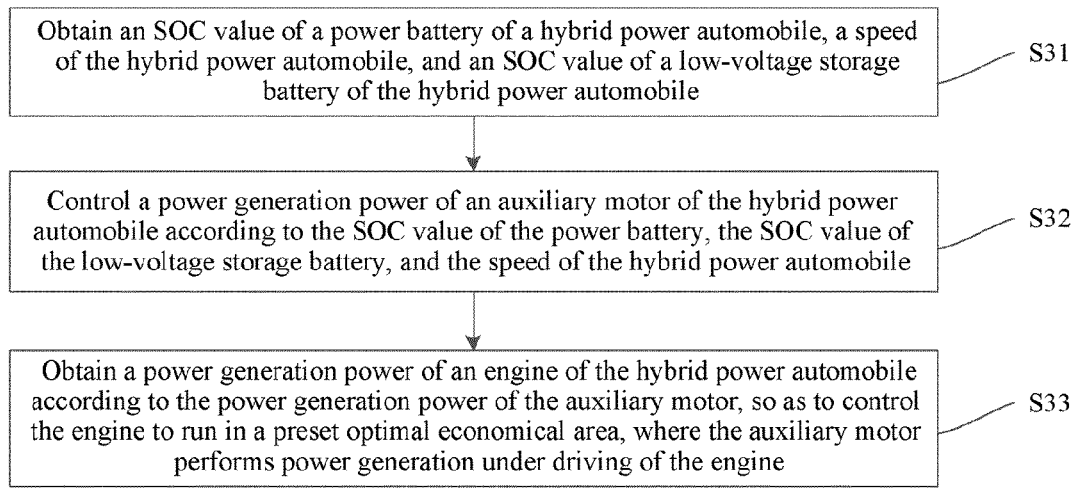
FIG. 22 is a flowchart of a power generation control method for a power system of a hybrid power automobile according to yet another embodiment of the present invention.

FIG. 22 is a flowchart of a power generation control method for a power system of a hybrid power automobile according to an embodiment of the present invention. As shown in FIG. 22, the power generation control method for a hybrid power automobile includes the following steps:

S31: Obtain an SOC value of a power battery of the hybrid power automobile, a speed of the hybrid power automobile, and an SOC value of a low-voltage storage battery of the hybrid power automobile.

It should be noted that, the SOC value of the power battery and the SOC value of the low-voltage storage battery may be collected through a battery management system of the hybrid power automobile, so as to obtain the SOC value of the power battery and the SOC value of the low-voltage storage battery.

S32: Control a power generation power of an auxiliary motor of the hybrid power automobile according to the SOC value of the power battery, the SOC value of the low-voltage storage battery and the speed of the hybrid power automobile.

S33: Obtain a power generation power of an engine of the hybrid power automobile according to the power generation power of the auxiliary motor, so as to control the engine to run in a preset optimal economical area, where the auxiliary motor performs power generation under driving of the engine.

It should be further noted that, the preset optimal economical area of the engine may be determined with reference to a diagram of an engine universal characteristic curve. FIG. 7 shows an example of the diagram of the engine universal characteristic curve, where a vertical coordinate indicates an output torque of the engine, a horizontal coordinate indicates a rotational speed of the engine, and a curve a is a fuel economy curve of the engine. An area corresponding to the fuel economy curve is the optimal economical area of the engine. To be specific, when a torsional moment and a torque of the engine are located on an optimal fuel economy curve of the engine, the engine is located in the optimal economical area. Therefore, in this embodiment of the present invention, the engine may be enabled, by controlling the rotational speed and the output torque of the engine to fall on the fuel economy curve of the engine, for example, the curve a, to run in the preset optimal economical area.

Specifically, when the hybrid power automobile is travelling, the engine may output power to wheels of the hybrid power automobile through a clutch, and the engine may further drive the auxiliary motor to perform power generation. Therefore, the output power of the engine mainly includes two parts, one part is output to the auxiliary motor, that is, the power generation power for driving the auxiliary motor to perform power generation, and the other part is output to the wheels, that is, the drive power for driving the wheels.

When the engine drives the auxiliary motor to perform power generation, the SOC value of the power battery, the SOC value of the low-voltage storage battery and the speed of the hybrid power automobile may be first obtained, the power generation power of the auxiliary motor is then controlled according to the SOC value of the power battery, the SOC value of the low-voltage storage battery and the speed of the hybrid power automobile, and the power generation power of the engine is further obtained according to the power generation power of the auxiliary motor, so as to control the engine to run in the preset optimal economical area. In other words, a control module may control the power generation power of the auxiliary motor on the premise of enabling the engine to operate in the preset optimal economical area.

Therefore, the engine is enabled to operate in the preset optimal economical area, and because the engine has lowest fuel consumption and highest fuel economy in the preset optimal economical area, fuel consumption of the engine may be reduced, noise of the engine may be reduced, and running economy of the entire vehicle may be improved. Moreover, because the auxiliary motor has relatively high power generation power and power generation efficiency at a low speed, power consumption requirements of low-speed travelling may be satisfied, and low-speed electric balance of the entire vehicle and low-speed smoothness of the entire vehicle may be maintained, to improve power performance of the entire vehicle. By charging the power battery, power consumption requirements of the power motor and the high-voltage electric appliance device may be ensured, and further it is ensured that the power motor drives the entire vehicle to normally travel; and by charging the low-voltage storage battery, power consumption requirements of the low-voltage electric appliance device may be ensured, and when the auxiliary motor stops power generation and the power battery is faulty or has an insufficient power level, low-voltage power supply of the entire vehicle may be implemented through the low-voltage storage battery, and further it is ensured that the entire vehicle may travel in the pure fuel mode, thereby improving travelling mileage of the entire vehicle.

Further, according to an embodiment of the present invention, when the SOC value of the power battery is greater than a preset limit value and is less than or equal to a first preset value, if the speed of the hybrid power automobile is less than a first preset speed, the power generation power of the auxiliary motor is controlled.

The first preset value may be a preset upper limit value of the SOC value of the power battery, for example, a value of determining to stop charging, and may be preferably 30%. The preset limit value may be a preset lower limit value of the SOC value of the power battery, for example, a value of determining to stop discharging, and may be preferably 10%. SOC values of the power battery may be divided into three ranges according to the first preset value and the preset limit value, that is, a first power level range, a second power level range, and a third power level range. When the SOC value of the power battery is less than or equal to the preset limit value, the SOC value of the power battery falls within the first power level range. In this case, the power battery performs only charging but does not perform discharging. When the SOC value of the power battery is greater than the preset limit value and is less than or equal to the first preset value, the SOC value of the power battery falls within the second power level range. In this case, the power battery has a charging requirement, that is, the power battery may be actively charged. When the SOC value of the power battery is greater than the first preset value, the SOC value of the power battery falls within the third power level range. In this case, the power battery may be not charged, that is, the power battery is not actively charged.

Specifically, after the SOC value of the power battery and the speed of the hybrid power automobile are obtained, a range within which the SOC value of the power battery falls may be determined. If the SOC value of the power battery falls within the second power level range, and the SOC value of the power battery is greater than the preset limit value and is less than or equal to the first preset value, it indicates that the power battery may be charged. In this case, whether the speed of the hybrid power automobile is less than the first preset speed is further determined. If the speed of the hybrid power automobile is less than the first preset speed, the power generation power of the auxiliary motor is controlled. In this case, the speed of the hybrid power automobile is relatively low, a needed drive force is relatively small, the power motor is sufficient to drive the hybrid power automobile to travel, and the engine may drive only the auxiliary motor to perform power generation, but does not participate in drive.

Therefore, at a low speed, the engine performs only power generation but does not participate in drive, thereby reducing abrasion or slip friction of the clutch, reducing an unsmooth feeling, and improving comfortableness.

Further, when the SOC value of the power battery is greater than the preset limit value and is less than or equal to the first preset value, and the speed of the hybrid power automobile is less than the first preset speed, an entire vehicle requirement power of the hybrid power automobile is further obtained; and when the entire vehicle requirement power is less than or equal to a maximum allowed power generation power of the auxiliary motor, the power generation power of the auxiliary motor is controlled.

To be specific, after it is determined that the SOC value of the power battery is greater than the preset limit value and is less than or equal to the first preset value, and the speed of the hybrid power automobile is less than the first preset speed, whether the entire vehicle requirement power is greater than the maximum allowed power generation power of the auxiliary motor may be further determine. If the entire vehicle requirement power is less than or equal to the maximum allowed power generation power of the auxiliary motor, the power generation power of the auxiliary motor is controlled. In this case, a drive force needed by the entire vehicle is relatively small, the entire vehicle requirement power is relatively small, the power motor is sufficient to drive the hybrid power automobile to travel, and the engine may drive only the auxiliary motor to perform power generation, but does not participate in drive.

Therefore, at a low speed, the engine performs only power generation but does not participate in drive, and because the engine does not participate in drive, the clutch does not need to be used, thereby reducing abrasion or slip friction of the clutch, reducing an unsmooth feeling, and improving comfortableness.

Furthermore, when the SOC value of the power battery is greater than the preset limit value and is less than or equal to the first preset value, the speed of the hybrid power automobile is less than the first preset speed, and the entire vehicle requirement power is less than or equal to the maximum allowed power generation power of the auxiliary motor, an accelerator pedal depth of the hybrid power automobile and an entire vehicle resistance of the hybrid power automobile are further obtained; and when the accelerator pedal depth is less than or equal to a first preset depth and the entire vehicle resistance of the hybrid power automobile is less than or equal to a first preset resistance, the power generation power of the auxiliary motor is controlled.

It should be noted that, the entire vehicle resistance of the hybrid power automobile may be travelling resistances of the hybrid power automobile, for example, a rolling resistance, an accelerating resistance, a grade resistance, and an air resistance.

To be specific, after it is determined that the SOC value of the power battery is greater than the preset limit value and is less than or equal to the first preset value, the speed of the hybrid power automobile is less than the first preset speed, and the entire vehicle requirement power is less than or equal to the maximum allowed power generation power of the auxiliary motor, whether the accelerator pedal depth is greater than the first preset depth and whether the entire vehicle resistance of the hybrid power automobile is greater than the first preset resistance may be further determined. If the accelerator pedal depth is less than or equal to the first preset depth and the entire vehicle resistance of the hybrid power automobile is less than or equal to the first preset resistance, the power generation power of the auxiliary motor is controlled. In this case, a drive force needed by the entire vehicle is relatively small, the entire vehicle requirement power is relatively small, the accelerator pedal depth is relatively small, the entire vehicle resistance is also relatively small, the power motor is sufficient to drive the hybrid power automobile to travel, and the engine may drive only the auxiliary motor to perform power generation, but does not participate in drive.

Therefore, at a low speed, the engine performs only power generation but does not participate in drive, and because the engine does not participate in drive, the clutch does not need to be used, thereby reducing abrasion or slip friction of the clutch, reducing an unsmooth feeling, and improving comfortableness.

As described above, when the hybrid power automobile is travelling at a low speed, the engine may perform only power generation but does not participate in drive, and because the engine does not participate in drive, the clutch does not need to be used, thereby reducing abrasion or slip friction of the clutch, reducing an unsmooth feeling, and improving comfortableness. Moreover, the low speed enables the engine to operate in an economical area, and because the engine has lowest fuel consumption and highest fuel economy in the preset optimal economical area, thereby reducing fuel consumption, reducing noise of the engine, and improving running economy of the entire vehicle, so as to maintain low-speed electric balance and low-speed smoothness of the entire vehicle and improve performance of the entire vehicle.

According to a specific embodiment of the present invention, when the engine is controlled to individually drive the auxiliary motor to perform power generation and the power motor is controlled to output a drive force alone, the power generation power of the engine is obtained according to the following formula:

$$P0 = P1/\eta/\zeta$$

where $P0$ is the power generation power of the engine, $P1$ is the power generation power of the auxiliary motor, $\eta$ is belt transmission efficiency, and $\zeta$ is efficiency of the auxiliary motor.

To be specific, if the engine may perform only power generation but does not participate in drive, the control module may calculate the power generation power $P0$ of the engine according to the power generation power of the auxiliary motor, the belt transmission efficiency $\eta$ and the efficiency $\zeta$ of the auxiliary motor, and control the engine to drive the auxiliary motor at the obtained power generation power $P0$ to perform power generation, so as to control the power generation power of the auxiliary motor.

Additionally, according to an embodiment of the present invention, when the SOC value of the power battery is less than the preset limit value, the speed of the hybrid power automobile is greater than or equal to the first preset speed, the entire vehicle requirement power is greater than the maximum allowed power generation power of the auxiliary motor, the accelerator pedal depth is greater than the first preset depth, or the entire vehicle resistance of the hybrid power automobile is greater than the first preset resistance, the engine is controlled to participate in drive.

To be specific, when the SOC value of the power battery is less than the preset limit value, the speed of the hybrid power automobile is greater than or equal to the first preset speed, the entire vehicle requirement power is greater than the maximum allowed power generation power of the auxiliary motor, the accelerator pedal depth is greater than the first preset depth, or the entire vehicle resistance of the hybrid power automobile is greater than the first preset resistance, the control module controls the engine to participate in drive. In this case, the power battery does not perform discharging again, the entire vehicle needs a relatively large drive force, the entire vehicle requirement power is relatively large, the accelerator pedal depth is relatively large or the entire vehicle resistance is also relatively large, the power motor is insufficient to drive the hybrid power automobile to travel, and the engine participates in drive to perform supplemental drive.

Therefore, the engine may participate in drive when the drive force output by the power motor is insufficient, thereby ensuring normal travelling of the entire vehicle, improving power performance of the entire vehicle, and improving travelling mileage of the entire vehicle.

More specifically, when the entire vehicle requirement power is greater than the maximum allowed power generation power of the auxiliary motor, the engine is further controlled to participate in drive to enable the engine to output power to wheels of the hybrid power automobile through the clutch.

Moreover, when the SOC value of the power battery is less than or equal to the preset limit value, the engine is further controlled to participate in drive to enable the engine to output power to wheels of the hybrid power automobile through the clutch; when the SOC value of the power battery is less than or equal to the first preset value, the speed of the hybrid power automobile is less than the first preset speed and the accelerator pedal depth is greater than the first preset depth, the engine is further controlled to participate in drive to enable the engine to output power to the wheels through the clutch; and when the SOC value of the power battery is less than or equal to the first preset value, the speed of the hybrid power automobile is less than the first preset speed and the entire vehicle resistance of the hybrid power automobile is greater than the first preset resistance, the engine is further controlled to participate in drive to enable the engine to output power to the wheels through the clutch.

To be specific, the SOC value of the power battery, the accelerator pedal depth of the hybrid power automobile, the speed, the entire vehicle resistance and the entire vehicle requirement power may be obtained in real time, and the SOC value of the power battery, the accelerator pedal depth of the hybrid power automobile, the speed and the entire vehicle resistance are determined:

First, when the SOC value of the power battery is less than the preset limit value, because the power level of the power battery is excessively low, and the power battery cannot provide sufficient electric energy, the engine and the power motor are controlled to simultaneously participate in drive. In this case, the engine may be further controlled to drive the auxiliary motor to perform power generation, and by controlling the power generation power of the engine, the engine is enabled to operate in the preset optimal economical area.

Second, when the SOC value of the power battery is less than or equal to the first preset value, the speed of the hybrid power automobile is less than the first preset speed and the accelerator pedal depth is greater than the first preset depth, because the accelerator pedal depth is relatively large, the control module controls the engine and the power motor to simultaneously participate in drive. In this case, the engine may be further controlled to drive the auxiliary motor to perform power generation, and by controlling the power generation power of the engine, the engine is enabled to operate in the preset optimal economical area.

Third, when the SOC value of the power battery is less than or equal to the first preset value, the speed of the hybrid power automobile is less than the first preset speed and the entire vehicle resistance of the hybrid power automobile is greater than the first preset resistance, because the entire vehicle resistance is relatively large, the control module controls the engine and the power motor to simultaneously participate in drive. In this case, the engine may be further controlled to drive the auxiliary motor to perform power generation, and by controlling the power generation power of the engine, the engine is enabled to operate in the preset optimal economical area.

Therefore, the engine may participate in drive when the drive force output by the power motor is insufficient, thereby ensuring normal travelling of the entire vehicle, improving power performance of the entire vehicle, and improving travelling mileage of the entire vehicle. Moreover, the engine may be controlled to operate in an economical area, and because the engine 1 has lowest fuel consumption and highest fuel economy in the preset optimal economical area, fuel consumption may be reduced, noise of the engine may be reduced, and economic performance of the entire vehicle may be improved.

Moreover, the control module is further configured to: when the SOC value of the power battery is less than or equal to the preset limit value, and the speed of the hybrid power automobile is greater than the first preset speed, control the engine to participate in drive to enable the engine to output power to the wheels through the clutch.

Therefore, the engine may participate in drive when the drive force output by the power motor is insufficient, thereby ensuring normal travelling of the entire vehicle, improving power performance of the entire vehicle, and improving travelling mileage of the entire vehicle.

Certainly, it should be understood that, the control module is further configured to: when the SOC value of the power battery is greater than the first preset value, control the engine not to drive the auxiliary motor to perform power generation. In this case, the power battery has an approximately full power level, and does not need to be charged, and the engine does not drive the auxiliary motor to perform power generation. To be specific, when the power battery has an approximately full power level, the engine does not drive the auxiliary motor to perform power generation, and therefore the auxiliary motor does not charge the power battery.

Further, when the engine drives only the auxiliary motor to perform power generation but does not participate in drive, the power generation power of the auxiliary motor may be adjusted. A process of controlling the power generation power of this embodiment of the present invention is specifically described below.

According to an embodiment of the present invention, the power generation power of the auxiliary motor is further controlled according to the entire vehicle requirement power of the hybrid power automobile, the charging power of the power battery and the charging power of the low-voltage storage battery.

Specifically, a formula of controlling the power generation power of the auxiliary motor according to the entire vehicle requirement power of the hybrid power automobile, the charging power of the power battery and the charging power of the low-voltage storage battery is as follows:

$$P1=P2+P3+P4, \text{ where } P2=P11+P21.$$

P1 is the power generation power of the auxiliary motor, P2 is the entire vehicle requirement power, P3 is the charging power of the power battery, P4 is the charging power of the low-voltage storage battery, P11 is an entire vehicle drive power, and P21 is an electric appliance device power.

It should be noted that, electric appliance devices include a first electric appliance device and a second electric appliance device, that is, the electric appliance device power P21 may include power needed by the high-voltage electric appliance device and the low-voltage electric appliance device.

It should be further noted that, the entire vehicle drive power P11 may include the output power of the power motor, and the entire vehicle drive power P11 may be obtained according to a preset accelerator-torsional moment curve of the power motor and a rotational speed of the power motor, where the preset accelerator-torsional moment curve may be determined during power matching of the hybrid power automobile. The electric appliance device power P21 may be obtained in real time according to electric appliance devices running on the entire vehicle, for example, the electric appliance device power P21 is calculated through DC consumption on a bus. The charging power P3 of the power battery may be obtained according to the SOC value of the power battery, and the charging power P4 of the low-voltage storage battery is obtained according to the SOC value of the low-voltage storage battery.

Specifically, when the hybrid power automobile is travelling, the charging power P3 of the power battery, the charging power P4 of the low-voltage storage battery, the entire vehicle drive power P11 and the electric appliance device power P21 may be obtained, and a sum of the charging power P3 of the power battery, the charging power P4 of the low-voltage storage battery, the entire vehicle drive power P11 and the electric appliance device power P21 is used as the power generation power P1 of the auxiliary motor. Therefore, the power generation power of the auxiliary motor may be controlled according to the calculated P1 value. For example, the output torque and the rotational speed of the engine may be controlled according to the calculated P1 value, so as to control the power for the engine to drive the auxiliary motor to perform power generation.

Further, according to an embodiment of the present invention, the controlling the power generation power of the auxiliary motor includes: obtaining an SOC value change rate of the power battery, and controlling the power generation power of the auxiliary motor according to a relationship between the entire vehicle requirement power P2 and a minimum output power corresponding to the optimal economical area of the engine, the SOC value change rate of the power battery, the SOC value of the low-voltage storage battery, and the SOC value change rate of the low-voltage storage battery.

It should be understood that, the SOC value change rate of the power battery may be obtained according to the SOC value of the power battery, for example, the SOC value of the power battery is collected once at each time interval t. In this way, a ratio of a difference between a current SOC value and a former SOC value of the power battery to the time interval t may be used as the SOC value change rate of the power battery. Similarly, the SOC value change rate of the low-voltage storage battery may be obtained according to the SOC value of the low-voltage storage battery, for example, the SOC value of the low-voltage storage battery is collected once at each time interval t. In this way, a ratio of a difference between a current SOC value and a former SOC value of the low-voltage storage battery to the time interval t may be used as the SOC value change rate of the low-voltage storage battery.

Specifically, the optimal economical area of the engine may be determined according to the engine universal characteristic curve shown in FIG. 7, and then the minimum output power corresponding to the optimal economical area of the engine is obtained. After the minimum output power corresponding to the optimal economical area of the engine is determined, the power generation power of the auxiliary motor may be controlled according to the relationship between the entire vehicle requirement power P2 and the minimum output power Pmin corresponding to the optimal economical area of the engine, the SOC value change rate of the power battery, the SOC value of the low-voltage storage battery, and the SOC value change rate of the low-voltage storage battery.

Therefore, when the hybrid power automobile is travelling at a low speed, the engine is enabled to operate in an economical area, thereby reducing fuel consumption, reducing noise of the engine, and improving economic performance of the entire vehicle. Moreover, at a low speed, the engine may perform only power generation but does not participate in drive, and because the engine does not participate in drive, the clutch does not need to be used, thereby reducing abrasion or slip friction of the clutch, reducing an unsmooth feeling, and improving comfortableness, so as to maintain low-speed electric balance and low-speed smoothness of the entire vehicle and improve performance of the entire vehicle.

A specific control manner in which when the engine drives only the auxiliary motor to perform power generation but does not participate in drive, the power generation power of the auxiliary motor is controlled according to the relationship between the entire vehicle requirement power P2 and the minimum output power Pmin corresponding to the optimal economical area of the engine, the SOC value change rate of the power battery, the SOC value of the low-voltage storage battery, and the SOC value change rate of the low-voltage storage battery is further described below.

Specifically, when the SOC value of the low-voltage storage battery is greater than a preset low power level threshold, the charging power of the power battery is obtained according to the SOC value change rate of the power battery, and whether the charging power of the power battery is less than the difference between the minimum output power corresponding to the optimal economical area of the engine and the entire vehicle requirement power is determined. If the charging power of the power battery is less than the difference between the minimum output power corresponding to the optimal economical area of the engine and the entire vehicle requirement power, the engine is controlled to perform power generation at the minimum output power to control the power generation power of the auxiliary motor; or if the charging power of the power battery is greater than or equal to the difference between the minimum output power corresponding to the optimal economical area of the engine and the entire vehicle requirement power, the output power of the engine in the preset optimal economical area is obtained according to the sum of the charging power of the power battery and the entire vehicle requirement power, and the engine is controlled to perform power generation at the obtained output power to control the power generation power of the auxiliary motor.

Specifically, when the SOC value of the low-voltage storage battery is less than or equal to the preset low power level threshold, the SOC value change rate of the low-voltage storage battery and the SOC value change rate of the power battery are obtained, the charging power of the low-voltage storage battery is obtained according to the SOC value change rate of the low-voltage storage battery, the charging power of the power battery is obtained according to the SOC value change rate of the power battery, and whether the sum of the charging power of the low-voltage storage battery and the charging power of the power battery is less than the difference between the minimum output power Pmin corresponding to the optimal economical area of the engine and the entire vehicle requirement power is determined. If the sum of the charging power of the low-voltage storage battery and the charging power of the power battery is less than the difference between the minimum output power corresponding to the optimal economical area of the engine and the entire vehicle requirement power, the engine is controlled to perform power generation at the minimum output power to control the power generation power of the auxiliary motor; or if the sum of the charging power of the low-voltage storage battery and the charging power of the power battery is greater than or equal to the difference between the minimum output power corresponding to the optimal economical area of the engine and the entire vehicle requirement power, the output power of the engine in the preset optimal economical area is obtained according to the sum of the charging power of the power battery, the charging power of the low-voltage storage battery and the entire vehicle requirement power, and the engine is controlled to perform power generation at the obtained output power to control the power generation power of the auxiliary motor.

It should be noted that, a first relationship table between the SOC value change rate of the power battery and the charging power P3 of the power battery may be pre-stored in the control module. Therefore, after an SOC value change rate of the power battery is obtained, a corresponding charging power P3 of the power battery may be obtained by performing matching on the first relationship table. For example, a first relationship table between the SOC value change rate of the power battery and the charging power P3 of the power battery may be shown in Table 1.

TABLE 1

| SOC value change rate of the power battery | A1 | A2 | A3 | A4 | A5 |
|---|---|---|---|---|---|
| Charging power of the power battery | B1 | B2 | B3 | B4 | B5 |

It can be learned from Table 1 that, when an SOC value change rate of the power battery is A1, a corresponding charging power P3 of the power battery that may be obtained is B1; when an SOC value change rate of the power battery is A2, a corresponding charging power P3 of the power battery that may be obtained is B2; when an SOC value change rate of the power battery is A3, a corresponding charging power P3 of the power battery that may be obtained is B3; when an SOC value change rate of the power battery is A4, a corresponding charging power P3 of the power battery that may be obtained is B4; and when an SOC value change rate of the power battery is A5, a corresponding charging power P3 of the power battery that may be obtained is B5.

Similarly, a second relationship table between the SOC value change rate of the low-voltage storage battery and the charging power P4 of the low-voltage storage battery may be pre-stored in the control module. Therefore, after an SOC value change rate of the low-voltage storage battery is obtained, a corresponding charging power P4 of the low-voltage storage battery may be obtained by performing matching on the second relationship table. For example, a first relationship table between the SOC value change rate of the low-voltage storage battery and the charging power P4 of the low-voltage storage battery may be shown in Table 2.

TABLE 2

| SOC value change rate of the low-voltage storage battery | A11 | A12 | A13 | A14 | A15 |
|---|---|---|---|---|---|
| Charging power of the low-voltage storage battery | B11 | B12 | B13 | B14 | B15 |

It can be learned from Table 2 that, when an SOC value change rate of the low-voltage storage battery is A11, a corresponding charging power P4 of the low-voltage storage battery that may be obtained is B11; when an SOC value change rate of the low-voltage storage battery is A12, a corresponding charging power P4 of the low-voltage storage battery that may be obtained is B12; when an SOC value change rate of the low-voltage storage battery is A13, a corresponding charging power P4 of the low-voltage storage battery that may be obtained is B13; when an SOC value change rate of the low-voltage storage battery is A14, a corresponding charging power P4 of the low-voltage storage battery that may be obtained is B14; and when an SOC value change rate of the low-voltage storage battery is A15, a corresponding charging power P4 of the low-voltage storage battery that may be obtained is B15.

Specifically, after the auxiliary motor 5 enters the power generation power adjustment mode, the SOC value of the low-voltage storage battery, the SOC value of the power battery, and the entire vehicle requirement power P2 (the sum of the entire vehicle drive power P11 and the electric appliance device power P21) may be obtained, and then whether the SOC value of the low-voltage storage battery is greater than the preset low power level threshold is determined.

If the SOC value of the low-voltage storage battery is greater than the preset low power level threshold, the SOC value change rate of the power battery is obtained, and the charging power P3 of the power battery corresponding to the SOC value change rate of the power battery is queried for, so as to select an appropriate charging power P3 to enable the SOC value of the power battery to increase; and whether the charging power P3 of the power battery is less than the difference between the minimum output power Pmin corresponding to the optimal economical area of the engine and the entire vehicle requirement power P2 is further determined. If yes, that is, P3<Pmin−P2, the engine is controlled to perform power generation at the minimum output power Pmin to control the power generation power of the auxiliary motor, that is, the engine is controlled to run at the minimum output power Pmin corresponding to the optimal economical area, and to charge the power battery at a power equal to the minimum output power Pmin corresponding to the optimal economical area minus the entire vehicle requirement power P2, that is, Pmin−P2; or if not, that is, P3≥Pmin−P2, the output power of the engine in the preset optimal economical area is obtained according to the sum of the charging power P3 of the power battery and the entire vehicle requirement power P2, and the engine is controlled to perform power generation at the obtained output power to control the power generation power of the auxiliary motor. To be specific, a corresponding output power is searched for in the preset optimal economical area of the engine, where the obtained output power may be the sum of the charging power P3 of the power battery and the entire vehicle requirement power P2, that is, (P2+P3 or P11+P21+P3), and the engine is controlled to perform power generation at the obtained output power.

If the SOC value of the low-voltage storage battery is less than or equal to the preset low power level threshold, the SOC value change rate of the power battery is obtained, and the charging power P3 of the power battery corresponding to the SOC value change rate of the power battery is queried for, so as to select an appropriate charging power P3 to enable the SOC value of the power battery to increase; the SOC value change rate of the low-voltage storage battery is obtained, and the charging power P4 of the low-voltage storage battery corresponding to the SOC value change rate of the low-voltage storage battery is queried for, to select an appropriate charging power P4 to enable the SOC value of the low-voltage storage battery to increase; and whether the sum of the charging power P4 of the low-voltage storage battery and the charging power P3 of the power battery is less than the difference between the minimum output power Pmin corresponding to the optimal economical area of the engine and the entire vehicle requirement power P2 is further determined. If yes, that is, P3+P4<Pmin−P2, the engine is controlled to perform power generation at the minimum output power Pmin to control the power generation power of the auxiliary motor, that is, the engine is controlled to run at the minimum output power Pmin corresponding to the optimal economical area, and to charge the power battery and the low-voltage storage battery at a power equal to the minimum output power Pmin corresponding to the optimal economical area minus the entire vehicle requirement power P2, that is, Pmin−P2; or if not, that is, P3+P4≥Pmin−P2, the output power of the engine in the preset optimal economical area is obtained according to the sum of the charging power P3 of the power battery, the charging power P4 of the low-voltage storage battery and the entire vehicle requirement power P2, and the engine is controlled to perform power generation at the obtained output power to control the power generation power of the auxiliary motor. To be specific, a corresponding output power is searched for in the preset optimal economical area of the engine, where the obtained output power may be the sum of the charging power P3 of the power battery, the charging power P4 of the low-voltage storage battery and the entire vehicle requirement power P2, that is, (P2+P3+P4 or P11+P21+P3+P4), and the engine is controlled to perform power generation at the obtained output power.

Therefore, at a low speed, the engine can operate in an economical area, and perform only power generation but does not participate in drive, and therefore the clutch is not used, thereby reducing abrasion or slip friction of the clutch, reducing an unsmooth feeling, improving comfortableness, reducing fuel consumption, and reducing noise of the engine, so as to maintain low-speed electric balance and low-speed smoothness of the entire vehicle and improve performance of the entire vehicle.

Figure 23:
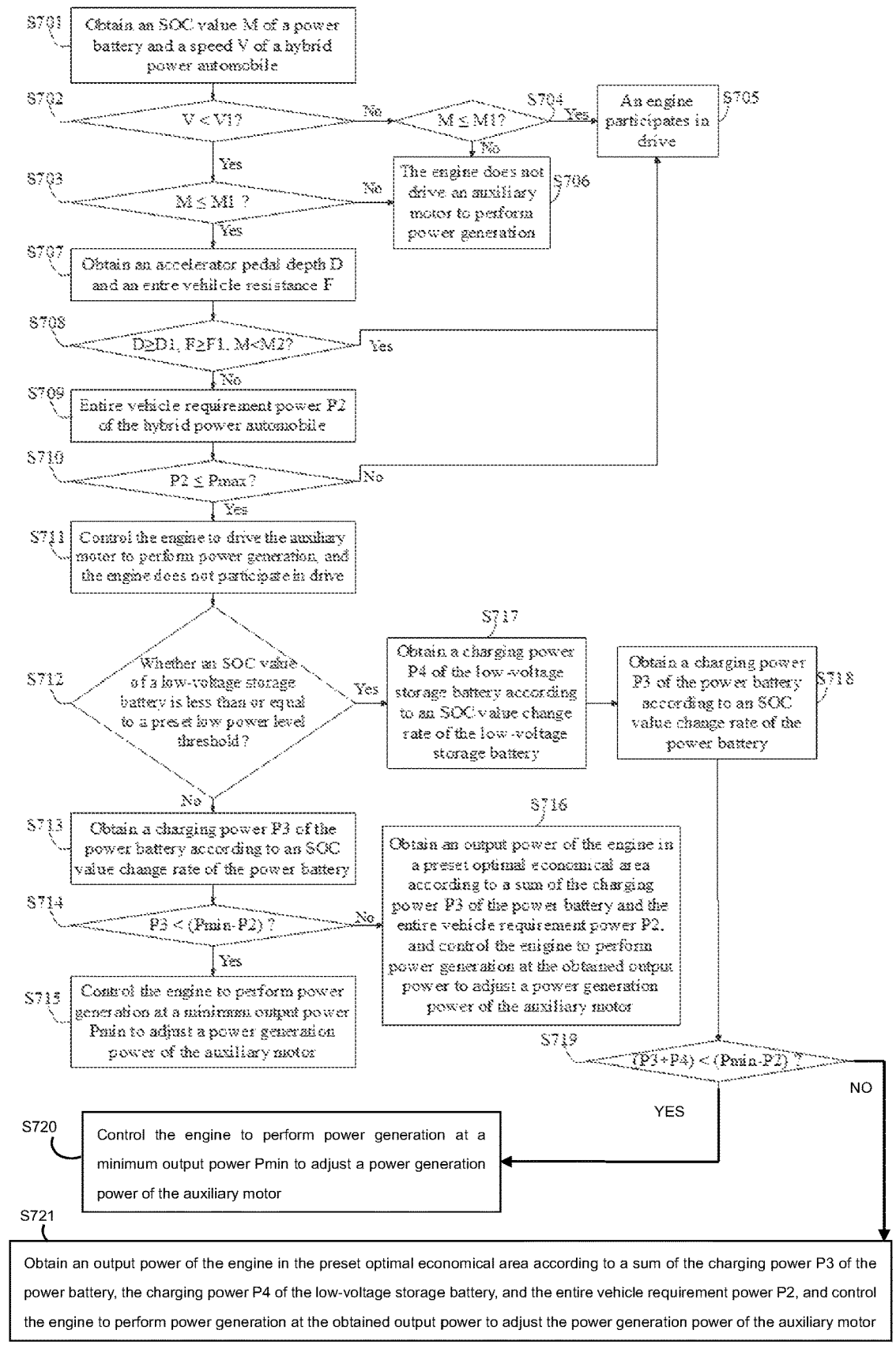
FIG. 23 is a flowchart of a power generation control method for a power system of a hybrid power automobile according to yet another specific embodiment of the present invention.

As described above, as shown in FIG. 23, a power generation control method for a hybrid power automobile of an embodiment of the present invention includes the following steps:

S701: Obtain an SOC value M of a power battery and a speed V of the hybrid power automobile.

S702: Determine whether the speed V of the hybrid power automobile is less than a first preset speed V1.

If yes, step S703 is performed; or if not, step S704 is performed.

S703: Determine whether the SOC value M of the power battery is less than or equal to a first preset value M1.

If yes, step S707 is performed; or if not, step S706 is performed.

S704: Determine whether the SOC value M of the power battery is less than or equal to a first preset value M1.

If yes, step S705 is performed; or if not, step S706 is performed.

S705: Control an engine to participate in drive.

S706: Control the engine not to drive an auxiliary motor to perform power generation.

S707: Obtain an accelerator pedal depth D of the hybrid power automobile and an entire vehicle resistance F of the hybrid power automobile.

S708: Determine whether the accelerator pedal depth D is greater than a first preset depth D1, whether the entire vehicle resistance F of the hybrid power automobile is greater than a first preset resistance F1, or whether the SOC value M of the power battery is less than a preset limit value M2.

If yes, step S705 is performed; or if not, step S709 is performed.

S709: Obtain an entire vehicle requirement power P2 of the hybrid power automobile.

S710: Determine whether the entire vehicle requirement power P2 is less than or equal to a maximum allowed power generation power Pmax of the auxiliary motor.

If yes, step S711 is performed; or if not, step S705 is performed.

S711: Control the engine to drive the auxiliary motor to perform power generation, and the engine not to participate in drive.

S712: Determine whether an SOC value of a low-voltage storage battery is less than or equal to a preset low power level threshold.

If yes, step S717 is performed; or if not, step S713 is performed.

S713: Obtain a charging power P3 of the power battery according to an SOC value change rate of the power battery.

S714: Determine whether the charging power P3 of the power battery is less than a difference between a minimum output power Pmin corresponding to an optimal economical area of the engine and the entire vehicle requirement power P2.

If yes, step S715 is performed; or if not, step S716 is performed.

S715: Control the engine to perform power generation at the minimum output power Pmin to control a power generation power of the auxiliary motor.

S716: Obtain an output power of the engine in the preset optimal economical area according to a sum of the charging power P3 of the power battery and the entire vehicle requirement power P2, and control the engine to perform power generation at the obtained output power to control a power generation power of the auxiliary motor.

S717: Obtain a charging power P4 of the low-voltage storage battery according to an SOC value change rate of the low-voltage storage battery.

S718: Obtain a charging power P3 of the power battery according to an SOC value change rate of the power battery.

S719: Determine whether a sum of the charging power P4 of the low-voltage storage battery and the charging power P3 of the power battery is less than a difference between a minimum output power Pmin corresponding to an optimal economical area of the engine and the entire vehicle requirement power P2.

If yes, step S720 is performed; or if not, step S721 is performed.

S720: Control the engine to perform power generation at the minimum output power Pmin to control a power generation power of the auxiliary motor.

S721: Obtain an output power of the engine in the preset optimal economical area according to a sum of the charging power P3 of the power battery, the charging power P4 of the low-voltage storage battery and the entire vehicle requirement power P2, and control the engine to perform power generation at the obtained output power to control a power generation power of the auxiliary motor.

To sum up, according to the power generation control method for a hybrid power automobile of this embodiment of the present invention, the SOC value of the power battery of the hybrid power automobile, the speed of the hybrid power automobile, and the SOC value of the low-voltage storage battery of the hybrid power automobile are obtained, then the power generation power of the auxiliary motor of the hybrid power automobile is controlled according to the SOC value of the power battery, the SOC value of the low-voltage storage battery and the speed of the hybrid power automobile, and the power generation power of the engine of the hybrid power automobile is obtained according to the power generation power of the auxiliary motor, so as to control the engine to run in the preset optimal economical area, where the auxiliary motor performs power generation under driving of the engine. Therefore, the engine is enabled not to participate in drive at a low speed, and therefore the clutch is not used, thereby reducing abrasion or slip friction of the clutch, reducing an unsmooth feeling, and improving comfortableness; and at a low speed, the engine is enabled to operate in an economical area, to perform only power generation but does not perform drive, thereby reducing fuel consumption, reducing noise of the engine, maintaining low-speed electric balance and low-speed smoothness of the entire vehicle, and improving performance of the entire vehicle.

Finally, an embodiment of the present invention further proposes a computer readable storage medium, having an instruction stored in the computer readable storage medium, and when the instruction is executed, a hybrid power automobile performs a power generation control method of the foregoing embodiments.

Although the embodiments of the present invention are shown and described above, it can be understood that the foregoing embodiments are exemplary, and should not be construed as limitations to the present invention. A person of ordinary skill in the art can make changes, modifications, replacements, and variations to the foregoing embodiments within the scope of the present invention.

What is claimed is:

1. A power system of a hybrid power automobile including wheels driven by a drive force, the power system comprising:
    an engine configured to output the drive force to the wheels of the hybrid power automobile through a clutch and generate power via a connected auxiliary motor, wherein power generation of the auxiliary motor is controlled according to an entire vehicle requirement of the hybrid power automobile;
    a power motor configured to output the drive force to the wheels of the hybrid power automobile;
    a power battery configured to supply power to the power motor;
    a DC-DC converter; and
    a control module configured to control the engine and the power motor to output the drive force to the wheels of the hybrid power automobile based on a determined speed of the hybrid power automobile and a state of charge (SOC) of the power battery,
    wherein the engine is operable to output the drive force to the wheels independently from the power motor;
    wherein the power motor is configured to receive power directly from the auxiliary motor and the power battery;
    wherein when the determined speed is above a speed threshold, the drive force is output via the engine through the clutch,
    wherein when the determined speed is below the speed threshold and the SOC of the power battery is above a charge threshold, the drive force is output via the power motor; and
    wherein when the determined speed is below the speed threshold and the SOC of the power battery is below the charge threshold, the drive force is output via the power motor and the engine simultaneously.

2. The power system of a hybrid power automobile according to claim 1, wherein the auxiliary motor comprises a first controller, the power motor comprises a second controller, and the auxiliary motor is connected to the power battery and the DC-DC converter through the first controller and to the power motor through the first controller and the second controller.

3. The power system of a hybrid power automobile according to claim 1, wherein the DC-DC converter is connected to the power battery.

4. The power system of a hybrid power automobile according to claim 2, wherein the DC-DC converter is connected to the power motor through the second controller.

5. The power system of a hybrid power automobile according to claim 1, wherein the DC-DC converter is connected to a first electric appliance device and a low-voltage storage battery to supply power to the first electric appliance device and the low-voltage storage battery, the low-voltage storage battery being connected to the first electric appliance device.

6. The power system of a hybrid power automobile according to claim 5, wherein the first controller, the second controller, and the power battery are each connected to a second electric appliance device.

7. The power system of a hybrid power automobile according to claim 1, wherein the auxiliary motor is a belt-driven starter generator (BSG) motor.

8. The power system of a hybrid power automobile according to claim 1, wherein the wheels comprise at least first and second wheels and the engine and the power motor jointly drive at least the first wheel.

9. The power system of a hybrid power automobile according to claim 1, wherein the wheels comprise at least first and second wheels;
wherein the engine is operable to output the drive force to the first wheel through the clutch; and
wherein the power motor is operable to output the drive force to the second wheel.

10. The power system of a hybrid power automobile according to claim 2, wherein the DC-DC converter is connected to the power battery.

11. The power system of a hybrid power automobile according to claim 10, wherein the DC-DC converter is further connected to the power motor through the second controller.

12. The power system of a hybrid power automobile according to claim 11 wherein the DC-DC converter is further connected to a first electric appliance device and a low-voltage storage battery to supply power to the first electric appliance device and the low-voltage storage battery, and the low-voltage storage battery is further connected to the first electric appliance device.

13. The power system of a hybrid power automobile according to claim 12, wherein the first controller, the second controller, and the power battery are each connected to a second electric appliance device.

14. The power system of a hybrid power automobile according to claim 13, wherein the auxiliary motor is a belt-driven starter generator (BSG) motor.

15. The power system of a hybrid power automobile according to claim 14, wherein the wheels comprise at least first and second wheels and the engine and the power motor simultaneously drive at least the first wheel.

16. The power system of a hybrid power automobile according to claim 14, wherein the wheels comprise at least first and second wheels;
wherein the engine is operable to output the drive force to the first wheel through the clutch; and
wherein the power motor is operable to output the drive force to the second wheel.

17. The power system of a hybrid power automobile according to claim 3, wherein the DC-DC converter is further connected to the power motor through the second controller.

18. The power system of a hybrid power automobile according to claim 17, wherein the DC-DC converter is further connected to a first electric appliance device and a low-voltage storage battery to supply power to the first electric appliance device and the low-voltage storage battery, the low-voltage storage battery being connected to the first electric appliance device.

19. The power system of a hybrid power automobile according to claim 18, wherein the first controller, the second controller, and the power battery are each connected to a second electric appliance device.

20. A hybrid power automobile comprising:
wheels driven by a drive force; and
a power system comprising:
an engine configured to output a drive force to the wheels of the hybrid power automobile through a clutch and generate power via a connected auxiliary motor, wherein power generation of the auxiliary motor is controlled according to an entire vehicle requirement of the hybrid power automobile;
a power motor configured to output the drive force to the wheels of the hybrid power automobile;
a power battery configured to supply power to the power motor;
a DC-DC converter; and
a control module configured to control the engine and the power motor to output the drive force to the wheels of the hybrid power automobile based on a speed of the hybrid power automobile and a state of charge (SOC) of the power battery,
wherein the engine is operable to output the drive force to the wheels independently from the power motor;
wherein the power motor is configured to receive power directly from the auxiliary motor and the power battery;
wherein when the speed is above a speed threshold, the drive force is output via the engine through the clutch;
wherein when the speed is below the speed threshold and the SOC of the power battery is above a charge threshold, the drive force is output via the power motor; and
wherein when the speed is below the speed threshold and the SOC of the power battery is below the charge threshold, the drive force is output via the power motor and the engine simultaneously.

* * * * *